(12) United States Patent
Puvanakijjakorn et al.

(10) Patent No.: US 12,513,799 B2
(45) Date of Patent: Dec. 30, 2025

(54) OFF-FIXTURE LIGHTING CONTROL CIRCUIT

(71) Applicant: Wangs Alliance Corporation, Port Washington, NY (US)

(72) Inventors: Voravit Puvanakijjakorn, Port Washington, NY (US); Wei Gao, Guangzhou (CN)

(73) Assignee: Wangs Alliance Corporation, Port Washington, NY (US)

( * ) Notice: Subject to any disclaimer, the term of this patent is extended or adjusted under 35 U.S.C. 154(b) by 0 days.

(21) Appl. No.: 18/784,419

(22) Filed: Jul. 25, 2024

(65) Prior Publication Data

US 2025/0040013 A1    Jan. 30, 2025

Related U.S. Application Data

(60) Provisional application No. 63/528,769, filed on Jul. 25, 2023.

(51) Int. Cl.
*H05B 45/34* (2020.01)
*H05B 45/325* (2020.01)
(Continued)

(52) U.S. Cl.
CPC ........... *H05B 45/34* (2020.01); *H05B 45/325* (2020.01); *H05B 45/37* (2020.01); *H05B 47/14* (2020.01); *H05B 47/155* (2020.01); *H05B 47/25* (2020.01)

(58) Field of Classification Search
CPC ...... H05B 45/34; H05B 45/325; H05B 45/37; H05B 47/14; H05B 47/155; H05B 47/25
See application file for complete search history.

(56) References Cited

U.S. PATENT DOCUMENTS 2,738,756 A    3/1956    Doane
3,104,064 A    9/1963    Bellek
(Continued)

FOREIGN PATENT DOCUMENTS

DE    102012101327    8/2012

OTHER PUBLICATIONS

International Search Report from International Application No. PCT/US2016/066395, pp. 1-6, dated Apr. 13, 2017.
(Continued)

*Primary Examiner* — Daniel D Chang
(74) *Attorney, Agent, or Firm* — Weiss & Arons LLP

(57) ABSTRACT

Apparatus, methods and systems for lighting control are provided. The apparatus may include a transceiver configured to receive lighting control information from a power source. The apparatus may include lighting control circuitry. The lighting control circuitry may receive a first voltage from the power source. The lighting control circuitry may convert the first voltage into a second voltage. The lighting control circuitry may obtain a light level from the lighting control information. The apparatus may include a connector. The connected may transmit the second voltage and a current corresponding to the light level to a light emitting diode ("LED") light source. The transceiver, the lighting control circuitry, and the connector may be disposed in a housing. The LED light source may be disposed in a fixture. The lighting control circuitry may be structurally separate from and in electronic communication with the fixture.

28 Claims, 33 Drawing Sheets

(51) Int. Cl.
*H05B 45/37* (2020.01)
*H05B 47/14* (2020.01)
*H05B 47/155* (2020.01)
*H05B 47/25* (2020.01)

(56) References Cited

U.S. PATENT DOCUMENTS

| | | |
|---|---|---|
| 3,263,918 A | 8/1966 | Beachler et al. |
| 3,629,682 A | 12/1971 | Boelter |
| 4,495,463 A | 1/1985 | Milkovic |
| 4,596,449 A | 6/1986 | Iwata et al. |
| 4,739,457 A | 4/1988 | Orr |
| 5,513,085 A | 4/1996 | Bourne |
| 5,584,568 A | 12/1996 | Corbasson et al. |
| 6,013,988 A | 1/2000 | Bucks et al. |
| 6,084,476 A | 7/2000 | Hamanishi et al. |
| 6,092,914 A | 7/2000 | Esakoff et al. |
| 6,147,458 A | 11/2000 | Bucks et al. |
| 6,149,283 A | 11/2000 | Conway et al. |
| 6,155,693 A | 12/2000 | Spiegel et al. |
| 6,250,774 B1 | 6/2001 | Begemann et al. |
| 6,290,368 B1 | 9/2001 | Lehrer |
| 6,390,647 B1 | 5/2002 | Shaefer |
| 6,424,102 B1 | 7/2002 | Holtslag |
| 6,459,919 B1 | 10/2002 | Lys et al. |
| 6,525,414 B2 | 2/2003 | Shiraishi et al. |
| 6,561,690 B2 | 5/2003 | Balestriero et al. |
| 6,586,890 B2 | 7/2003 | Min et al. |
| 6,641,283 B1 | 11/2003 | Bohler |
| 6,655,819 B2 | 12/2003 | Loga et al. |
| 6,788,011 B2 | 9/2004 | Mueller et al. |
| 6,806,659 B1 | 10/2004 | Mueller et al. |
| 7,015,825 B2 | 3/2006 | Callahan |
| 7,038,399 B2 | 5/2006 | Lys et al. |
| 7,109,668 B2 | 9/2006 | Pogodayev et al. |
| 7,192,162 B2 | 3/2007 | Tanaka et al. |
| 7,204,608 B2 | 4/2007 | Beeman et al. |
| 7,233,115 B2 | 6/2007 | Lys |
| 7,256,554 B2 | 8/2007 | Lys |
| 7,262,559 B2 | 8/2007 | Tripathi et al. |
| 7,326,179 B1 | 2/2008 | Cienfuegos |
| 7,352,138 B2 | 4/2008 | Lys et al. |
| 7,358,679 B2 | 4/2008 | Lys et al. |
| 7,445,365 B1 | 11/2008 | Hsu |
| 7,534,975 B1 | 5/2009 | Sharrah et al. |
| 7,737,643 B2 | 6/2010 | Lys |
| 7,837,866 B2 | 11/2010 | Burrows |
| 7,847,486 B2 | 12/2010 | Ng |
| 8,070,328 B1 | 12/2011 | Knoble et al. |
| 8,148,912 B2 | 4/2012 | Kim |
| 8,217,589 B2 * | 7/2012 | Endres ................ H05B 47/185 315/306 |
| 8,220,970 B1 | 7/2012 | Khazi et al. |
| 8,482,226 B2 | 7/2013 | Vinther et al. |
| 8,598,793 B2 | 12/2013 | Yan et al. |
| 8,662,709 B2 | 3/2014 | Chang |
| 8,708,535 B2 | 4/2014 | Dalsgaard |
| 8,905,587 B1 | 12/2014 | Bouckaert |
| 8,926,121 B2 | 1/2015 | Wu |
| 9,140,414 B1 | 9/2015 | Beausoleil |
| 9,140,431 B1 | 9/2015 | Lee |
| 9,157,591 B2 | 10/2015 | Rozot et al. |
| 9,204,519 B2 | 12/2015 | Gan et al. |
| 9,247,597 B2 | 1/2016 | Miskin et al. |
| 9,310,038 B2 | 4/2016 | Athalye |
| 9,544,967 B2 | 1/2017 | Recker et al. |
| 9,681,512 B1 | 6/2017 | Xiong et al. |
| 9,739,440 B1 | 8/2017 | Deyaf et al. |
| 9,784,440 B2 | 10/2017 | Erdener et al. |
| 10,139,060 B1 | 11/2018 | Erdener et al. |
| 10,190,757 B2 | 1/2019 | Erdener et al. |
| 10,208,935 B2 | 2/2019 | Erdener |
| 10,323,832 B2 | 6/2019 | Erdener et al. |
| 10,330,294 B2 | 6/2019 | Erdener |
| 10,378,747 B1 | 8/2019 | Hanslip |
| 10,465,888 B1 | 11/2019 | Erdener et al. |
| 10,571,101 B2 | 2/2020 | Erdener et al. |
| 10,598,358 B2 | 3/2020 | Erdener et al. |
| 10,631,386 B1 * | 4/2020 | McRae ................ H05B 45/37 |
| 10,920,971 B2 | 2/2021 | Erdener et al. |
| 10,941,930 B2 | 3/2021 | Hatch et al. |
| 10,969,088 B1 | 4/2021 | Erdener et al. |
| 2003/0063461 A1 | 4/2003 | Tant |
| 2003/0179585 A1 | 9/2003 | Lefebvre |
| 2004/0156189 A1 | 8/2004 | Opolka |
| 2005/0007777 A1 | 1/2005 | Klipstein et al. |
| 2005/0047134 A1 | 3/2005 | Mueller et al. |
| 2006/0262542 A1 | 11/2006 | Ibbitson et al. |
| 2007/0019415 A1 | 1/2007 | Leblanc et al. |
| 2007/0076415 A1 | 4/2007 | Chou et al. |
| 2007/0139913 A1 | 6/2007 | Savage |
| 2007/0222399 A1 | 9/2007 | Bondy et al. |
| 2008/0094828 A1 | 4/2008 | Shao |
| 2008/0123340 A1 | 5/2008 | McClellan |
| 2008/0273331 A1 | 11/2008 | Moss et al. |
| 2009/0021185 A1 | 1/2009 | Ng |
| 2009/0067172 A1 | 3/2009 | Inoue et al. |
| 2009/0073696 A1 | 3/2009 | Melzner |
| 2009/0079712 A1 | 3/2009 | Levin et al. |
| 2010/0036260 A1 | 2/2010 | Zuluaga et al. |
| 2010/0090613 A1 | 4/2010 | Spartano |
| 2010/0102751 A1 | 4/2010 | Markel |
| 2010/0127626 A1 | 5/2010 | Altonen et al. |
| 2010/0208371 A1 | 8/2010 | Chao |
| 2010/0226139 A1 | 9/2010 | Lynch et al. |
| 2010/0271804 A1 | 10/2010 | Levine |
| 2011/0080741 A1 | 4/2011 | Noh |
| 2011/0115399 A1 | 5/2011 | Sadwick et al. |
| 2011/0121752 A1 | 5/2011 | Newman, Jr. et al. |
| 2012/0056559 A1 | 3/2012 | Fu et al. |
| 2012/0069562 A1 | 3/2012 | Singer et al. |
| 2012/0139426 A1 | 6/2012 | Ilyes et al. |
| 2012/0146525 A1 * | 6/2012 | Hui ................ H05B 45/37 315/200 R |
| 2012/0153833 A1 | 6/2012 | Mikani et al. |
| 2012/0235582 A1 | 9/2012 | Ido |
| 2012/0243213 A1 | 9/2012 | Chen |
| 2013/0039055 A1 | 2/2013 | Wilson et al. |
| 2013/0063035 A1 | 3/2013 | Baddela et al. |
| 2013/0088152 A1 | 4/2013 | Hagen |
| 2013/0201671 A1 | 8/2013 | Marcus et al. |
| 2013/0223058 A1 | 8/2013 | Briggs |
| 2013/0249437 A1 | 9/2013 | Wang et al. |
| 2014/0015406 A1 | 1/2014 | Fujiwara et al. |
| 2014/0049967 A1 | 2/2014 | Erdener et al. |
| 2014/0119022 A1 | 5/2014 | Beausoleil |
| 2014/0160736 A1 | 6/2014 | Chung et al. |
| 2014/0300285 A1 | 10/2014 | Medak |
| 2014/0334157 A1 | 11/2014 | Ferguson |
| 2014/0361697 A1 | 12/2014 | Miskin et al. |
| 2014/0361967 A1 | 12/2014 | Be et al. |
| 2014/0362566 A1 | 12/2014 | Tischler et al. |
| 2014/0375203 A1 | 12/2014 | Goscha et al. |
| 2015/0028776 A1 | 1/2015 | McMillan |
| 2015/0115823 A1 | 4/2015 | Serra et al. |
| 2015/0159852 A1 | 6/2015 | Dahlen et al. |
| 2015/0198319 A1 | 7/2015 | Salter et al. |
| 2015/0237694 A1 * | 8/2015 | Zudrell-Koch ...... H05B 39/044 315/307 |
| 2015/0260385 A1 | 9/2015 | Brynjolfsson |
| 2015/0289334 A1 | 10/2015 | Campbell et al. |
| 2015/0345733 A1 | 12/2015 | Bobbo et al. |
| 2015/0345765 A1 | 12/2015 | Horst et al. |
| 2016/0095186 A1 * | 3/2016 | Reed ................ H05B 47/185 315/153 |
| 2016/0123563 A1 | 5/2016 | Ferguson et al. |
| 2016/0174325 A1 | 6/2016 | Monjo |
| 2016/0178173 A1 | 6/2016 | Yadav et al. |
| 2016/0234899 A1 | 8/2016 | Reed et al. |
| 2016/0375162 A1 | 12/2016 | Marry et al. |
| 2016/0375163 A1 | 12/2016 | Hawkins et al. |
| 2017/0064790 A1 | 3/2017 | Clark et al. |
| 2017/0130941 A1 | 5/2017 | Ford |
| 2017/0164439 A1 | 6/2017 | Reed |

(56) References Cited

U.S. PATENT DOCUMENTS

| | | | |
|---|---|---|---|
| 2017/0171929 A1 | 6/2017 | Erdener et al. |
| 2017/0171932 A1 | 6/2017 | Puvanakijjakorn |
| 2017/0325311 A1 | 11/2017 | Athalye |
| 2018/0013986 A1 | 1/2018 | Chien |
| 2018/0031184 A1 | 2/2018 | Yingchun |
| 2018/0156423 A1 | 6/2018 | Murby |
| 2018/0320871 A1 | 11/2018 | Clawson et al. |
| 2018/0376555 A1 | 12/2018 | Wang et al. |
| 2019/0098734 A1 | 3/2019 | Dolan |
| 2019/0264899 A1 | 8/2019 | Erdener |
| 2019/0313503 A1 | 10/2019 | Woytowitz |
| 2019/0320515 A1 | 10/2019 | Sadwick |
| 2020/0100334 A1 | 3/2020 | Han |
| 2020/0284418 A1 | 9/2020 | Hanslip |
| 2021/0120643 A1 | 4/2021 | Ye et al. |
| 2021/0239304 A1 | 8/2021 | Erdener et al. |
| 2022/0003365 A1 | 1/2022 | McRae |

OTHER PUBLICATIONS

Written Opinion of the International Searching Authority from International Application No. PCT/US2016/066395, pp. 1-8, dated Apr. 13, 2017.
"Trulux Canvas: LED Sheet-Static White (IP54) Installation Instructions," American Lighting, Inc., 2020.
"Trulux Canvas: LED Sheet-Tunable White (IP54) Installation Instructions," American Lighting, Inc., 2020.

* cited by examiner

Power Conversion Circuitry

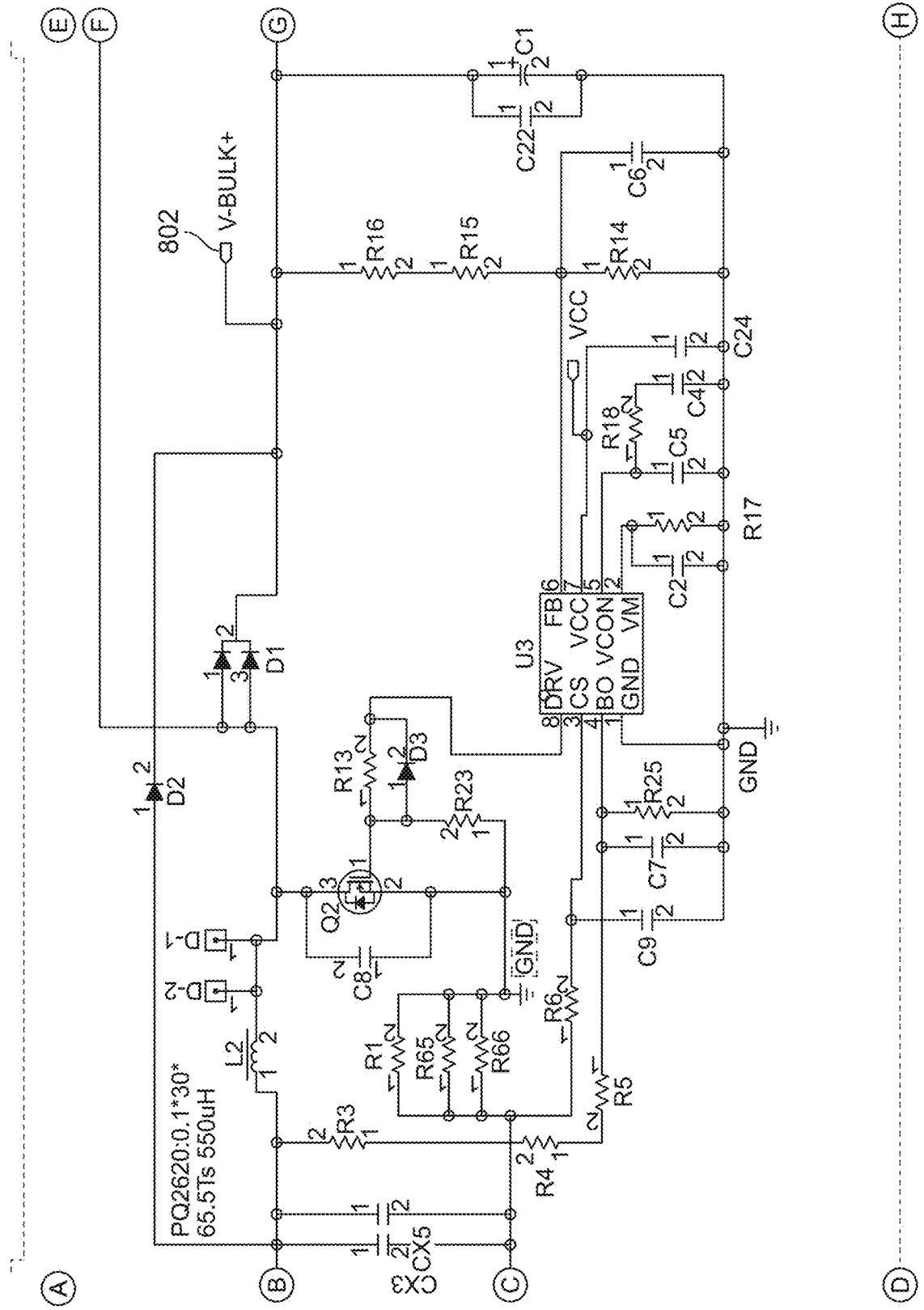
FIG. 8 (Cont. 1)

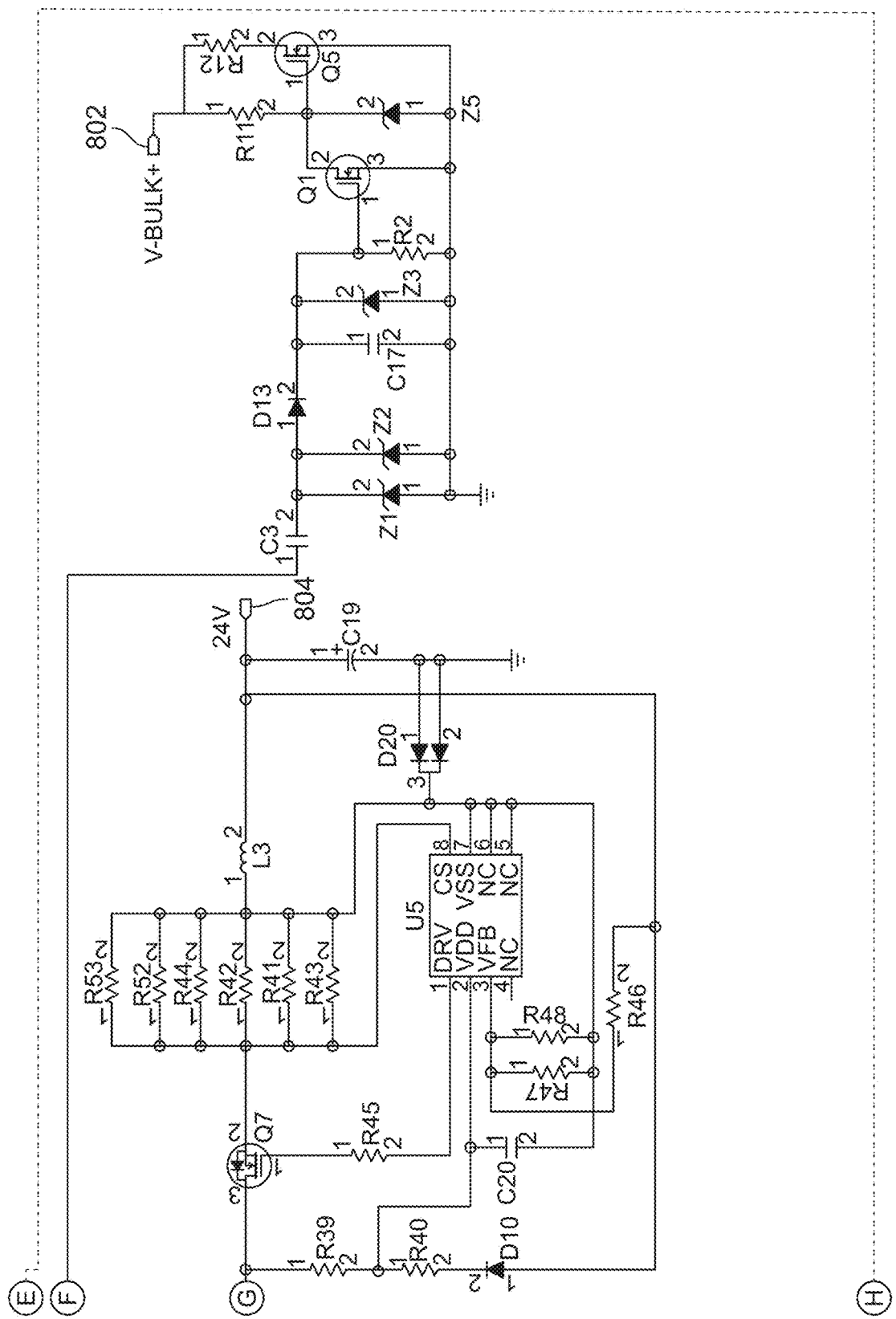
FIG. 8 (Cont. 2)

OFF-FIXTURE LIGHTING CONTROL CIRCUIT

CROSS-REFERENCE TO RELATED APPLICATIONS

This application is a nonprovisional of U.S. Provisional Application No. 63/528,769, filed Jul. 25, 2023, which is hereby incorporated by reference herein in its entirety.

BACKGROUND

LED light fixtures typically include lighting control circuitry that requires accommodation that can limit installation choices.

It would therefore be desirable to provide apparatus and methods for separation of lighting control circuitry from a fixture.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

Figure 1:
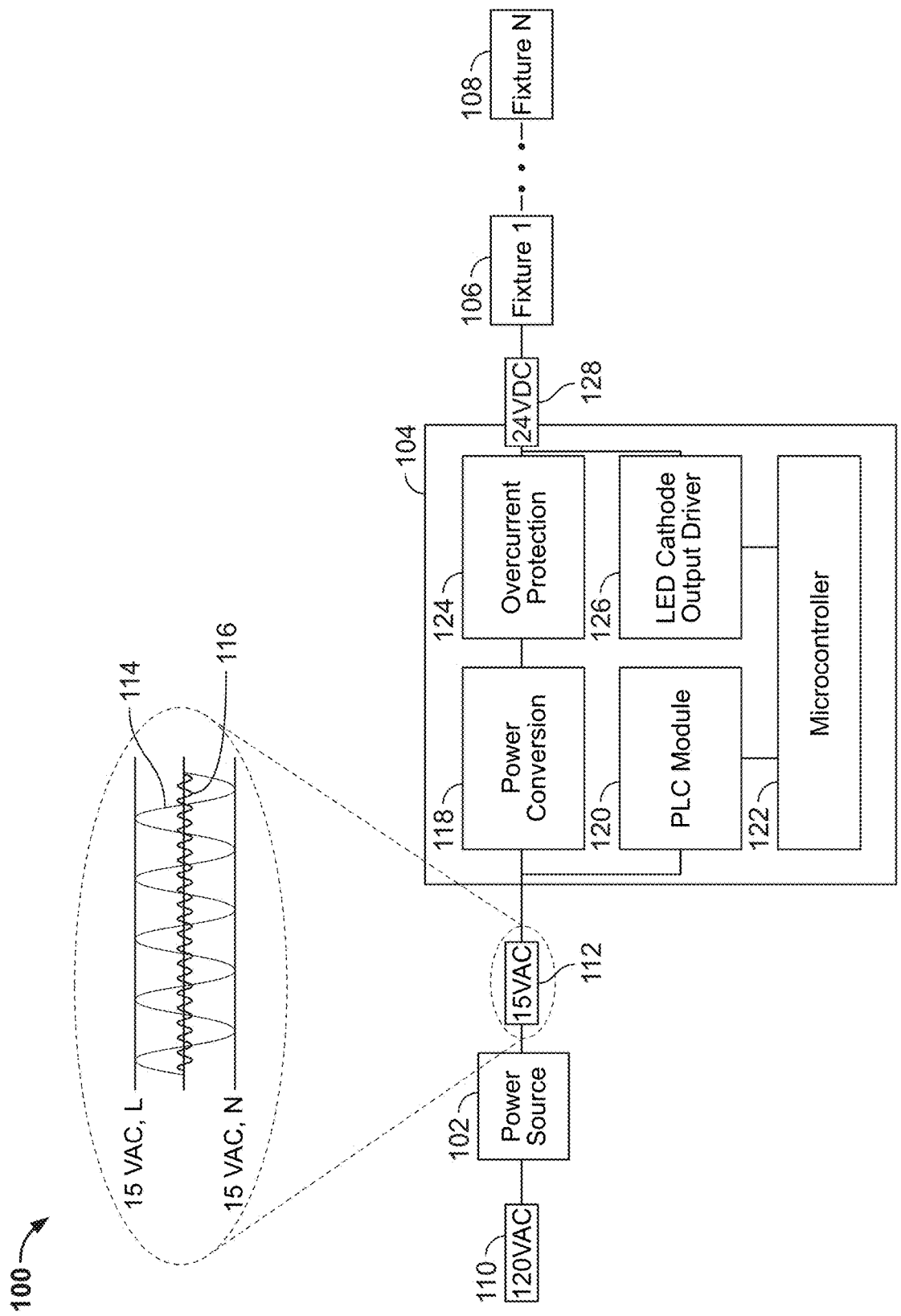
FIG. 1 shows schematically illustrative apparatus in accordance with the principles of the invention.

The leftmost digit (e.g., "L") of a three-digit reference numeral (e.g., "LRR"), and the two leftmost digits (e.g., "LL") of a four-digit reference numeral (e.g., "LLRR"), generally identify the first figure in which a part is called-out.

DETAILED DESCRIPTION

Apparatus and methods for lighting control are provided.

The apparatus may include controller circuitry. The controller circuitry may enable transmission of power to a light tape. The light tape may include a light emitting diode ("LED") light source. The lighting controller circuitry may receive AC voltage from a power source. The controller circuitry may receive encoded lighting control information over the AC voltage. The controller circuitry may be disposed such that the controller circuitry is not mounted on/affixed to the light tape. The controller circuitry may include a power line communication ("PLC") module. The PLC module may decode the encoded lighting control information. The controller circuitry may include a microcontroller. The microcontroller may obtain a light level from the lighting control information. The controller circuitry may include voltage conversion circuitry. The voltage conversion circuitry may convert the AC voltage to DC voltage. The voltage conversion circuitry may provide the DC voltage to the light tape. The controller circuitry may include an LED cathode output driver. The LED cathode output driver may provide controlled current to the light tape based on the light level received from the microcontroller.

The controller circuitry may include a transceiver. The transceiver may be included the PLC module. The transceiver may receive the lighting control information from the power source. The power source may include a transformer unit. The power source may include a junction box. The power source may include a power supply. The power source may include any suitable components or equipment.

The power source may receive line voltage. The line voltage may have a voltage of 120 VAC. The line voltage may have a voltage of 220 VAC. The line voltage may have any suitable voltage. The power source may include one or more buck converters. The one or more buck converters may convert the line voltage into a lower output voltage. The lower output voltage may be the AC voltage. The AC voltage may be a first voltage. Table 1 lists illustrative ranges that may include the first voltage.

TABLE 1

Illustrative voltage ranges.
Illustrative voltage ranges (AC Volts)

| Lower | Upper |
|---|---|
| <1 | 5 |
| 5 | 10 |
| 10 | 15 |
| 15 | 20 |
| 20 | 25 |
| 25 | 30 |
| 30 | 35 |
| 35 | 40 |
| 45 | 50 |
| 50 | >50 |
| Other suitable lower limits | Other suitable upper limits |

The power source may include encoding circuitry. The encoding circuitry may encode the lighting control information. The encoding circuitry may include PLC encoding circuitry. The PLC encoding circuitry may encode the lighting control information to be transmitted via the first voltage. the lighting control information may be transmitted to the PLC module. The encoding circuitry may encode the lighting control information within the first voltage. The encoding circuitry may encode the lighting control information within a carrier frequency of the first voltage.

The lighting control information may be transmitted from the power source via a PLC signal. The PLC signal may include the first voltage. The power line signal may include the first voltage and the carrier frequency. The lighting control information may be carried by an alternating current having a nominal frequency in a range of 50-60 Hz. The lighting control information may be carried by a current having a nominal frequency that is not less than 1 MHz. The lighting control information may be carried by a current having a nominal frequency that is not less than 100 Hz. The lighting control information may be carried by a current having any suitable nominal frequency.

The power source may receive the lighting control information from a user. The lighting control information may include lighting control parameters. The user may select the lighting control parameters via a software application. Table 2 lists illustrative lighting control parameters.

TABLE 2

Illustrative lighting control parameters.
Illustrative lighting control parameters

| Parameters | Description |
|---|---|
| Light level | Instruction to set fixture to a dimming level |
| Color | Instruction to adjust fixture to emit light of a certain color |
| Correlated Color Temperature ("CCT") | Instruction to adjust fixture to emit white light of a certain CCT |
| CCT warming curve | Parameters that define an operational CCT mix as a function of dimming level |

TABLE 2-continued

Illustrative lighting control parameters.
Illustrative lighting control parameters

| Parameters | Description |
|---|---|
| Group lighting control messages | Instruction to set light of fixtures identified as members of a selected group |
| Scene ID | Set fixtures or groups to preselected scene, which may be defined by dimming levels or color temperatures |
| Scene trigger | Activate scene in response to a trigger, such as a user-activated switch, date, time of day, motion sensor, voice system |
| Other suitable elements | |

The software application may be displayed on a graphical user interface ("GUI"). The software application may be executed on one or more of a mobile device, dedicated lighting controller or any other suitable computing device.

The user may select the lighting control parameters via a selector. The selector may be a manual selector. The selector may be an electronic selector. The selector may be a wireless selector. The selector may be a remote selector. The remote selector may be a selector that is not included in the GUI. The selector may be any suitable selector. The selector may include one or more of sliders, dropdown lists, presets, switches and any suitable selector configuration.

The lighting control information may include the lighting control parameters. The lighting control parameters may be selected by a user. The lighting control information may be transmitted to the power source. The lighting control information may be transmitted to the power source using a protocol. Table 3 lists illustrative protocols.

TABLE 3

Illustrative protocols.
Illustrative protocols

IEEE 802.11
IEEE 802.15.1
IEEE 802.3
ANSI E1.11 - 2008 (R2018) Entertainment Technology-USITT
DMX512-AAsynchronous Serial Digital Data Transmission
Standard for Controlling Lighting Equipment and Accessories
IEC 62386
TCP/IP
Other suitable protocols The lighting control information may be transmitted in a data packet. The lighting control information may be transmitted in one or more data packets. The one or more data packets may be transmitted via parallel transmission, via serial transmission or via any suitable combination thereof.

The controller circuitry may include lighting control circuitry. The lighting control circuitry may receive the first voltage from the power source.

The lighting control circuitry may convert the first voltage into a second voltage. The second voltage may be different from the first voltage. The second voltage may be the DC voltage. The second voltage may be a higher voltage than the first voltage. The second voltage may be a lower voltage than the first voltage. Table 4 lists illustrative ranges that may include the second voltage.

TABLE 4

Illustrative voltage ranges.
Illustrative voltage ranges (DC Volts)

| Lower | Upper |
|---|---|
| <1 | 12 |
| 12 | 24 |
| 24 | 36 |
| 36 | 48 |
| 48 | 60 |
| 60 | 72 |
| 72 | 84 |
| 84 | >84 |
| Other suitable lower limits | Other suitable upper limits |

The lighting control circuitry may obtain a light level from the lighting control information. The lighting control circuitry may obtain any suitable lighting control parameter from the lighting control information.

The controller circuitry may include a connector. The connector may transmit the second voltage to the LED light source. The connector may transmit a current corresponding to the light level. The connector may include one or more contacts. The one or more contacts may enable voltage and current transmission.

The transceiver, the lighting control circuitry, and the connector may be disposed in a housing. The LED light source may be disposed in a fixture. The transceiver, the lighting control circuitry and the connector may be structurally separate from the fixture. The lighting control circuitry may be in electronic communication with the fixture. The lighting control circuitry may be in electronic communication with the fixture via the connector.

In operation, the transceiver and the lighting control circuitry may generate heat. In operation the transceiver and the lighting control circuitry may conduct heat. The housing may dissipate the heat. The housing may absorb the heat. The housing may disperse heat emitted by the transceiver and the lighting control circuitry.

The PLC module may receive the lighting control information from the PLC signal. The PLC module may decode the lighting control information. The PLC module may transmit the decoded lighting control information to the lighting control circuitry.

The lighting control circuitry may include the microcontroller. The microcontroller may receive the lighting control information from a first signal. The microcontroller may obtain the light level from the lighting control information. The microcontroller may output the light level using a second signal. The second signal may be a different signal from the first signal. The second signal may be the same signal as the first signal.

The first signal may include a digital multiplex ("DMX") signal. The first signal may include an electronic low voltage ("ELV") signal. The first signal may include a triode for alternating current ("TRIAC") signal. The first signal may include any suitable analog or digital signal for transmitting lighting control information to the microcontroller.

The second signal may include at least one pulse width modulated ("PWM") signal. The second signal may include any suitable modulated signal. The microcontroller may transmit and receive data through any suitable number of signals.

The light tape may be a fixture. The fixture may be a modular fixture. The fixture may be a fixture that is configured to be supported by a fixture support. The fixture may be a fixture that is not configured to be supported by the fixture support. The apparatus may include a plurality of fixtures. The plurality of fixtures may be connected to each other via connectors. The plurality of fixtures may be connected to each other wirelessly. The plurality of fixtures may be connected to each other in a network. The network may be a parallel network, serial network or any suitable combination thereof.

The fixture may be disposed in the fixture support. The fixture may be disposed in a fixture support that is not configured to receive the housing. The fixture may be engaged with the fixture support by a mechanical support, a magnetic support, an electrical support, any suitable support or any combination thereof. The fixture may be a fixture that is not disposed in the fixture support.

The LED light source included in the fixture may include a first LED light source. The fixture may include a second LED light source. The first LED light source may have a first color correlated temperature ("CCT"). The fixture may include a second LED light source. The second LED light source may have a second CCT. The second CCT may be different from the first CCT. The second CCT may be the same as the first CCT.

The fixture may include a third LED light source having a third CCT. The fixture may include a fourth LED light source having a fourth CCT. The fixture may include a fifth LED light source having a fifth CCT. The first, second, third, fourth and fifth CCTs may be different from each other, the same as each other or any suitable combination thereof. The fixture may include any suitable amount of LED light sources having different CCTs. Table 5 lists illustrative ranges that may include nominal CCT values for the first, second, third, fourth and fifth CCTs. The fixture may include any suitable numbers of LEDs. Each of the LEDs may have a different CCT.

TABLE 5

Illustrative ranges that may include nominal CCT values.
Illustrative Ranges (° K)

| Lower | Upper |
|---|---|
| <1,800 | 1,800 |
| 1,800 | 2,700 |
| 2,700 | 3,500 |
| 3,500 | 5,000 |
| 5,000 | 6,500 |
| 6,500 | >6,500 |
| Other suitable ranges | |

The first LED may have a first color. The second LED may have a second color. The third LED may have a third color. The fourth LED may have a fourth color. The fifth LED may have a fifth color. The first, second, third, fourth and fifth colors may be different from each other, the same as each other or any suitable combination thereof. The fixture may include any suitable amount of LEDs with any suitable amounts of colors. Colors may include, but are not limited to red, green, blue, cool white and warm white.

The controller circuitry may be disposed on a printed circuit board ("PCB"). A width of the PCB may be greater than a width of the light tape. The PCB may be a first PCB. The light tape may include a second PCB. The first PCB may be in electrical communication with the second PCB via only a length of wire.

The wire may include copper. The wire may include aluminum. The wire may include any suitable material for transmitting current and voltage. The wire may include insulating materials. The wire may include a solid wire. The wire may include a stranded wire. The wire may include a twisted pair. The wire may include a cable. The cable may house one or more wires.

The wire may have a gauge. Table 6 lists illustrative gauges of the wire.

TABLE 6

Illustrative gauges of the wire.

| AWG Wire Size | Wire Diameter (mm) |
|---|---|
| 20 | 0.812 |
| 18 | 1.024 |
| 16 | 1.291 |
| 14 | 1.628 |
| 12 | 2.053 |
| 10 | 2.588 |
| 8 | 3.264 |
| 6 | 4.115 |
| 4 | 5.189 |
| 3 | 5.828 |
| 2 | 6.544 |
| 1 | 7.348 |
| 1/0 | 8.251 |
| 2/0 | 9.266 |
| 3/0 | 10.405 |
| 4/0 | 11.684 |

The length of wire may include any suitable length. Table 7 lists illustrative ranges that may include the length.

TABLE 7

Illustrative ranges that may include the length.
Illustrative length ranges (mm)

| Lower | Upper |
|---|---|
| <500 | 1,500 |
| 1,500 | 3,000 |
| 3,000 | 4,500 |
| 4,500 | 6,000 |
| 6,000 | 7,500 |
| 7,500 | 9,000 |
| 9,000 | 10,500 |
| 10,500 | >10,500 |
| Other suitable lower limits | Other suitable upper limits |

The LED may be included in a linear array of LEDs. The linear array of LEDs may be disposed on the second PCB. The LEDs may be connected in parallel, in a series or in any suitable combination thereof. The LEDs may be LEDs that are not connected to each other.

A width of the first PCB may be greater than a width of the second PCB.

The second PCB may only include LEDs and resistors. The second PCB may be a PCB that does not include any controller circuitry. The second PCB may be a PCB that does not include a microcontroller. The second PCB may be a PCB that does not include an integrated circuit. The second PCB may be a PCB that does not include logic.

The light tape may include an LED light source. The light tape may receive the DC voltage. The DC voltage may be voltage that has been converted from the AC voltage. The DC voltage may be voltage that has been converted from the AC voltage by the controller circuitry. The light tape may receive a current that corresponds to the light level transmitted from the power source over the AC voltage. The light level may be obtained by the controller circuitry. The controller circuitry may not be disposed on the light tape.

In some embodiments, the apparatus may include a light tape. The light tape may include a chip on board ("COB") LED. The COB LED may include one or more LEDs. The COB may include five LEDs. One of the five LEDs may emit light of a red color. One of the five LEDs may emit light of a green color. One of the five LEDs may emit light of a blue color. One of the five LEDs may emit light of a warm white color. One of the five LEDs may emit light of a cool white color. Each of the five LEDs may include a group of two or more LEDs. The COB may be mounted on a substrate. The substrate may be included in a lamina. The lamina may have a break-away or cuttable connection to a lamina or laminae contiguous with the lamina. The lamina may be used in an outdoor setting. The lamina may be used in an indoor setting. The lamina may be used in any suitable setting.

The lamina may include one or more layers of one or more materials. The layers may include a PCB circuit layer. The PCB layer may be included in the second PCB. The layers may include a dielectric layer. The layers may include a substrate. The circuit layer may be flexible. The flexible lamina may be a lamina that does not include a substrate. A rigid lamina may include a substrate. The substrate may include aluminum. The substrate may include fiberglass. The substrate may include glass. The substrate may include polymer.

The lamina may include one or more segments. A segment may be joined to one or more other segments at a separation line. Segments may have a shape, in a planar view, which is rectangular, square, curved, parallelogrammatic, rhombic, trapezoidal, irregular, or any other suitable shape or form. Separation lines may be straight, curved, or have any suitable configuration. Segments may be contiguous. Segments may be non-contiguous. Two or more segments may be arranged along a first direction x. Two or more segments may be arranged along a second direction y. The first and second directions may be different. The first and second directions may be perpendicular to each other.

The COB LED may be in electrical communication with an electronic circuit. The electronic circuit may include a lighting control circuit. The lighting control circuitry may be included in the controller circuitry. The lighting control circuit may include the controller circuitry. The lighting control circuit may be disposed in a location that is different from that of the COB LED. The lighting control circuit may be disposed in a housing. The housing may include a box. The housing may include any other suitable housing. The footprint of the light tape may not be large enough to include the lighting control circuit. As such, the lighting control circuit may be disposed in a location that is different from that of the light tape.

The lighting control circuit may be included in the first PCB. The first PCB may be disposed in a location that is different from that of the second PCB. The lighting control circuit may receive input voltage. The lighting control circuit may function to control the color light emitted from the COB LED. The lighting control circuit may include five output channels. Each of the output channels may be in electronic communication with one of the five LEDs included in the COB LED.

A transformer unit may provide voltage to the lighting control circuit. The transformer unit may be the power source. The transformer unit may receive an input voltage of 120V AC, or any other suitable input voltage. The input voltage may be line voltage. The transformer unit may step down the voltage. The transformer unit may step down the voltage to 15 VAC or any other suitable lower voltage. The transformer unit may transmit an output voltage of 15V AC. The transformer unit may transmit the voltage via PLC signals. The voltage may be transmitted to the lighting control circuit via PLC signals. The lighting control circuit may include a PLC chip. The PLC chip may include a PLC decoder. The lighting control circuit may decode the PLC signals.

The lighting control circuit may include a boost converter. The boost converter may increase the voltage. The boost converter may convert the voltage from AC voltage to DC voltage. The boost converter may boost the voltage. Boosting the voltage may increase the voltage.

The lighting control circuit may include a buck converter. The buck converter may be used to control the amount of voltage being transmitted to each channel in the COB. The buck converter may step down the voltage from the boost converter to a voltage of 24V DC. Each channel may be connected to a different one of the five LEDs. The buck converter may be used to control the light output of each channel.

The lighting control circuit may include a power factor correction ("PFC") circuit. The PFC circuit may improve the power factor of the lighting control circuit. The lighting control circuit may include protection circuitry. The protection circuitry may protect the lighting control circuit from over current.

The lighting control circuit may include a microcontroller. The microcontroller may provide, via the COB LED, a color that corresponds to a user color command. A user may select a desired color of the light. The user selected color may be transmitted to the microcontroller via a user color command. The microcontroller may provide the user selected color by creating a combination of the five colors of the five of LEDs included in the COB. The microcontroller may control the intensity level of each of the five LEDs. The microcontroller may control the color correlated temperature of each of the five LEDs.

The lamina and continuous laminae may include a connector. The connector may be a polar connector. The connector may connect the lamina to the lighting control circuit. The connector may connect the lamina and any laminae contiguous with the lamina to the lighting control circuit. The connector may provide voltage to the COB included in the lamina and/or any contiguous laminae. The connector may be an outdoor rated cable. As such, the construction of the cable may be that it can withstand certain environmental extremes typically only experienced outdoors.

In some embodiments the apparatus may include a light-emitting diode ("LED") group. The group may include one or more LEDs. The group may be mounted to a lamina having break-away or cuttable connection to a lamina or laminae contiguous with the lamina.

The lamina may include one or more layers of one or more materials. The layers may include a printed circuit board circuit layer. The layers may include a dielectric layer. The layers may include a substrate. The circuit layer may be flexible. A flexible lamina may include not substrate. A rigid lamina may include a substrate. The substrate may include aluminum. The substrate may include fiberglass. The substrate may include glass. The substrate may include polymer.

Table 8 illustrates illustrative ranges of lamina thickness.

TABLE 8

Illustrative ranges for lamina thickness.
Illustrative ranges for lamina thickness (in.)

| Range | | Range | | Range | | Range | |
| --- | --- | --- | --- | --- | --- | --- | --- |
| Lower | Upper | Lower | Upper | Lower | Upper | Lower | Upper |
| | <0.02 | | | | | | |
| 0.01 | 0.02 | 0.11 | 0.12 | 0.21 | 0.22 | 0.31 | 0.32 |
| 0.02 | 0.03 | 0.12 | 0.13 | 0.22 | 0.23 | 0.32 | 0.33 |
| 0.03 | 0.04 | 0.13 | 0.14 | 0.23 | 0.24 | 0.33 | 0.34 |
| 0.04 | 0.05 | 0.14 | 0.15 | 0.24 | 0.25 | 0.34 | 0.35 |
| 0.05 | 0.06 | 0.15 | 0.16 | 0.25 | 0.26 | 0.35 | 0.36 |
| 0.06 | 0.07 | 0.16 | 0.17 | 0.26 | 0.27 | 0.36 | 0.37 |
| 0.07 | 0.08 | 0.17 | 0.18 | 0.27 | 0.28 | 0.37 | 0.38 |
| 0.08 | 0.09 | 0.18 | 0.19 | 0.28 | 0.29 | 0.38 | 0.39 |
| 0.09 | 0.1 | 0.19 | 0.2 | 0.29 | 0.3 | 0.39 | 0.4 |
| 0.1 | 0.11 | 0.2 | 0.21 | 0.3 | 0.31 | >0.4 | |

Table 9 illustrates illustrative ranges of dielectric layer thickness.

TABLE 9

Illustrative ranges for dielectric layer thickness
Illustrative ranges for dielectric layer thickness (in.)

| Range | | Range | | Range | |
| --- | --- | --- | --- | --- | --- |
| Lower | Upper | Lower | Upper | Lower | Upper |
| | <0.02 | | | | |
| 0.01 | 0.02 | 0.11 | 0.12 | 0.21 | 0.22 |
| 0.02 | 0.03 | 0.12 | 0.13 | 0.22 | 0.23 |
| 0.03 | 0.04 | 0.13 | 0.14 | 0.23 | 0.24 |
| 0.04 | 0.05 | 0.14 | 0.15 | 0.24 | 0.25 |
| 0.05 | 0.06 | 0.15 | 0.16 | 0.25 | 0.26 |
| 0.06 | 0.07 | 0.16 | 0.17 | 0.26 | 0.27 |
| 0.07 | 0.08 | 0.17 | 0.18 | 0.27 | 0.28 |
| 0.08 | 0.09 | 0.18 | 0.19 | 0.28 | 0.29 |
| 0.09 | 0.1 | 0.19 | 0.2 | 0.29 | 0.3 |
| 0.1 | 0.11 | 0.2 | 0.21 | >0.3 | |

The lamina may include one or more segments. A segment may be joined to one or more other segments at a separation line. Segments may have a shape, in plain view, which is rectangular, square, curved, parallelogrammatic, rhombic, trapezoidal, irregular, or any other suitable shape or form. Separation lines may be straight, curved, or have any suitable configuration. Segments may be contiguous. Segments may be non-contiguous. Two or more segments may be arranged along a first direction x. Two or more segments may be arranged along a second direction y. The first and second directions may be different. The first and second directions may be perpendicular to each other.

The group may be in electrical communication with an integrated circuit that is mounted on the lamina. The integrated circuit may be configured to receive input at three terminals. The integrated circuit may be configured to receive input at fewer than three terminals. The integrated circuit may be configured to receive input at more than three terminals. The integrated circuit may function to drive one or more LEDs based solely on input received from: 1) a high-voltage supply from the controller; 2) a data output from the controller; and 3) a low-voltage or reference voltage from the controller.

The integrated circuit may be configured to receive input at a first terminal. The first terminal may be designated to receive a user command. The user command may change an operational state of an LED.

The integrated circuit may be configured to receive input at a second terminal. The second terminal may be designated to receive an operational voltage to support IC operations.

The integrated circuit may be configured to receive input at a third terminal. The third terminal may be designated to receive a reference voltage.

The integrated circuit may be the only integrated circuit on the lamina. The lamina may include one or more segments.

The group may be mounted on the lamina. The group may be mounted in a segment of the lamina. One or more segments may support one or more groups.

The group may include a first LED. The group may include a second LED. The group may include a third LED. The group may include the first LED, the second LED and the third LED. The group may include only the first LED, the second LED and the third LED.

The group may include a red LED. The group may include a green LED. The group may include a blue LED. The group may include a white LED having a first CCT. The group may include a white LED having a second CCT. The second CCT may be different from the first CCT. The group may include the red LED, the green LED, the blue LED, the white LED having a first CCT and the white LED having a second CCT. The group may include only the red LED, the green LED, the blue LED, the white LED having a first CCT and the white LED having a second CCT.

The group may include a white LED having a first CCT. The group may include a white LED having a second CCT. The group may include a white LED having a third CCT. The third CCT may be different from the first CCT and the second CCT. The second CCT may be different from the first CCT. The group may include the white LED having a first CCT, the white LED having a second CCT, and the white LED having a third CCT. The group may include only the white LED having a first CCT, the white LED having a second CCT, and the white LED having a third CCT.

The LED may be configured to emit white light having a first CCT. The LED may be configured to emit white light having a second CCT that is different from the first CCT. The LED may be configured to emit white light having a first CCT and white light having a second CCT that is different from the first CCT.

The group may include a white LED having a first CCT; and a white LED having: a second CCT and a third CCT. The third CCT may be different from the first CCT and the second CCT. The second CCT may be different from the first CCT.

The user command may conform to a lighting format. The format may include a digital multiplexing format. Table 10 lists illustrative input formats.

TABLE 10

Illustrative formats.
Illustrative formats

DMX (e.g., in conformance with an American National Standards Institute standard "E1.11 - 2008, USITT DMX512-A", a/k/a "DMX512-A".
DALI (Digital Addressable Lighting Interface)
Triac or ELV (Phase cut dimmer signal)
0-10 V dimmer signal
Z-wave (code and apparatus from Z-wave Alliance, Beaverton, Oregon)
Zigbee (code and apparatus from Zigbee Alliance, of San Ramon, California)
Custom-user defined TABLE 10-continued Illustrative formats.
Illustrative formats Default-provided in memory
Other third-party control protocol
Other suitable input formats Illustrative embodiments of apparatus and methods in accordance with the principles of the invention will now be described with reference to the accompanying drawings, which form a part hereof. It is to be understood that other embodiments may be utilized and that structural, functional and procedural modifications or omissions may be made without departing from the scope and spirit of the present invention.

Some embodiments may omit features shown and/or described in connection with the illustrative apparatus. Some embodiments may include features that are neither shown nor described in connection with the illustrative apparatus. Features of illustrative apparatus may be combined. For example, one illustrative embodiment may include features shown in connection with another illustrative embodiment.

Embodiments may involve some or all of the features of the illustrative apparatus and/or some or all of the steps of the methods associated therewith.

FIG. 1 shows illustrative lighting control system 100. Power source 102 may receive line voltage 110. Power source 102 may decrease line voltage 110. Power source 102 may output voltage 112. Voltage 112 may be less than line voltage 110.

Power source 102 may be electronic communication with a lighting controller (not shown). The lighting controller may include a software application that may be executed on a mobile device, dedicated lighting controller or any other suitable computing device. The lighting controller may include any suitable manual lighting controllers. A user may select lighting control information via the lighting controller. The lighting control information may be transmitted to the power source.

Power source 102 may include a PLC encoder (not shown). The PLC encoder may encode the lighting control information. The PLC encoder may encode the light level within voltage 112. Power source 102 may provide voltage to controller unit 104 via voltage channel 114. Power source 102 may transmit the light level to controller unit 104 via lighting information channel 116. The voltage and the light level may be transmitted in parallel via voltage channel 114 and lighting information channel 116.

Controller unit 104 may include voltage conversion circuitry 118. Voltage conversion circuitry 118 may perform power factor correction. Voltage conversion circuitry 118 may include one or more buck converters. Voltage conversion circuitry 118 may include boost circuitry. Voltage conversion circuitry 118 may include power factor correction circuitry. Voltage conversion circuitry 118 may include any other suitable conversion circuitry. Voltage conversion circuitry 118 may receive voltage 112. Voltage conversion circuitry 118 may receive voltage 112 via voltage channel 114. Voltage conversion circuitry 118 may convert voltage 112 to voltage 128. Voltage 112 may be an AC voltage. Voltage 128 may be a DC voltage. Voltage 112 may include any suitable voltages as those listed in Table 1. Voltage 128 may include any suitable voltages as those listed in Table 4. Voltage 128 may be greater than voltage 112.

Controller unit 104 may include PLC module 120. PLC module 120 may receive the encoded lighting control information. PLC module 120 may receive the encoded lighting control information via lighting information channel 116. PLC module 120 may include decoder circuitry. PLC module 120 may decode the encoded lighting control information using the decoder circuitry. PLC module 120 may transmit the lighting control information to microcontroller 122.

Microcontroller 122 may receive the lighting control information. Microcontroller 122 may obtain a light level from the lighting control information. Microcontroller 122 may transmit a pulse width modulated ("PWM") signal to LED cathode output driver 126. Microcontroller 122 may determine the PWM signal based on the light level.

The lighting control information may include one or more light levels. Each of the one or more light levels may correspond to a different LED. Each of the one or more light levels may correspond to a different color LED. Each of the one or more light levels may correspond to LEDs with different CCTs. Microcontroller 122 may determine a PWM signal for each light level included in the lighting control information. Microcontroller 122 may transmit the PWM signals for each light level to LED cathode output driver 126.

Controller unit 104 may include overcurrent protection circuitry 124. Overcurrent protection circuitry 124 may protect controller unit 104 from overcurrent, over-voltage, and short-circuit conditions. Overcurrent protection circuitry 124 may output voltage 128.

Overcurrent protection circuit may output voltage 128 to fixtures 106 through 108. Fixtures 106 through 108 may include any suitable number of fixtures 1-N. Voltage 128 may be a constant voltage.

LED cathode output driver 126 may include one or more MOSFETS. Each of the one or more MOSFETS may provide controlled current based on the PWM signal received from microcontroller 122. Each of the one or more MOSFETS may produce controlled current to fixtures 106 through 108. Controlling the current may provide light at the one or more desired light levels.

Each of fixtures 106 through 108 may include one or more LED light sources. LED cathode output driver 126 may have one or more current output channels. Each current output channel may correspond to one or more LED light sources. Each current output channel may correspond to a specific color LED. Each current output channel may correspond to a specific CCT LED. LED cathode output driver 126 may provide controlled current through each current output channel to the corresponding one or more LED light sources. Each current output channel may control/regulate a different amount of current. Each current output channel may draw the same amount of current.

Controller unit 104 may be disposed in a housing. Fixtures 106 through 108 may include a light tape. Fixtures 106 through 108 may include any suitable fixture. Fixtures 106 through 108 may only include LEDs and corresponding resistors. Fixtures 106 through 108 may be configured such that they do not include any of controller unit 104. Controller unit 104 may be structurally separate from fixtures 106 through 108. Controller unit 104 may be in electronic communication with fixtures 106 through 108.

Figure 2:
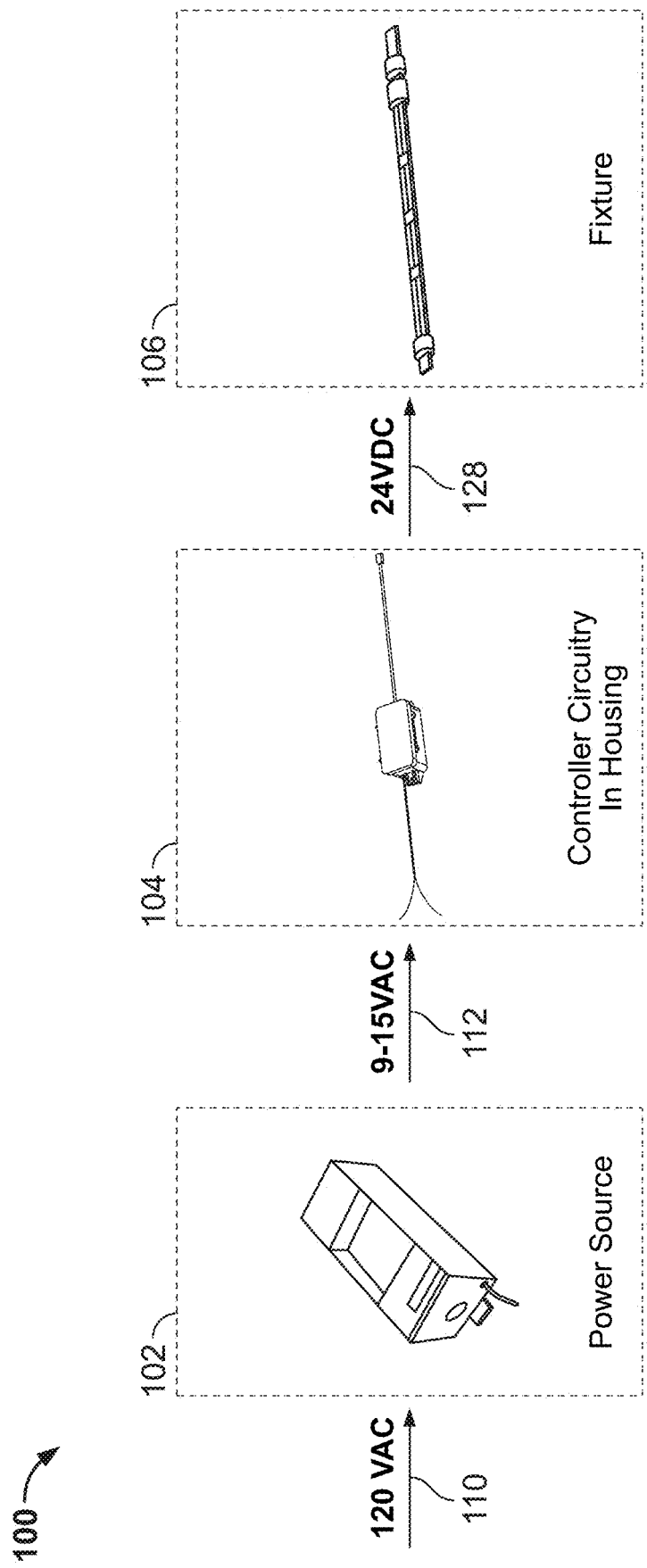
FIG. 2 shows schematically illustrative apparatus in accordance with the principles of the invention.

FIG. 2 shows illustrative schematics of lighting control system 100.

Figure 3:
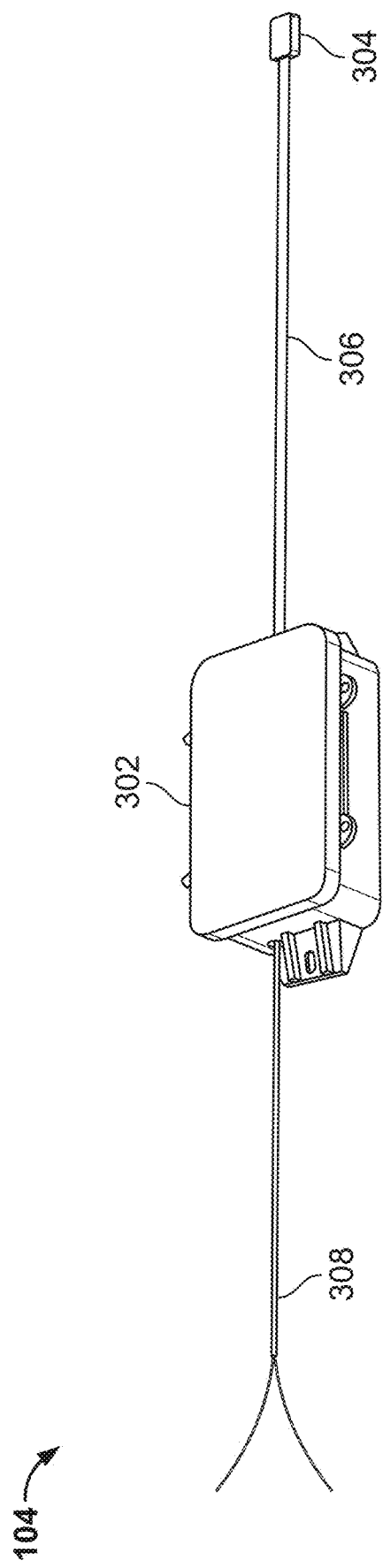
FIG. 3 shows illustrative apparatus in accordance with the principles of the invention.

FIG. 3 shows controller unit 104.

Controller unit 104 may be disposed in housing 302. Housing 302 may be connected to cable 308. Cable 308 may include one or more wires. One wire may be a hot wire. One wire may be a neutral wire. Voltage 112 may be transmitted from power source 102 to controller unit 104 via cable 308. Lighting control information may be transmitted from power source 102 to controller unit 104 via cable 308.

Voltage 128 may be transmitted from controller unit 104 to fixtures 106 through 108 via cable 306. Cable 306 may transmit current from LED cathode output driver 126 to fixtures 106 through 108.

Cable 306 may include connector 304. Connector 304 may enable transmission of voltage and current from controller unit 104 to fixtures 106 through 108. Connector 304 may include first contacts. Fixtures 106 through 108 may include a second connector. The second connector may include second contacts. The first and second contacts may include pins, threads, conductors, or any other suitable contacts. Contact between the first contacts and the second contacts may enable transmission of voltage and current from controller unit 104 to fixtures 106 through 108.

Figure 4:
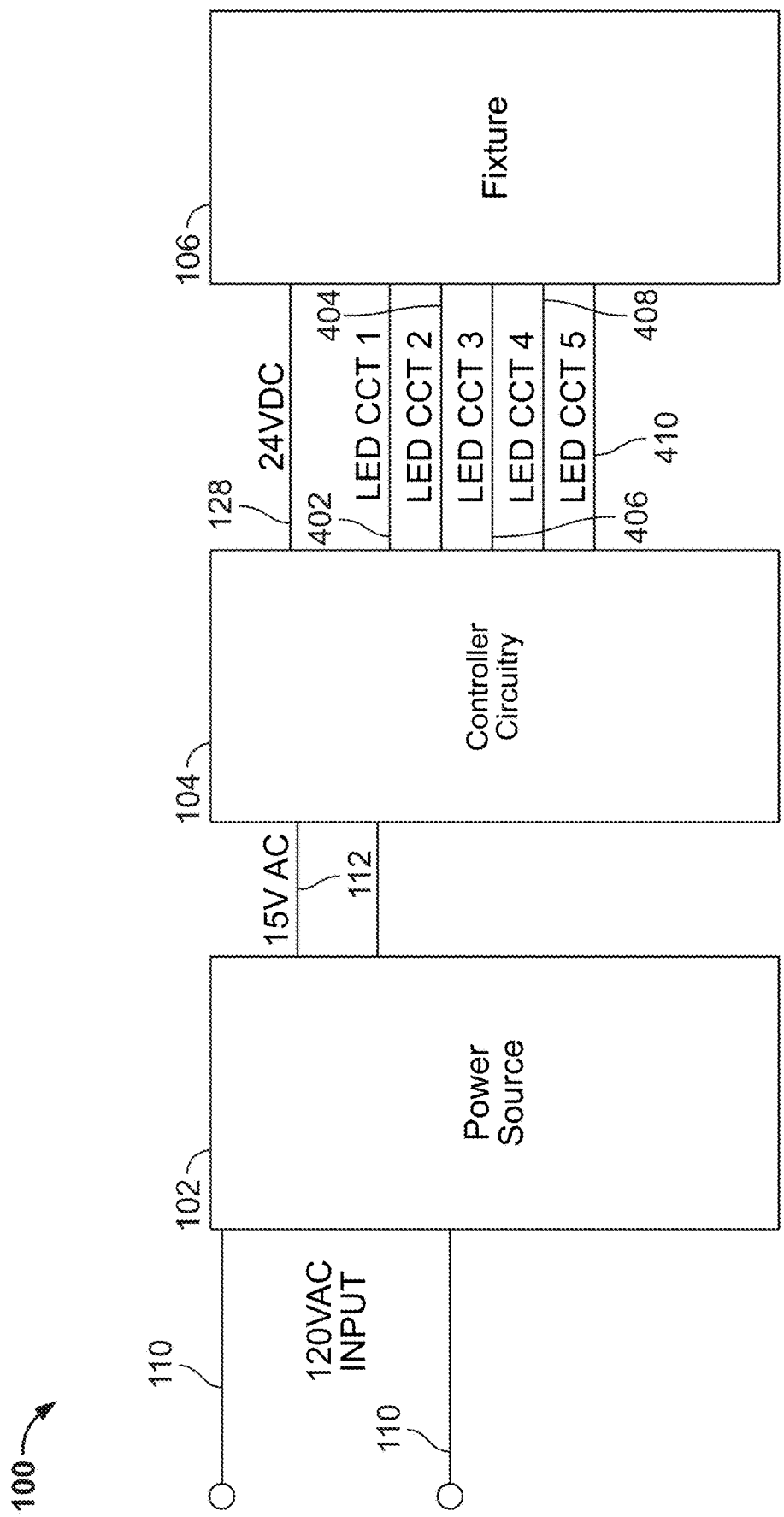
FIG. 4 shows schematically illustrative apparatus in accordance with the principles of the invention.

FIG. 4 illustrative schematics of lighting control system 100.

Power source 102 may receive line voltage 110. Power source 102 may receive line voltage via two wires. One wire may be a hot wire. One wire may be a neutral wire. Power source 102 may transmit voltage 112 to controller unit 104. Power source 102 may transmit voltage 112 to controller unit 104 via two wires. One wire may be a hot wire. One wire may be neutral wires.

Controller unit 104 may transmit voltage 128 to fixture 106 (fixture 106 may include fixtures 106 through 108). Controller unit 104 may transmit voltage 128 to fixture 106 via one wire. Controller unit 104 may provide controlled current to fixture 106. Controller unit 104 may provide controlled current to fixture 106 via current output channels 402, 404, 406, 408 and 410.

Current output channel 402 may correspond to an LED with a first CCT. Current output channel 404 may correspond to an LED with a second CCT. Current output channel 406 may correspond to an LED with a third CCT. Current output channel 408 may correspond to an LED with a fourth CCT. Current output channel 410 may correspond to an LED with a fifth CCT. The first, second, third, fourth, and fifth CCTs may be different CCTs, the same CCTs, or any suitable combination thereof. Controller unit 104 may include any suitable number of current output channels that correspond to any suitable number of CCTs.

Figure 5:
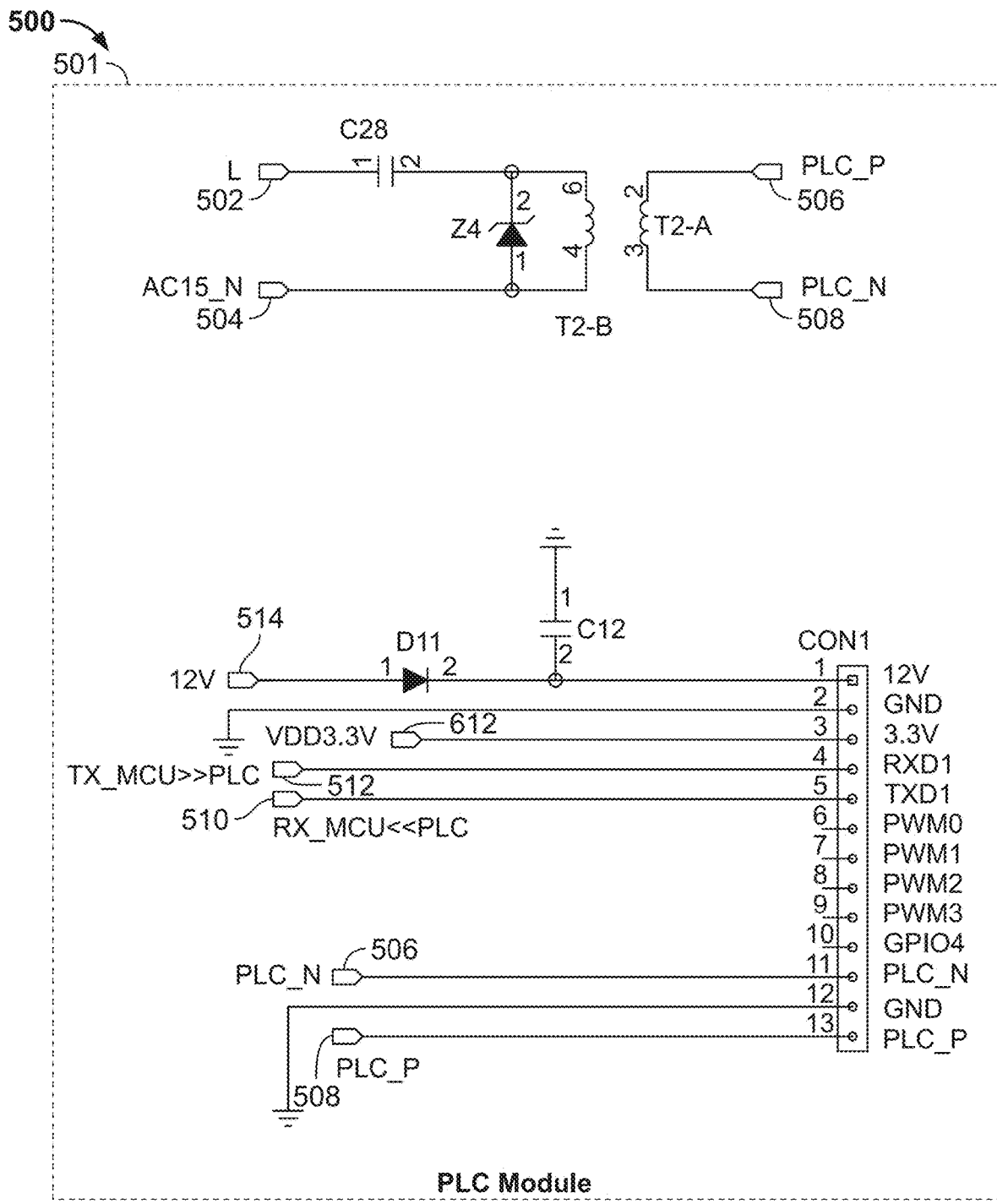
FIG. 5 shows schematically illustrative apparatus in accordance with the principles of the invention.

FIG. 5 shows illustrative controller unit circuitry 500. Controller unit circuitry 500 may have one or more features in common with controller unit 104.

Controller unit circuitry 500 may include PLC module connector circuitry 501. PLC module connector circuitry 501 may have one or more features in common with PLC module 120.

PLC module connector circuitry 501 may be configured to connect to a PLC encoder/decoder module (for example, Model No. PLM4010B-B111-HC1S, available from Shenzhen Lihe Microelectronics Co., Ltd., 11F, Research Building, Tsinghua Info-port, North of Hi-Tech Industrial Park, Nanshan District, Shenzhen, Guangdong, P. R. C.; not shown).

PLC module circuitry 501 may be included in a power source (not shown).

When PLC module connector circuitry 501 is included in the power source, the PLC encoder/decoder module may encode lighting control information into an analog PLC signal. PLC module connector circuitry 501 may output the analog PLC signal at inputs 506 (PLC_N) and 508 (PLC_P), which may be in communication with corresponding PLC encoder/decoder.

PLC module connector circuitry 501 may include an inductive coupling transmitter. The inductive coupling transmitter may output inputs 506 (PLC_N) and 508 (PLC_P). The inductive coupling receiver may couple inputs 506 (PLC_N) and 508 (PLC_P) to line voltage 502 (L) and 504 (AC15_N).

PLC module connector circuitry 501 may be disposed in a housing that is separate from the power source (not shown).

When PLC module connector circuitry 501 is included in the housing, the PLC encoder/decoder module may decode lighting control information into an analog PLC signal. PLC module connector circuitry 501 may receive the analog PLC signal at inputs 506 (PLC_N) and 508 (PLC_P).

PLC module connector circuitry 501 may include an inductive coupling receiver. The inductive coupling receiver may receive inputs 506 (PLC_N) and 508 (PLC_P). The inductive coupling receiver may couple inputs 506 (PLC_N) and 508 (PLC_P) to line voltage 502 (L) and 504 (AC15_N).

The PLC encoder/decoder module may have a carrier operating frequency of 2.4-5.7 MHz, may have a communication rate of 120 kbps-1.2 Mbps and a point-to-point communication distance of 200-500 meters, and may work on power transmission lines having AC power at 50 or 60 Hz or DC power.

PLC module connector circuitry 501 may transmit the analog PLC signal to microcontroller 503. PLC module connector circuitry 501 may be electronic communication with microcontroller 503 via terminal 512 (TX_MCU>>PLC) and terminal 510 (RX_MCU>>PLC). PLC module connector circuitry 501 may transmit the analog PLC signal to microcontroller 503 via terminal 512 (TX_MCU>>PLC).

PLC module connector circuitry 501 may receive input voltage 514 (12V). PLC module connector circuitry 501 may receive input voltage 612 (VDD3.3V).

Figure 6:
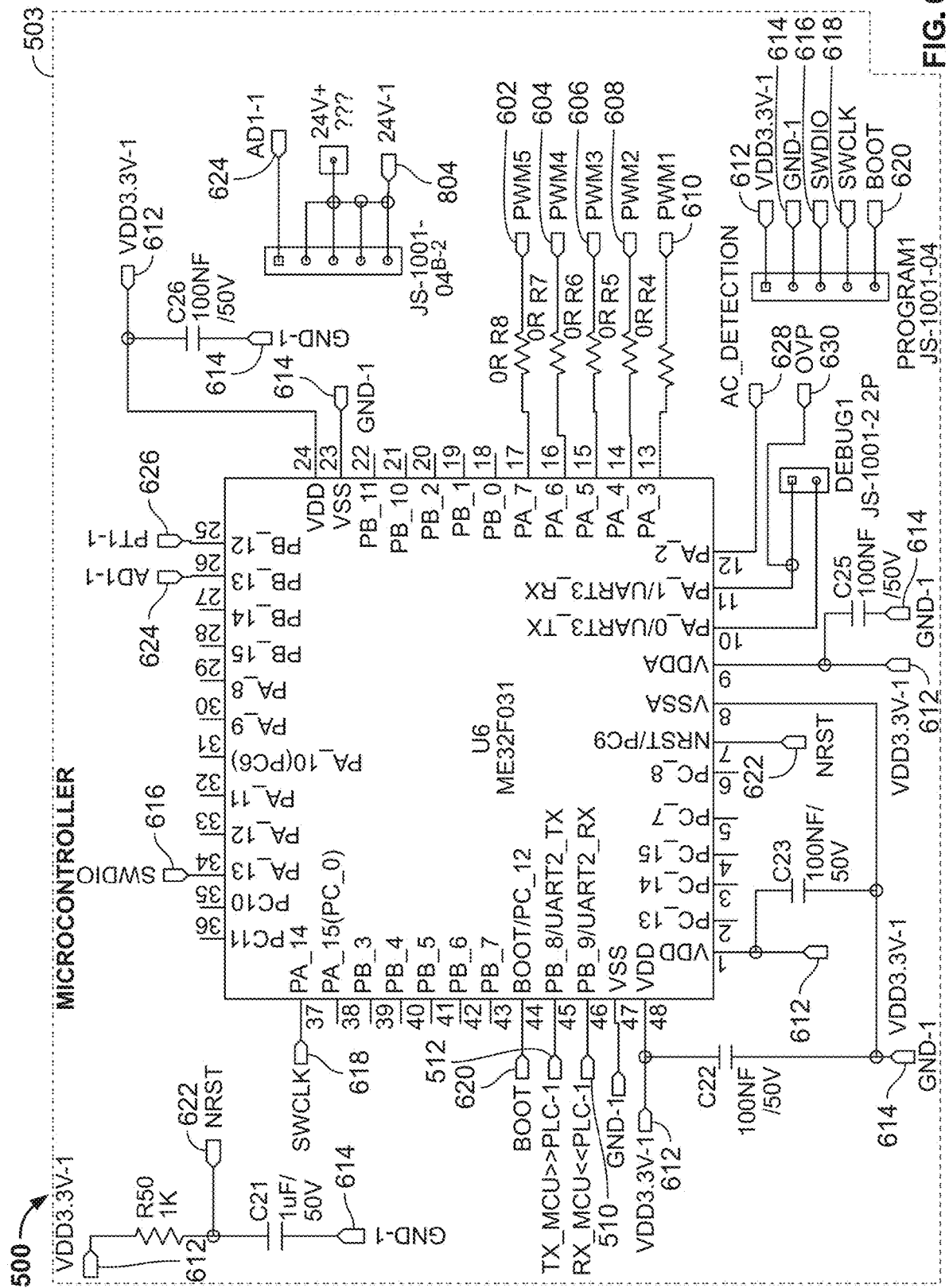
FIG. 6 shows schematically illustrative apparatus in accordance with the principles of the invention.

FIG. 6 shows more of controller unit circuitry 500. Microcontroller 503 may have one or more features in common with microcontroller 122.

Microcontroller 503 may receive the analog PLC signal via terminal 510 (RX_MCU>>PLC). The analog PLC signal may include lighting control information. The lighting control information may include one or more light levels. Microcontroller 503 may obtain the one or more light levels from the lighting control information.

Microcontroller 503 may transmit the one or more light levels to LED cathode output driver 505. Microcontroller 503 may transmit the one or more light levels via terminal 610 (PWM1), terminal 608 (PWM2), terminal 606 (PWM3), terminal 604 (PWM4) and terminal 602 (PWM5).

Microcontroller 503 may receive input voltage 612 (VDD3.3V). Input voltage 612 may be received from VDD additional circuit component 515. Input voltage 612 may power microcontroller 503.

Microcontroller 503 may be connected to ground via terminal 614.

Microcontroller 503 may include terminal 620 (BOOT). Microcontroller 503 may be in electronic communication with VDD power supply 511 via terminal 628 (AC_DETECTION). Microcontroller 503 may be in electronic communication with VCC power supply 513 via terminal 630 (OVP).

Microcontroller 503 may include SWDIO terminal 616. SWDIO terminal 616 may be a bidirectional data pin. SWDIO terminal 616 may transfer data. Microcontroller 503 may include SWDCLK terminal 618. SWDCLK terminal 618 may clock data. Microcontroller 503 may include reset terminal 622 (NRST).

Microcontroller 503 may be in electronic communication with overcurrent protection circuitry 509. Microcontroller 503 may be in electronic communication with overcurrent protection circuitry 509 via terminal 624 (AD1_1) and terminal 626 (PT1-1).

Figure 7:
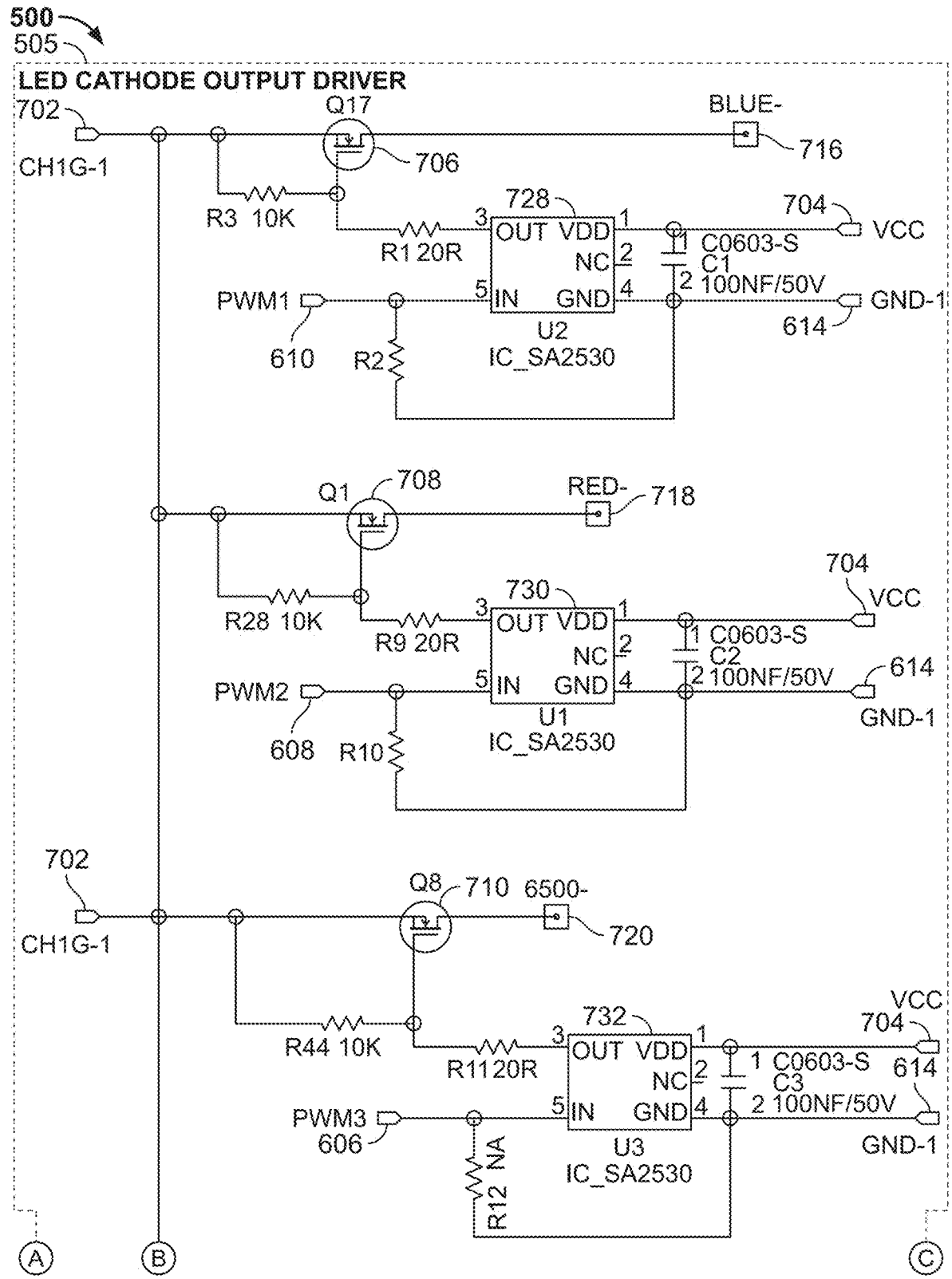
FIG. 7 shows schematically illustrative apparatus in accordance with the principles of the invention.
Figure 7:
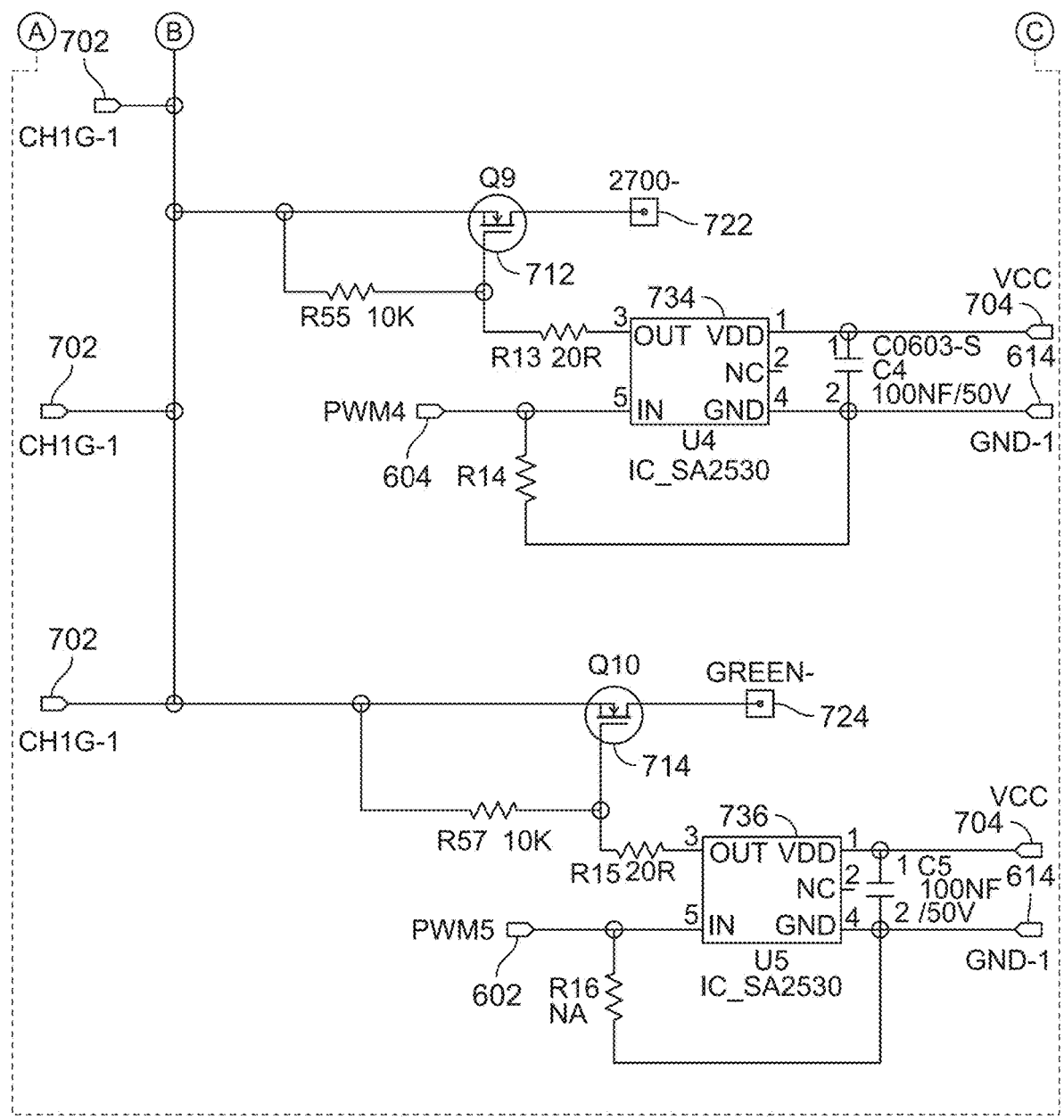

FIG. 7 shows more of controller unit circuitry 500. Controller unit circuitry 500 may include LED cathode output driver 505. LED cathode output driver 505 may have one or more features in common with LED cathode output driver 126.

LED cathode output driver 505 may include current output channel 716. LED cathode output driver 505 may receive a light level from microcontroller 503 via terminal 610 (PWM1). LED cathode output driver 505 may include integrated circuit 728 (U2). IC 728 (U2) may determine an amount of current needed to provide light at the light level. IC 728 (U2) may control/regulate MOSFET 706 (Q17) to provide the determined amount of current. MOSFET 706 (Q17) may output the determined amount of current via current output channel 716.

LED cathode output driver 505 may include current output channel 718. LED cathode output driver 505 may receive a light level from microcontroller 503 via terminal 608 (PWM2). LED cathode output driver 505 may include integrated circuit 730 (U1). IC 730 (U1) may determine an amount of current needed to provide light at the light level. IC 730 (U1) may control/regulate MOSFET 708 (Q1) to provide the determined amount of current. MOSFET 708 (Q1) may output the determined amount of current via current output channel 718.

LED cathode output driver 505 may include current output channel 720. LED cathode output driver 505 may receive a light level from microcontroller 503 via terminal 606 (PWM3). LED cathode output driver 505 may include integrated circuit 732 (U3). IC 732 (U3) may determine an amount of current needed to provide light at the light level. IC 732 (U3) may control/regulate MOSFET 710 (Q8) to provide the determined amount of current. MOSFET 710 (Q8) may output the determined amount of current via current output channel 720.

LED cathode output driver 505 may include current output channel 722. LED cathode output driver 505 may receive a light level from microcontroller 503 via terminal 604 (PWM4). LED cathode output driver 505 may include integrated circuit 734 (U4). IC 734 (U4) may determine an amount of current needed to provide light at the light level. IC 734 (U4) may control/regulate MOSFET 712 (Q9) to provide the determined amount of current. MOSFET 712 (Q9) may output the determined amount of current via current output channel 722.

LED cathode output driver 505 may include current output channel 724. LED cathode output driver 505 may receive a light level from microcontroller 503 via terminal 602 (PWM5). LED cathode output driver 505 may include integrated circuit 736 (U5). IC 736 (U5) may determine an amount of current needed to provide light at the light level. IC 736 (U5) may control/regulate MOSFET 714 (Q10) to provide the determined amount of current. MOSFET 714 (Q10) may output the determined amount of current via current output channel 724.

LED cathode output driver 505 may be connected to ground via terminal 702 (CH1G-1). ICs 728, 730, 732, 734 and 736 may receive voltage via terminal 704 (VCC). ICs 728, 730, 732, 734 and 736 may be connected to ground via terminal 614.

Figure 8:
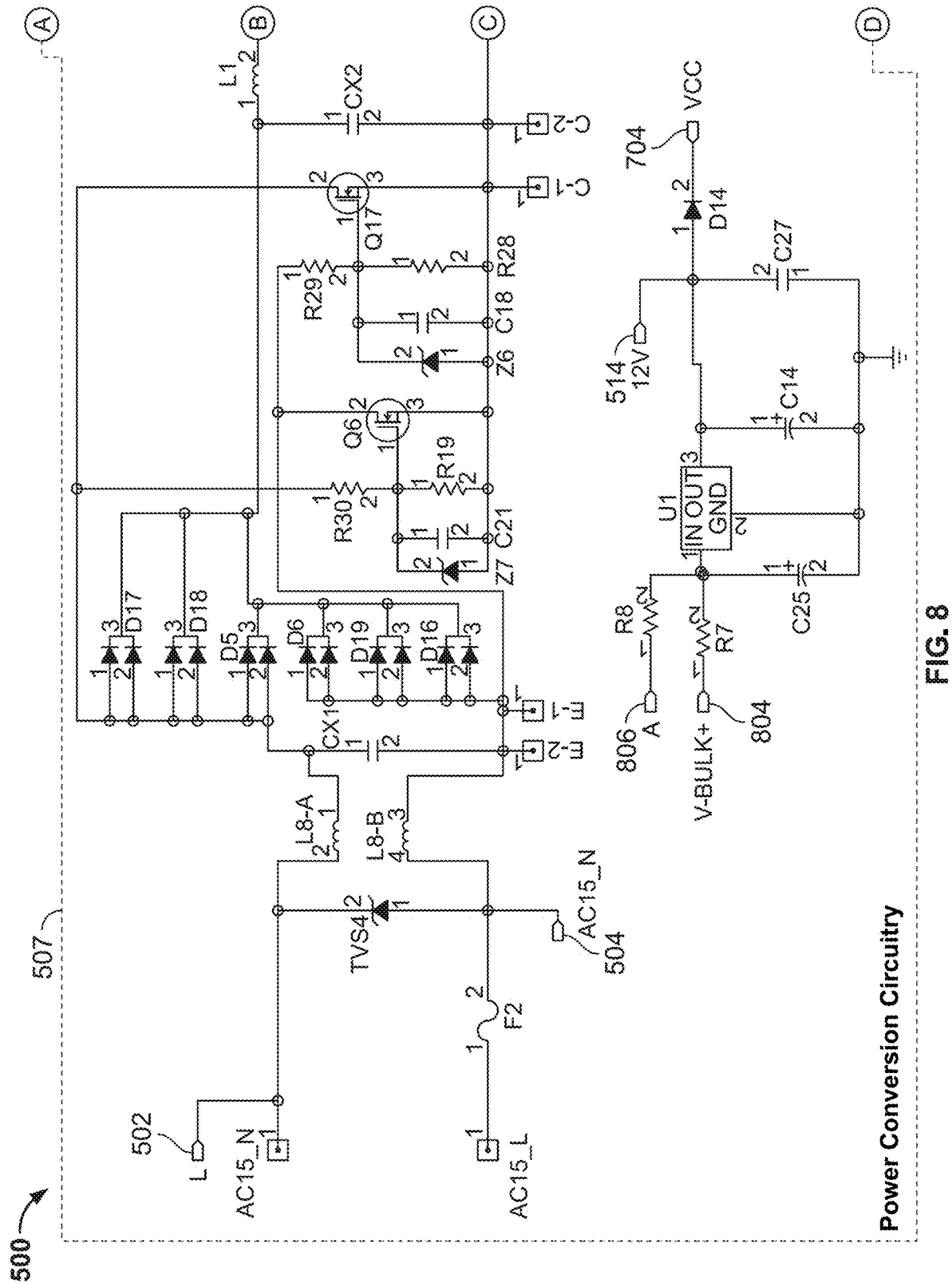
FIG. 8 shows schematically illustrative apparatus in accordance with the principles of the invention.

FIG. 8 shows more of controller unit circuitry 500. Controller unit circuitry 500 may include power conversion circuitry 507. Power conversion circuitry 507 may include one or more features in common with voltage conversion circuitry 118.

Power conversion circuitry 507 may receive line voltage 502 (L) and 504 (AC15_N). Power conversion circuitry 507 may receive line voltage 502 (L) and 504 (AC15_N) from the power source.

Power conversion circuitry 507 may convert line voltage 502 (L) and 504 (AC15_N) to output voltage 804 (24 VDC). Power conversion circuitry 507 may include power factor correction circuitry. Power conversion circuitry 507 may include buck circuitry. Power conversion circuitry 507 may include boost circuitry. Power conversion circuitry 507 may include a plurality of diodes, Zener diodes, MOSFETS, ICs, resistors and any other suitable circuitry components to convert line voltage 502 (L) and 504 (AC15_N) to output voltage 804 (24 VDC).

Power conversion circuitry 507 may output voltage 802 (V-BULK+).

Figure 9:
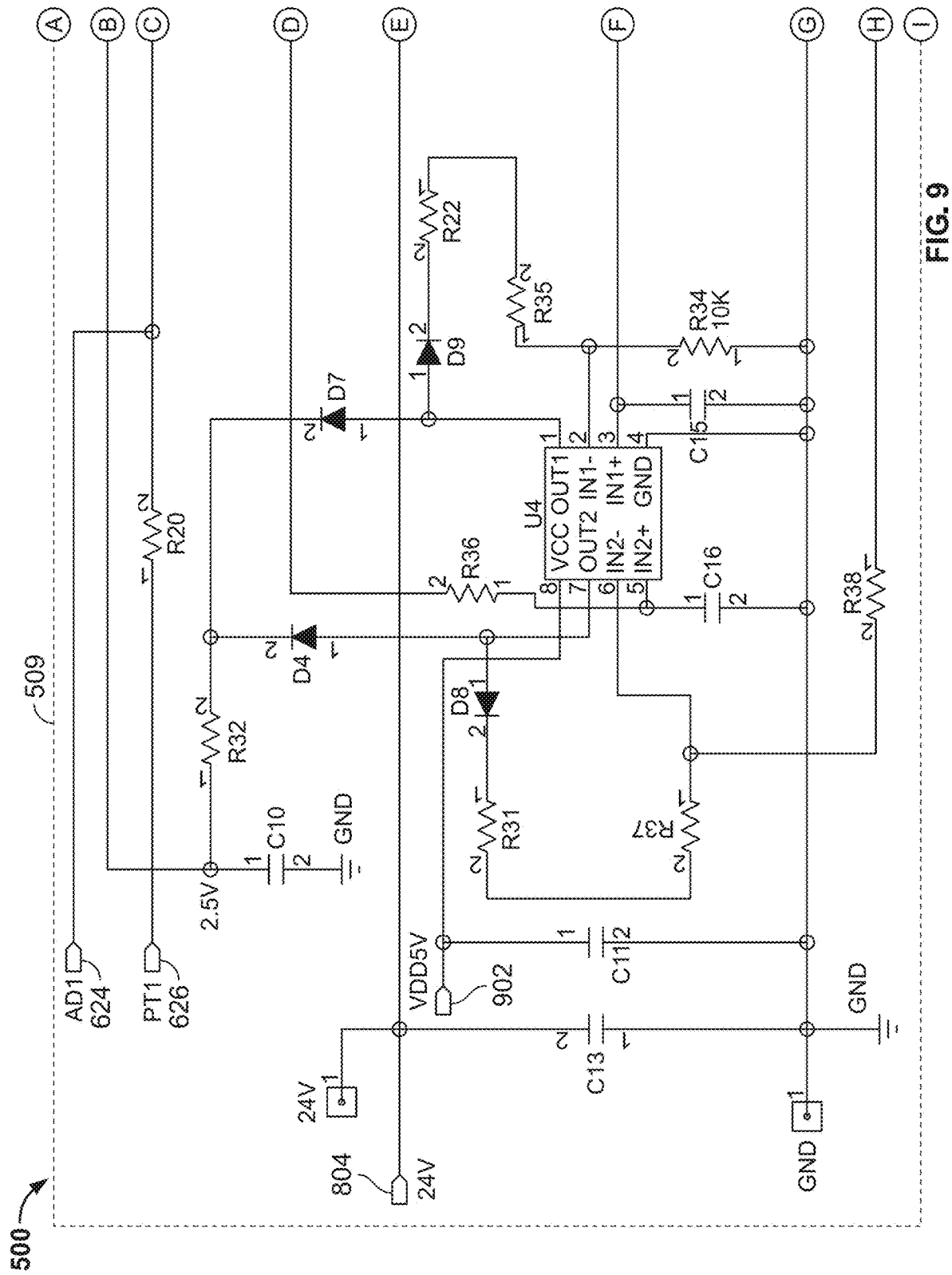
FIG. 9 shows schematically illustrative apparatus in accordance with the principles of the invention.
Figure 9:
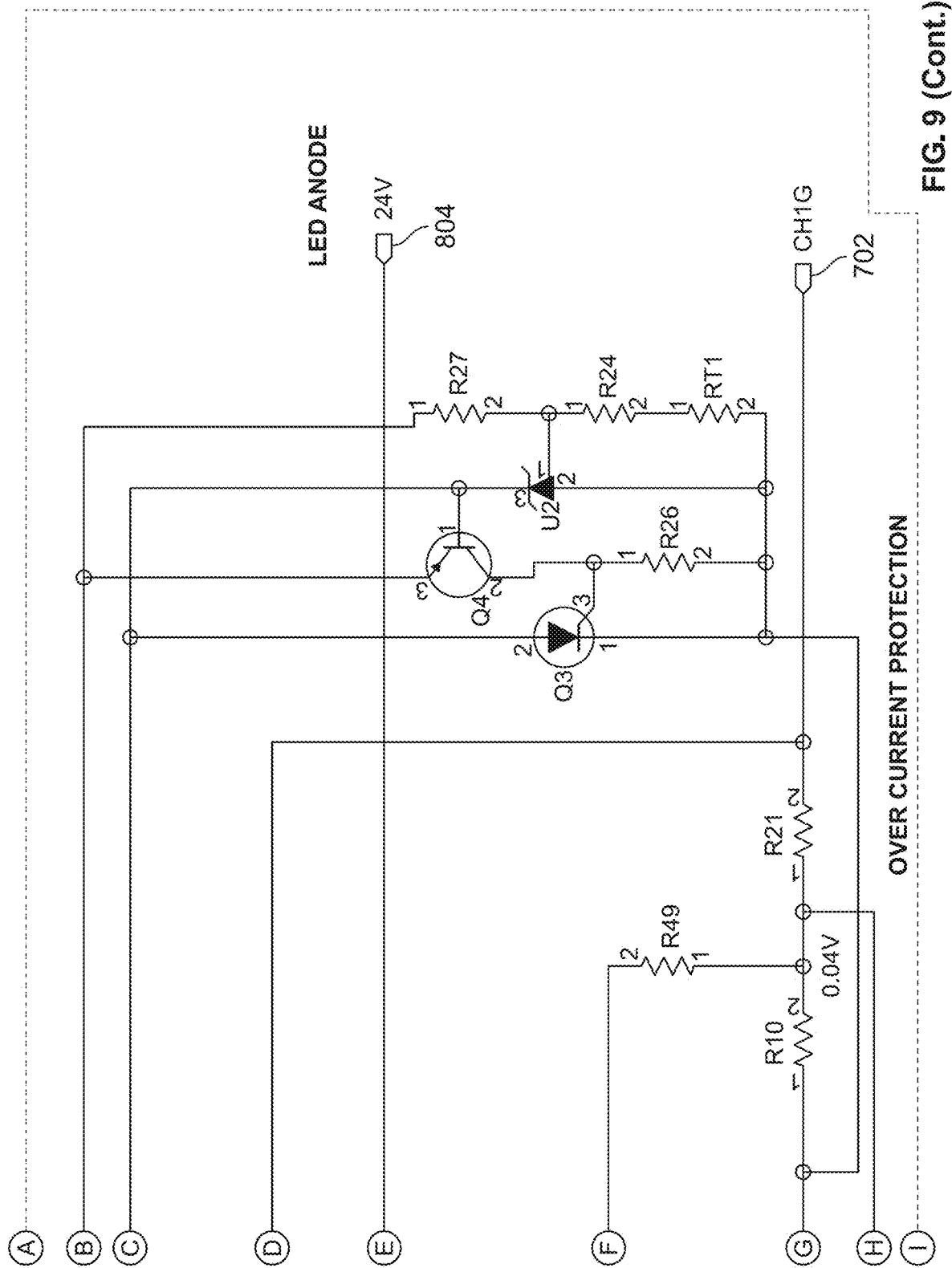

FIG. 9 shows more of controller unit circuitry 500. Controller unit circuitry 500 may include overcurrent protection circuitry 509. Overcurrent protection circuitry 509 may have one or more features in common with overcurrent protection circuitry 124.

Overcurrent protection circuitry 509 may be in electronic communication with microcontroller 503 via terminals 624 (AD1) and 626 (PT1). Overcurrent protection circuitry 509 may receive output voltage 804 (24 VDC) from power conversion circuitry 507. Overcurrent protection circuitry 509 may transmit output voltage 804 (24 VDC) to one or more connected fixtures.

Overcurrent protection circuitry 509 may receive input voltage 902. Input voltage 902 may be VDD5V. Input voltage 902 may be received from VDD power supply 511. Input voltage 902 may power overcurrent protection circuitry 509.

Overcurrent protection circuitry 509 may detect an overcurrent condition within controller unit circuitry 500. Overcurrent protection circuitry 509 may regulate current in the event of an overcurrent condition. Overcurrent protection circuitry 509 may regulate current using one or more of op-amp (U4), diodes, resistors, silicon-controlled rectifier ("SCR") gates, transistors, Zener diodes and any other suitable circuit components.

Figure 10:
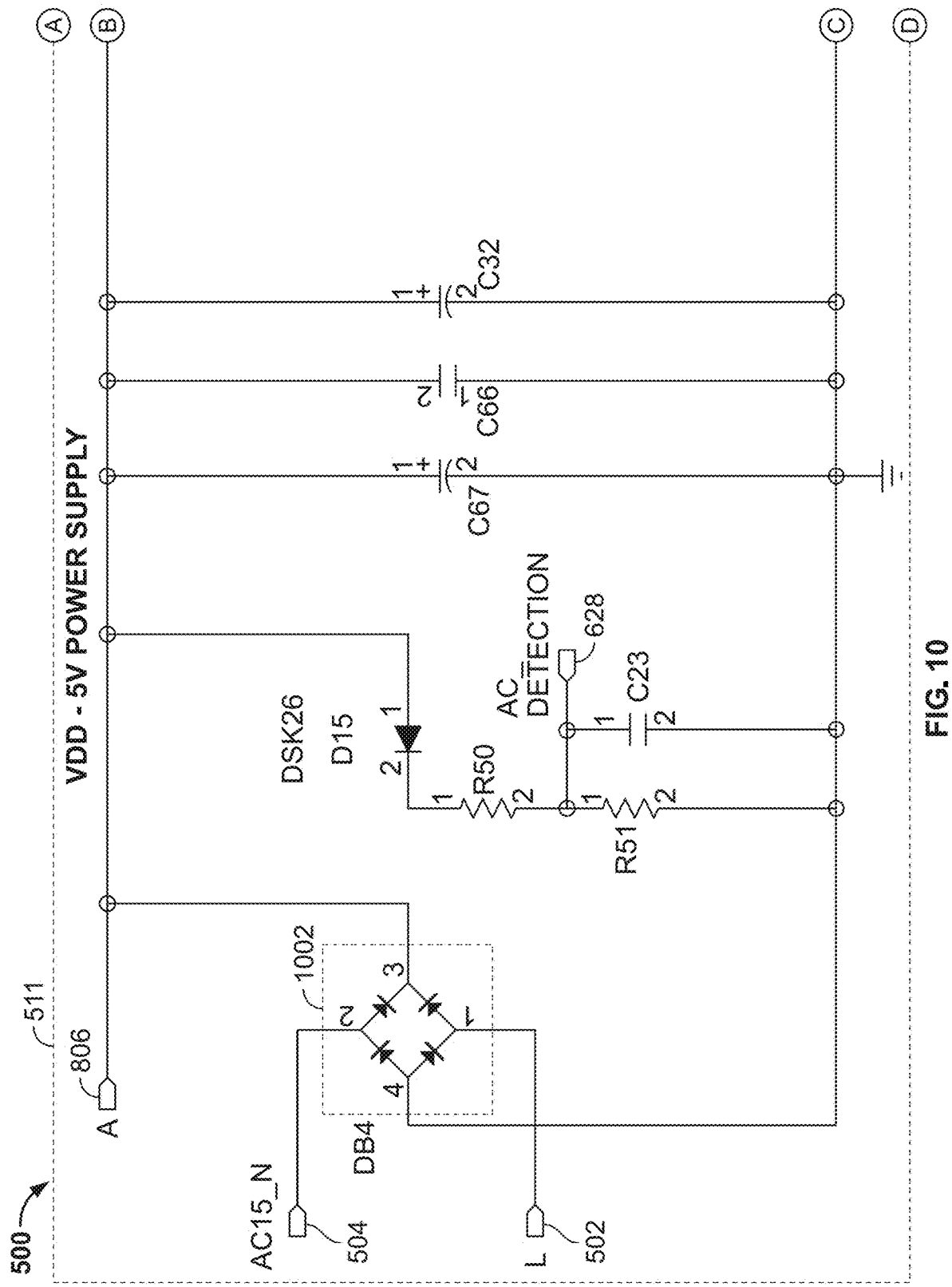
FIG. 10 shows schematically illustrative apparatus in accordance with the principles of the invention.
Figure 10:
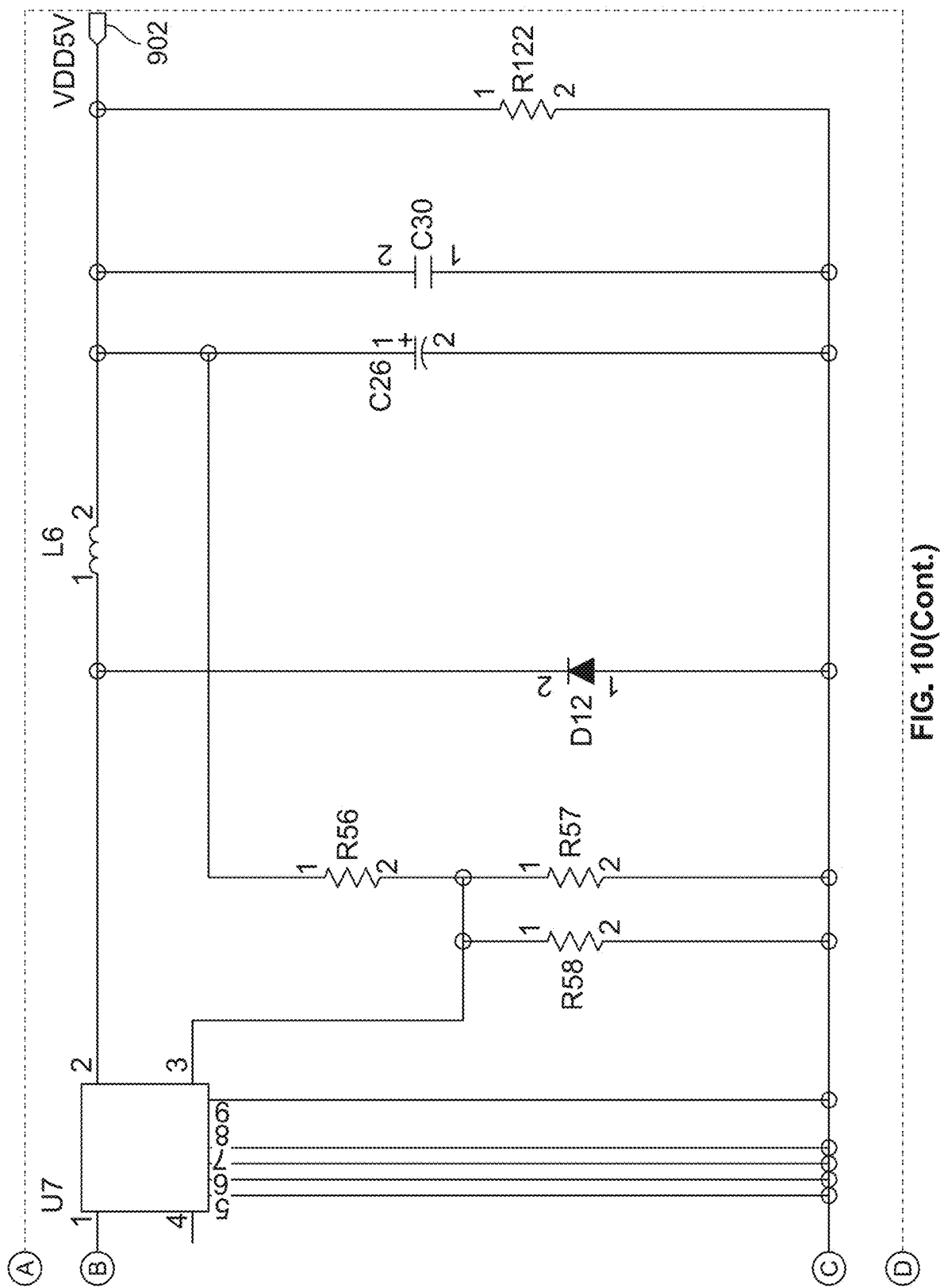

FIG. 10 shows more of controller unit circuitry 500. Controller unit circuitry 500 may include VDD power supply 511. VDD power supply 511 may receive line voltage 502 (L) and 504 (AC15_N). VDD power supply 511 may receive line voltage 502 (L) and 504 (AC15_N) from the power source.

VDD power supply 511 may include rectifier bridge 1002 (DB4). Rectifier bridge 1002 (DB4) may rectify line voltage 502 (L) and 504 (AC15_N). Rectifier bridge 1002 (DB4) may convert input AC voltage in to output DC voltage.

VDD power supply 511 may be in electronic communication with microcontroller 503 via terminal 628 (AC_DETECTION). VDD power supply 511 may be in electronic communication with power conversion circuitry 507 via terminal 806 (A).

VDD power supply 511 may convert line voltage 502 (L) and 504 (AC15_N) into output voltage 902 (VDD5V).

Figure 11:
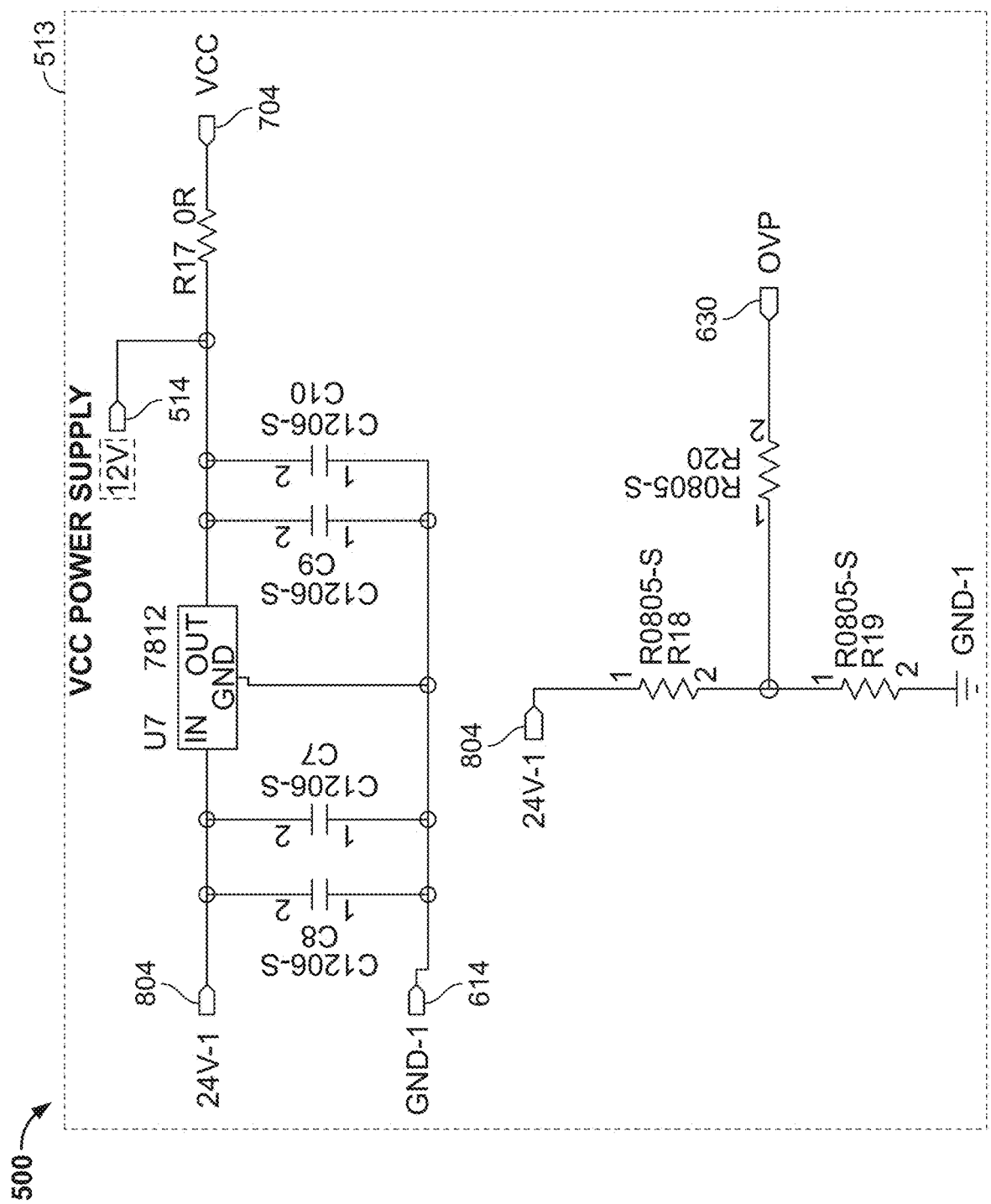
FIG. 11 shows schematically illustrative apparatus in accordance with the principles of the invention.

FIG. 11 shows more of controller unit circuitry 500. Controller unit circuitry 500 may include VCC power supply 513. VCC power supply may receive output voltage 804 (24 VDC). VCC power supply 513 may receive input voltage 514 (12V). VCC power supply 513 may output voltage through terminal 704 (VCC).

VCC power supply 513 may be in electronic communication with microcontroller 503 via terminal 630 (OVP).

Figure 12:
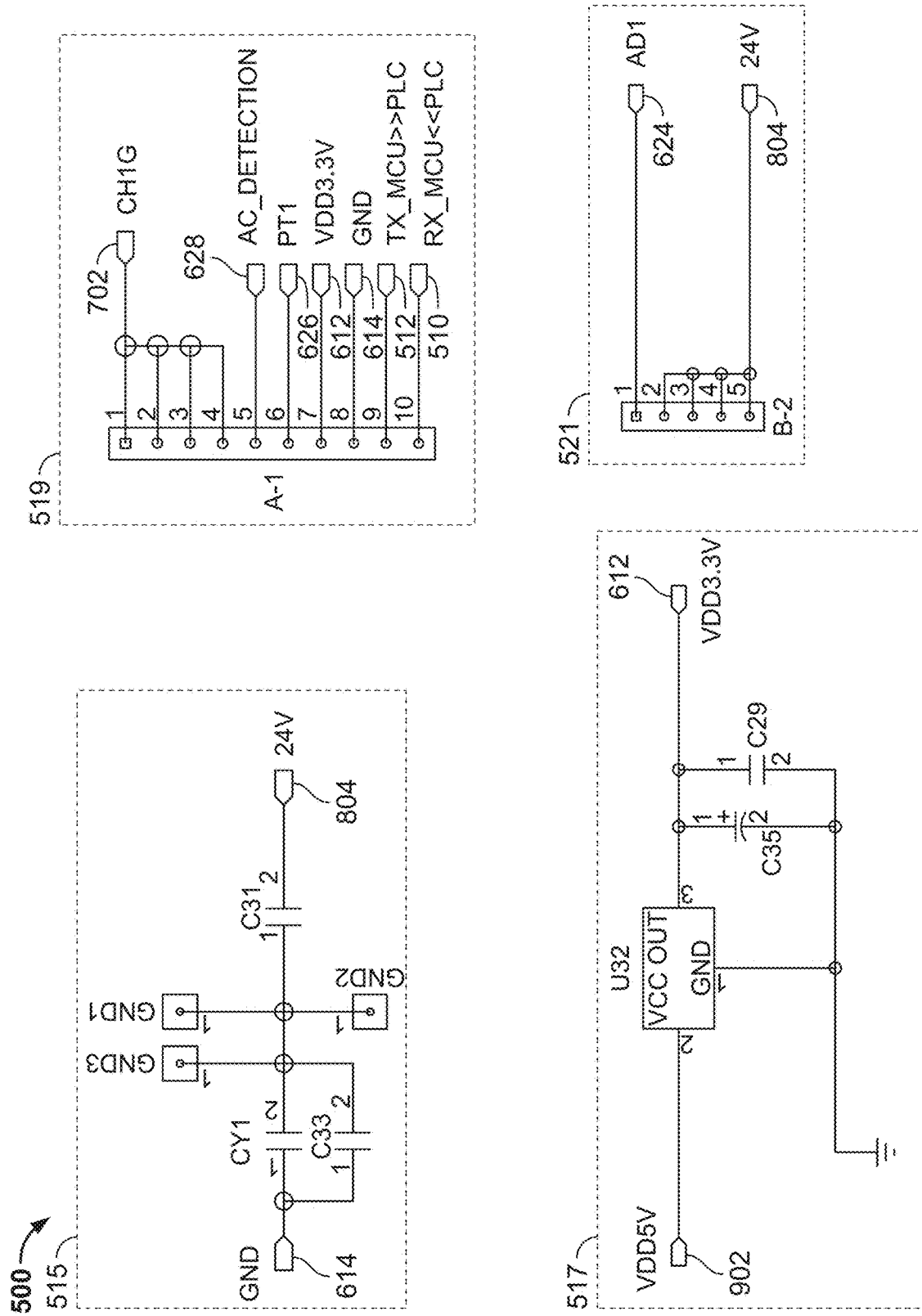
FIG. 12 shows schematically illustrative apparatus in accordance with the principles of the invention.
Figure 12:
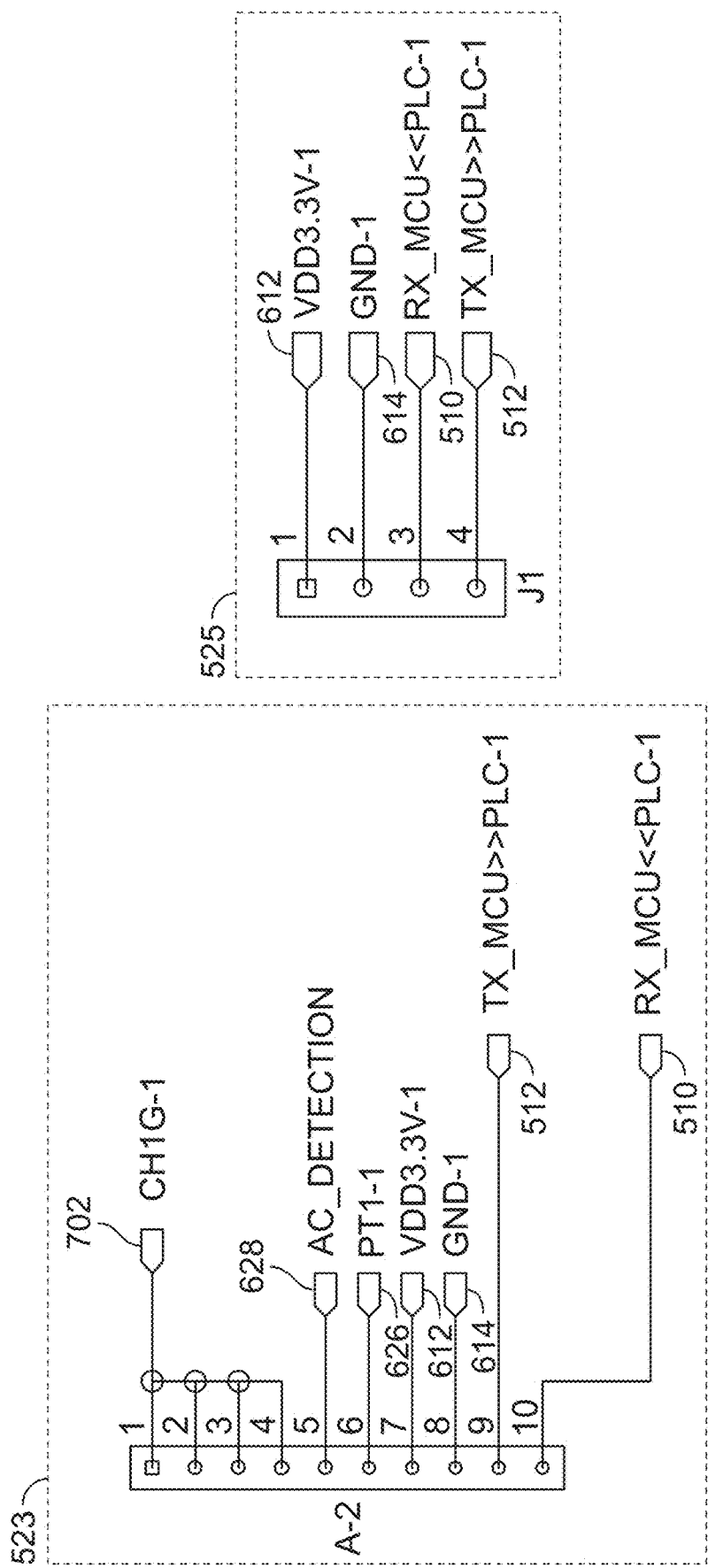
Figure 13:
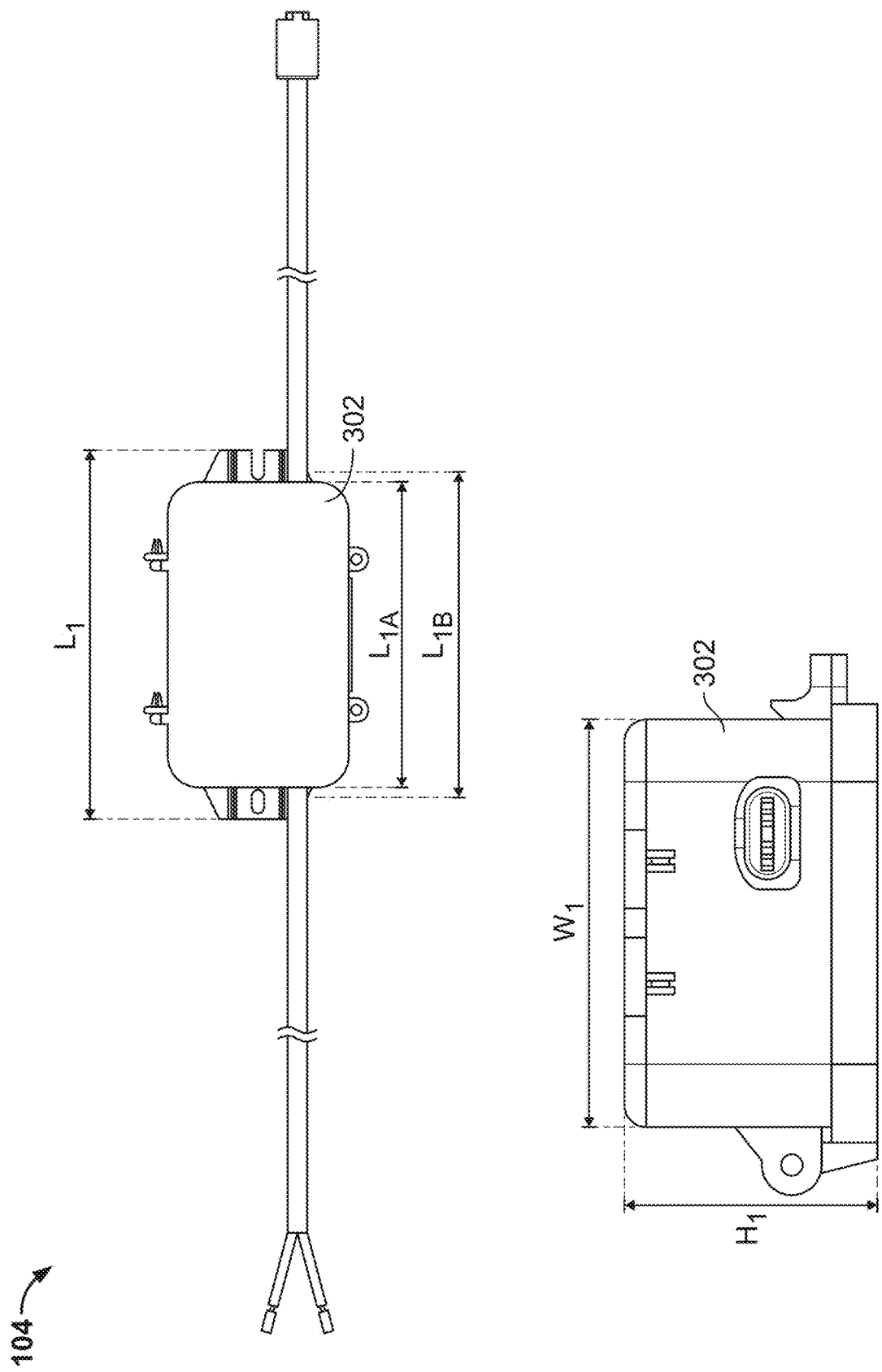
FIG. 13 shows illustrative apparatus in accordance with the principles of the invention.

FIG. 12 shows more of controller unit circuitry 500. Controller unit circuitry 500 may include additional circuitry components 515, 517, 519, 521, 523 and 525.

Table 11 lists illustrative circuit parts for controller unit circuitry 500.

TABLE 11

Illustrative circuit parts for controller unit circuitry 500.

| Item Description | Component Tag |
|---|---|
| CL21 METAL CAP 2.2 UF 63 V 10% P = 10 | CX3 CX5 |
| SCHOTTKY DIODE 40 A 100 V PS40U100CT | D1 |
| COMMMON INDUCTOR T16 × 10 × 8 | L8 |
| DIP FUSE BF4 25 A 32 V | F2 |
| SENDUST INDUCTOR 105 UH KS092090 | L2 |
| AL CAP 220 uF/35 V, ±20%, 105° C., Φ8*11.5 | C67 |
| ELECTROLYTI CAP 22 uF/50 V Φ5*11 2000 H | C14, C25 |
| ELECTROLYTI CAP 100 uF/10 V, Φ5*11 | C26, C35 |
| ECAP 4700 uF 50 V 20% 105° C. 18 × 45 mm | C1 |
| ELECTROLYTI CAP 1000 uF 35 V 105° C. Φ10*20 mm | C19 |
| INDUCTOR T16*8.5*5.9 50 uH ±10% | L3 |
| N-MOS USG170N10L 170 A 100 V TO-220 | Q2 |
| DIP N-MOS CRST100N06L2 80 A 60 V TO-220 | Q7 |
| X2 CAP 10 nF 310 V 10% P 7.5 | C28 |
| Y1 CAP 2.2 nF/400 V, ±20%, P = 10 | CY1 |
| PLC MODULE BEND PIN | CON1 |
| PH 2.54 H2.54 × 2 5PIN SINGLE TERMINAL | B-1 B-2 |
| PH 2.54 H2.54 × 2 10PIN SINGLE TERMINAL | A-1 A-2 |
| 5 CHANNEL OUTPUT SMD PART 96 W POWER SMD PART | |
| OUTDOOR CONTROLLER AL HEAT SINK | FOR Q2 D1 Q7 |
| φ5.5 SCREW ⅛"-40 LENGTH 5 NI | FOR HEAT SINK |
| JUMP WIRE 1.5 × 5.5*2.5 mm | L1 |
| 14# BL TEFLON L130 | E1-E2 |
| 14# BL TEFLON L130 | C1-C2, D1-D2 |
| U2 ME32F031C8T6 REV.C (V05.47) | U6 |
| ELECTROLYTI CAP 100 uF/35 V, ±20%, Φ6.3*11 | C32 |
| X7R CHIP CAP 1.5 nF/50 V, ±10%, 125° C.(0603) | C2 |
| X7R CHIP CAP 2.2 uF/25 V, ±10%, 125° C.(0805) | C4 |
| X7R CHIP CAP 470 nF/50 V, ±10%, 125° C.(0603) | C7 |
| NPO CHIP CAP 100 pF/50 V, ±5%, 125° C.(0805) | C6, C15-16 |
| X7R CHIP CAP 4.7 uF/25 V, ±10%, 125° C.(0805) | C17 |
| X7R SMT CAP 220 nF ±10% 50 V 125° C.(0603) | C5 |
| X7R CHIP CAP 100 nF/50 V, ±10%, 125° C.(0805) | C12, C22, C24, C27, C29 |
| X7R CHIP CAP 100 nF/50 V, ±10%, 125° C.(0805) | C23 |
| X7R CHIP CAP 100 nF/50 V, ±10%, 125° C.(1206) | C30, C66 |
| NPO CHIP CAP 330 pF/1000 V, 125° C.(1206) | C3 |
| X7R CHIP CAP 10 nF/1 KV, ±10%, 125° C.(1206) | C31, C33 |
| SMD ZENER DIODE, 10 V/0.5 W, BZT52B10SOD-123 | Z1-3 Z5 |
| MOSFET 2N7002 60 V/250 mA SOT-23 | Q1 |
| SMD N-MOSFET_3 A/ 60 V_UT3N06G-AB3-R_SOT-89 | Q5 |
| SMD RECTIFIER BRIDGE 1 A/100 V MSS110/MB11 | DB4 |
| SCHOTTKY DIODE D15PS45L 15 A 45 V TO-277B | D5-6 D16-19 |
| SCHOTTKY DIODE D10PS60L 10 A 60 V TO-277B | D20 |
| ⅛ W CHIP RESISTOR, 6.8K ±1%(0805) | R56 |
| ⅛ W CHIP RESISTOR, 2.2K ±1%(0805) | R57 |
| SMD INDUCTOR 100 uH ±20% 0.5 A 5*5*2.1 mm | L6 |
| SMD IC XLSEMI XL2596HVP-ADJE1 SOP8-EP | U7 |
| SCHOTTKY DIODE 5 A/40 V GVS54BF SMBF | D2 |

TABLE 11-continued

Illustrative circuit parts for controller unit circuitry 500.

| Item Description | Component Tag |
|---|---|
| ¼ W CHIP RESISTOR, 0 R ±5%(1206) | D11 |
| SMD SWITCHDIODE, SOD1F6, 1 A/600 V, SOD-123FL | R7, D13 |
| SMD SCHOTTKY DIODE, DSK26, 2 A/60 V, SOD-123F | D14, D15 |
| SMD SCHOTTKY DIODE 5A/60 V, SS56, SMA | D12 |
| SMT IC ON, NCP1654BD65R2G SO-8 ROHS | U3 |
| LDO IC, 78M12, TO-252 | U1 |
| SMD IC, LD1117A, 3.3 V, SOT-89 | U32 |
| 3 W SMT RESISTOR 0.06 R ±1%(2512) | R1 R65 R66 |
| 1/10 W_SMD RESISTANCE_3.9K ±1%(0603) | R6 |
| 1/10 W_SMD RESISTOR_12K ±1%(0603) | R18 |
| 1/10 W CHIP RESISTOR, 20K ±5%(0603) | R14 |
| 1/10 W CHIP RESISTOR, 51K ±5%(0603) | R17 |
| 1/10 W CHIP RESISTOR, 120K ±1%(0603) | R15-16 |
| ⅛ W CHIP RESISTOR, 10 R ±1%(0805) | R13 |
| ⅛ W CHIP RESISTOR, 10K ±1%(0805) | R2 R11 R23 R34 R38 |
| 1/10 W CHIP RESISTOR, 200K ±1%(0603) | R46 |
| ¼ W CHIP RESISTOR, 51K ±5%(1206) | R3 |
| ¼ W CHIP RESISTOR, 68K ±5%(1206) | R4-5 |
| ¾ W CHIP RESISTOR 100 R ±5%(2010) | R12 |
| 1 W SMT RESISTOR 10 mR ±1%(2010) | R10 R21 |
| PLC TRANSFORMER LC60868 | T2 |
| SMD TSS P0300SA SMA | Z4 |
| ⅛ W CHIP RESISTOR 4.7 R ±1%(0805) | R45 |
| ⅛ W CHIP RESISTOR, 750 R ±1%(0805) | R40 |
| ⅛ W CHIP RESISTOR, 22K ±1%(0805) | R47-48 |
| ¼ W CHIP RESISTOR_0.2 R ±1%(1206) | R41-44 R52 |
| ⅛ W CHIP RESISTOR, 30K ±5%(0805) | R25 R39 |
| SMD IC HUIHAI H6201L SOP8 | U5 |
| X5R CHIP CAP 22 uF/25 V ±20% 85° C.(0805) | C20 |
| IC LM258(SO-8) | U4 |
| IC TL431(SOT-23) ±1% | U2 |
| SMD TRANSISTOR MMBT3906 PNP SOT-23 | Q4 |
| SMD SWITCH DIODE, 1N4148W, 0.15 A/75 V | D3 |
| SMD SCHOTTKY DIODE 3A40V DSS34 SOD-123FL | D4 D7 D8 D9 |
| SMD DIODE, 0.2 A/200 V, BAV21W, SOD-123 | D10 |
| CHIP SCR_MCR100-8L_SOT-23-3L | Q3 |
| X7R SMT CAP 220 nF ±10% 50 V 125° C.(0805) | C10 |
| X7R CHIP CAP 1 uF/50 V, ±10%, 125° C.(0805) | C11 |
| ⅛ W CHIP RESISTOR, 470 R ±1%(0805) | R20 |
| ⅛ W CHIP RESISTOR, 1K ±1%(0805) | R27 R32 R36 R49 |
| ⅛ W CHIP RESISTOR, 15K ±5%(0805) | R24 |
| ⅛ W CHIP RESISTOR, 100K ±1%(0805) | R26 |
| ⅛ W CHIP RESISTOR, 510K ±1%(0805) | R35 R37 |
| ⅛ W CHIP RESISTOR 180K ±1%(0805) | R22 R31 |
| SMD_NTC_10K ±5%(0805) | RT1 |
| SMT NMOS 100 A 60 V 100N06GSL TO-252 | Q6, Q17 |
| SMT ZENER DIODE, 13 V, 0.5 W, SOD-123 | Z6, Z7 |
| ⅛ W CHIP RESISTOR, 20K ±1%(0805) | R19, R28 |
| ⅛ W CHIP RESISTOR, 10K ±1%(0805) | R29, R30, R51 |
| NPO CHIP CAP 470 pF/50 V, ±5%, 125° C.(0805) | C18, C21 |
| ⅛ W CHIP RESISTOR, 100K ±1%(0805) | R50 |
| SMD BI-DIRECT TVS 33 V 5000 W 5.0SMCJ33CA | TVS4 |
| ¼ W CHIP RESISTOR, 3K ±1%(1206) | C13 |
| DOUBLE SIDED FR4 115 × 30 × 1.6 mm RoHS | |
| X7R CHIP CAP 100 nF/50 V, ±10%, 125° C.(0603) | C1-5 C22-23 C25-26 |
| X7R CHIP CAP 1 uF/50 V, ±10%, 125° C.(0805) | C21 |
| X5R CHIP CAP 10 uF/25 V, ±10%, 85° C.(1206) | C7-9 |
| X7R CHIP CAP 100 nF/50 V, ±10%, 125° C.(1206) | C10 |
| LDO IC, 78M12, TO-252 | U7 |
| SMD IC SA2530 SOT23-5 RoHS | U1-5 |
| SMD IC MCU ME32F031C8T6 LQFP48 | U6 |
| SMT NMOS 100 A 60 V 100N06GSL TO-252 | Q1 Q8-10 Q17 |
| ⅛ W CHIP RESISTOR, 0 R ±5%(0805) | R4-8 |
| ⅛ W CHIP RESISTOR, 10K ±1%(0805) | R3 R28 R44 R55 R57 R2 R10 R12 R14 R16 |
| ⅛ W CHIP RESISTOR, 1K ±1%(0805) | R50 |
| ⅛ W CHIP RESISTOR, 20 R ±1%(0805) | R1 R9 R11 R13 R15 |
| ¼ W CHIP RESISTOR, 0 R ±5%(1206) | R17 |
| DOUBLE SIDED FR4 115 × 30 × 1.6 mm RoHS | |
| ⅛ W CHIP RESISTOR, 22K ±1%(0805) | R18 |
| ⅛ W CHIP RESISTOR, 1.5K ±1%(0805) | R19 |
| ⅛ W CHIP RESISTOR, 0 R ±5%(0805) | R20 |

FIG. 12 shows controller unit 104. Housing 302 may have a length $L_1$. Length $L_1$ may include length $L_{1A}$. Length $L_1$ may include length $L_{1B}$. Table 12 lists illustrative ranges that may include length $L_1$.

TABLE 12

Illustrative ranges that may include length $L_1$.
Illustrative length ranges (mm)

| Lower | Upper |
|---|---|
| <1 | 25 |
| 25 | 50 |
| 50 | 75 |
| 75 | 100 |
| 100 | 125 |
| 125 | 150 |
| 150 | 175 |
| 175 | 200 |
| 200 | >200 |
| Other suitable lower limits | Other suitable upper limits |

Housing 302 may have a width $W_1$. Table 13 lists illustrative ranges that may include width $W_1$.

TABLE 13

Illustrative ranges that may include width $W_1$.
Illustrative width ranges (mm)

| Lower | Upper |
|---|---|
| <10 | 20 |
| 20 | 30 |
| 30 | 40 |
| 40 | 50 |
| 50 | 60 |
| 60 | 70 |
| 70 | 80 |
| 80 | 90 |
| 90 | >90 |
| Other suitable lower limits | Other suitable upper limits |

Housing 302 may have a height $H_1$. Table 14 lists illustrative ranges that may include height $H_1$.

TABLE 14

Illustrative ranges that may include height $H_1$.
Illustrative height ranges (mm)

| Lower | Upper |
|---|---|
| <50 | 10 |
| 10 | 15 |
| 15 | 30 |
| 30 | 35 |
| 35 | 40 |
| 40 | 45 |
| 45 | 50 |
| 50 | 55 |

TABLE 14-continued

Illustrative ranges that may include height $H_1$.
Illustrative height ranges (mm)

| Lower | Upper |
|---|---|
| 55 | >55 |
| Other suitable lower limits | Other suitable upper limits |

Figure 14:
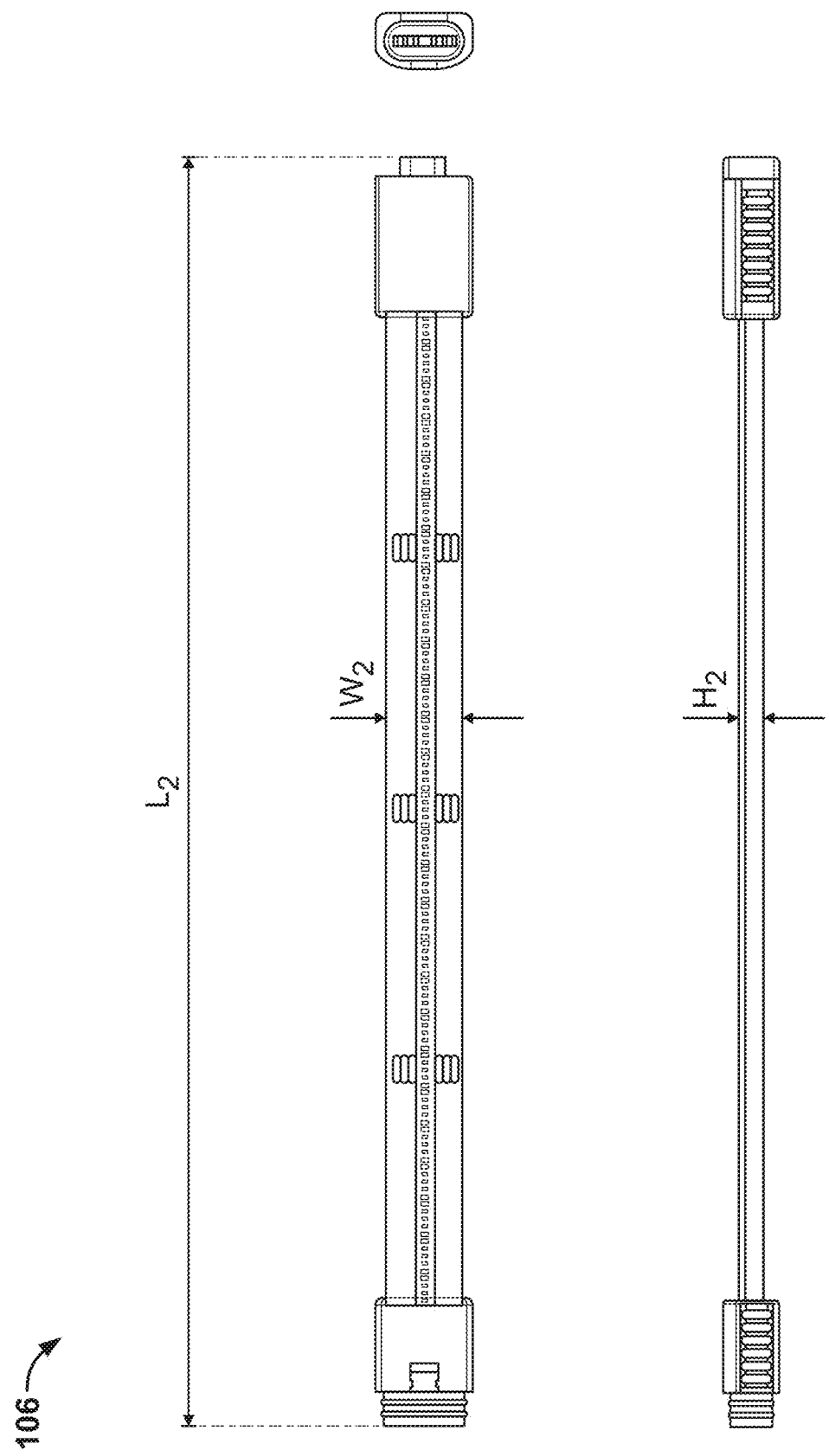
FIG. 14 shows illustrative apparatus in accordance with the principles of the invention.

FIG. 14 shows fixture 106. Fixture 106 may be a light tape. Fixture 106 may have a length $L_2$. Table 15 lists illustrative ranges that may include length $L_2$.

TABLE 15

Illustrative ranges that may include length $L_2$.
Illustrative length ranges (mm)

| Lower | Upper |
|---|---|
| <300 | 1,000 |
| 1,000 | 1,500 |
| 1,500 | 3,000 |
| 3,000 | 4,5000 |
| 4,500 | 6,000 |
| 6,000 | 7,500 |
| 7,500 | 9,000 |
| 9,000 | >9,000 |
| Other suitable lower limits | Other suitable upper limits |

Fixture 106 may have a width $W_2$. Table 16 lists illustrative ranges that may include width $W_2$.

TABLE 16

Illustrative ranges that may include width $W_2$.
Illustrative width ranges (mm)

| Lower | Upper |
|---|---|
| <1 | 2 |
| 2 | 4 |
| 4 | 6 |
| 6 | 8 |
| 8 | 10 |
| 10 | 12 |
| 12 | 14 |
| 14 | 16 |
| 16 | 18 |
| 18 | 20 |
| 20 | 22 |
| 22 | >22 |
| Other suitable lower limits | Other suitable upper limits |

Fixture 106 may have a height $H_2$. Table 17 lists illustrative ranges that may include height $H_2$.

TABLE 17

Illustrative ranges that may include height $H_2$.
Illustrative height ranges (mm)

| Lower | Upper |
|---|---|
| <1 | 2 |
| 2 | 3 |
| 3 | 4 |
| 4 | 5 |
| 5 | 6 |
| 6 | 7 |
| 7 | 8 |
| 8 | 9 |
| 9 | >9 |

TABLE 17-continued

Illustrative ranges that may include height $H_2$.
Illustrative height ranges (mm)

| Lower | Upper |
|---|---|
| Other suitable lower limits | Other suitable upper limits |

Length $L_2$ may be greater than Length $L_1$. Width $W_1$ may be greater than width $W_2$. Height $H_1$ may be greater than height $H_2$.

Figure 15:
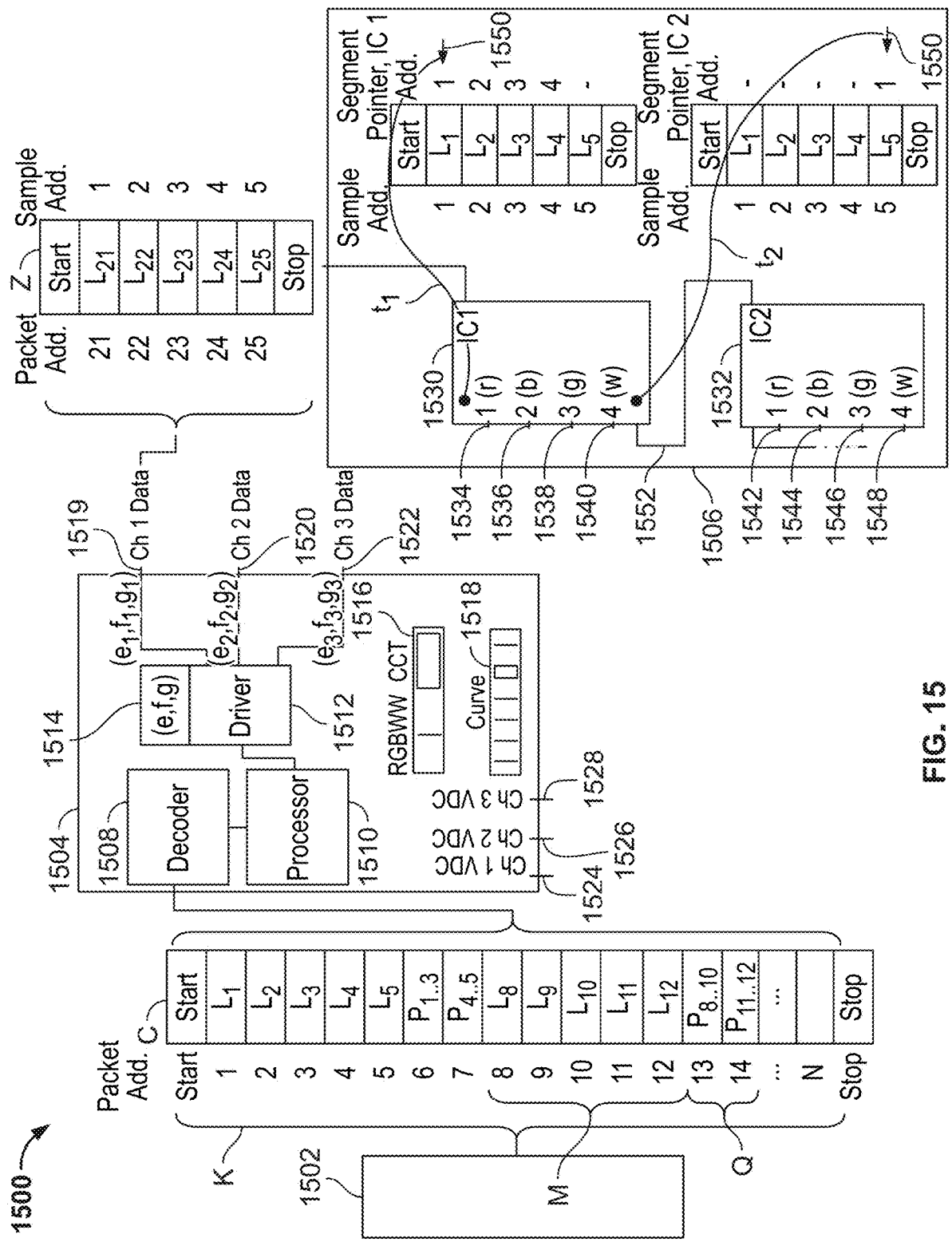
FIG. 15 shows schematically illustrative apparatus and information in accordance with the principles of the invention.

FIG. 15 shows illustrative data and data processing architecture 1500. Architecture 1500 may include lighting control data generator 1502. Architecture 1500 may include controller 1504. Architecture 1500 may include lamina segment 1506.

Lighting control data generator 1502 may generate lighting control data packet C. Data Packet C may include fields that may be addressed as 1 . . . . N. Fields 1 . . . . N may include relative light level values such as $L_n$. $L_n$ values such as M may correspond to lighting branches of an LED array. The $L_n$ in corresponding to a branch may define the brightness of the branch relative to the other branches in the array.

Each branch may correspond to an LED color. For example, a first branch may correspond to red, a second branch to green, a third branch to blue, a fourth branch to a first CCT white, a fifth branch to a second CCT white, and a second branch to a third CCT white. A lamina segment may include one or more of such branches. The $L_n$ values may thus control the color-mixing in an array.

Fields 1 . . . . N may include aggregate power levels such as $P_{a \ldots b}$. $P_{a \ldots b}$ values such as Q may correspond to the immediately preceding $L_n$ values.

The $P_{a \ldots b}$ may define the total power to be delivered to lighting branches corresponding to $L_8$, $L_9$ and $L_{10}$ based on the sum of power included in the individual currents allowed to flow through the branches, each in proportion to its relative light level ($L_8$, $L_9$ or $L_{10}$). For example, $P_{8 \ldots 10}$ may define the aggregate power to be provided to lighting branches corresponding to $L_8$, $L_9$ and $L_{10}$ based on control of current through the branches.

The $P_{a \ldots b}$ may define the total power provided to one or more lighting branches. For example, $P_{8 \ldots 10}$ may define the aggregate power to be directed to lighting branches corresponding to $L_8$, $L_9$ and $L_{10}$. For example, $P_{8 \ldots 10}$ may define the aggregate power to be directed to lighting branches corresponding to $L_8$, $L_9$ and $L_{10}$.

If $L_8$, $L_9$ and $L_{10}$ correspond, respectively, to a red lighting branch, a green lighting branch and a blue lighting branch, and $L_{11}$ and $L_{12}$ correspond, respectively to a first white CCT lighting branch and a second CCT lighting branch, then then $L_8$, $L_9$ and $L_{10}$ would define R-G-B mixing, $L_{11}$ and $L_{12}$ would correspond to CCT white light mixing. $P_{8 \ldots 10}$ would correspond to the aggregate R-G-B brightness, and $P_{11 \ldots 12}$ would correspond to aggregate CCT white brightness.

The $L_n$ may correspond to predetermined LED color selections. The $L_n$ of an array such as M may have a predetermined number of branches. Packet C may include one or more aggregate power values $P_{k=a \ldots b}$ for one or more of the different branches in the array.

Controller 1504 may include decoder 1508. Controller 1504 may include processor 1510. Controller 1504 may include driver 1512. Controller 1504 may include selector 1514. Controller 1504 may include selector 1514. Controller 1504 may include switch 1516.

Controller 1504 may include selector 1518. Controller 1504 may include data output channel 1519. Controller 1504 may include data output channel 1520. Controller 1504 may include data output channel 1522. Controller 1504 may include lighting voltage output 1524. Controller 1504 may include lighting voltage output 1526. Controller 1504 may include lighting voltage output 1528.

Decoder 1508 may read data control packet C. Processor 1510 may direct the $L_n$ to driver 1512. Processor 1510 may direct the $P_k$ to a power supply (not shown). The power supply may provide power in conformance with the $P_k$ to a lighting voltage output such as 1524. Selector 1514 may be used to identify digits that correspond to a selected first field in the N fields of data packet C for output at a data output channel such as 1519. For example, if the three digits 0, 2, 21 are selected, the first value of packet C will be $L_{21}$. Such digits may be selected for each of the data output channels. A first $L_n$ of channel 1 is illustrated as $L_{21}$.

Controller 1504 may output sample Z via data output channel 1. Sample Z may include relative light level values $L_{21}$, $L_{22}$, $L_{23}$, $L_{24}$, and $L_{25}$. The power supply may provide power alternatively corresponding to both $P_{21\ldots23}$ (not shown) and $P_{24\ldots25}$ (not shown), to channel 1 lighting voltage output 1526. Thus, LEDs on channel 1 will have a color mixing determined by $L_{21}$-$L_{25}$ (for example, $L_{21}$-$L_{23}$ for R-G-B and $L_{24}$-$L_{25}$ for whites of two different CCTs) and an aggregate power for R-G-B and CCTs, respectively, determined by $P_{21\ldots23}$ and $P_{24\ldots25}$.

Lamina segment 1506 may include one or more integrated circuits such as IC 1 1530 and IC 2 1532.

IC 1 1530 may include current regulator 1534. Current regulator 1534 may be designated by a lighting format for a red lighting branch. IC 1 1530 may include current regulator 1536. Current regulator 1536 may be designated by the lighting format for a blue lighting branch. IC 1 1530 may include current regulator 1538. Current regulator 1538 may be designated by the lighting format for a green lighting branch. IC 1 1530 may include current regulator 1540. Current regulator 1540 may be designated by the lighting format for a white lighting branch.

IC 2 1532 may include current regulator 1542. Current regulator 1542 may be designated by the lighting format for a red lighting branch. IC 2 1532 may include current regulator 1544. Current regulator 1544 may be designated by the lighting format for a blue lighting branch. IC 2 1532 may include current regulator 1546. Current regulator 1546 may be designated by the lighting format for a green lighting branch. IC 2 1532 may include current regulator 1548. Current regulator 1548 may be designated by the lighting format for a white lighting branch.

Under the format, IC 1 130 may recognize current regulator 1534 as branch "1". Under the format, IC 1 1530 may recognize current regulator 1536 as branch "2". Under the format, IC 1 1530 may recognize current regulator 1538 as branch "3". Under the format, IC 1 1530 may recognize current regulator 1540 as branch "4".

Under the format, IC 2 1532 may recognize current regulator 1542 as branch "1". Under the format, IC 2 1532 may recognize current regulator 1544 as branch "2". Under the format, IC 2 1532 may recognize current regulator 1546 as branch "3". Under the format, IC 2 1532 may recognize current regulator 1548 as branch "4".

IC 1 1530 and IC 2 1532 may be configured to recognize a pointer such as 1550. The pointer may identify in sample Z a "next" value to implement for lamina segment 1506. At time $t_1$, pointer 1550 may point to the first field, at address "1," in sample Z. IC 1 1530 may apply the value from sample Z address 1 to IC 1 1530's branch 1. IC 1 1530 may apply the value from sample Z address 2 to IC 1 1530's branch 2. IC 1 1530 may apply the value from sample Z address 3 to IC 1 1530's branch 3. IC 1 1530 may apply the value from sample Z address 4 to IC 1 1530's branch 4.

Jumper 1552 may provide communication of pointer 1550 from IC 1 1530 to IC 2 1532. IC 1 1530 may at time $t_2$ pass the pointer to IC 2 1532. IC 2 1532 may then apply the value from sample Z address 5 to IC 1 1532's branch 1. In this manner, sample Z may provide lighting control data to five branches that are spread out among IC 1 1530 and IC 2 1532.

If sample Z were configured to include a greater number of fields, IC 2 1532, or one or more other ICs (not shown) could accommodate them in the same manner.

Switch 1516 may be used to switch controller between a first mode, such as an R-G-B-W-W mode, as illustrated, and a second mode, such as a CCT mode. The modes of switch 1516 may correspond to different syntaxes in data packet C. The mode of switch 1516 may correspond to different IC arrangement on segment 1506.

Selector 1518 may provide two or more curves that may be used to calculate a lighting power from a $P_k$ value. A curve may be linear. A curve may be nonlinear.

Figure 16:
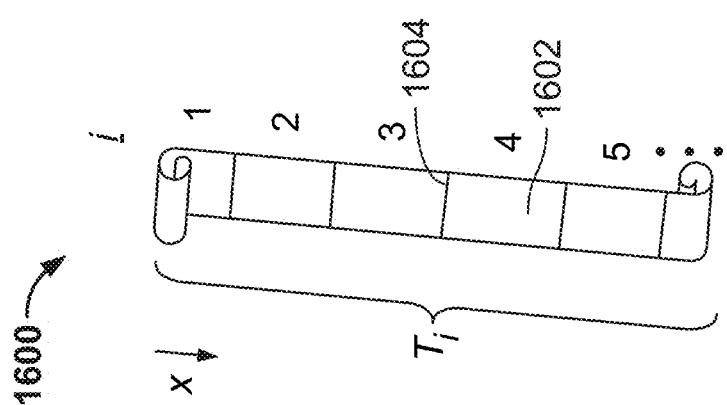
FIG. 16 shows schematically illustrative apparatus that may be used in accordance with the principles of the invention.

FIG. 16 shows schematically illustrative lamina 1600. Lamina 1600 may have a one-dimensional (tape, extending in y direction) layout of segments.

Lamina 1600 may include one or more segments such as segment 1602. Segment 1602 may be joined to one or more other segments at a separation line such as 1604. Two or more segments may be arranged along direction x. The segments may be identified as $T_i$, with i=1, 2, 3, . . . , I. The $T_i$ segments may be referred to as a column.

Figure 17:
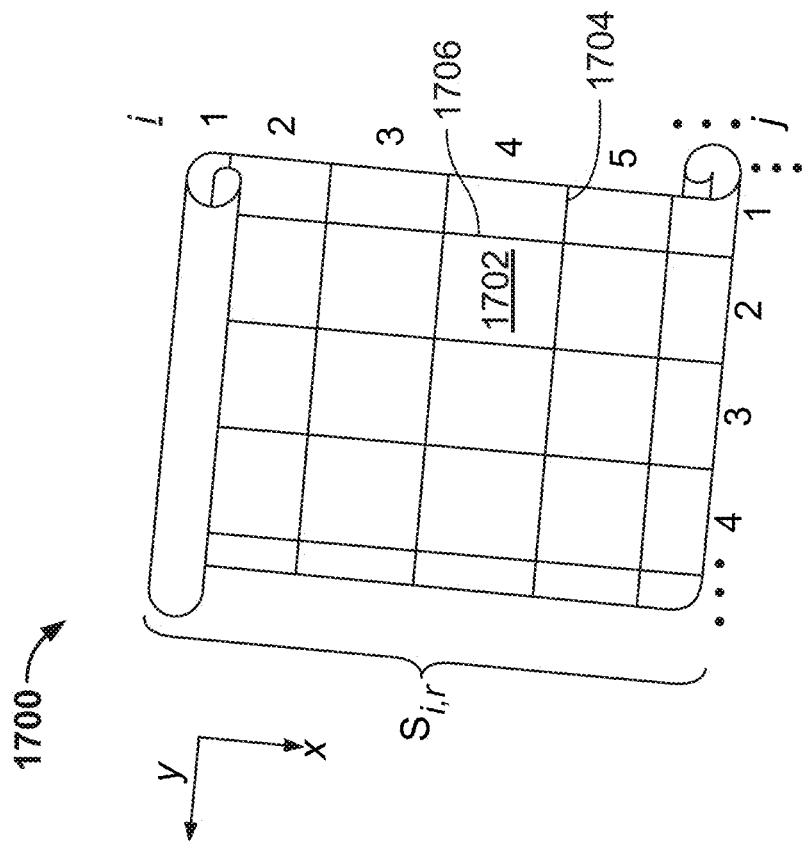
FIG. 17 shows schematically illustrative apparatus that may be used in accordance with the principles of the invention.

FIG. 17 shows schematically illustrative lamina 1700. Lamina 1700 may have one or more features in common with lamina 1600.

Lamina 1700 may include one or more segments such as segment 1702. Segment 1702 may be joined to one or more other segments at a separation line such as 1704. Segment 1702 may be joined to one or more other segments at a separation line such as 1706. Two or more segments may be arranged along direction x. Two or more segments may be arranged along direction y. The segments may be identified as $S_{i,j}$, with i=1, 2, 3, 4, . . . , I, and j=1, 2, 3, 4, . . . , J. Segments $S_{i,j}$ at a fixed value of j may be referred to as a column. Segments $S_{i,j}$ at a fixed value of i may be referred to as a row.

The terms "column" and "row" may refer to segments that are arranged in a rectilinear pattern. The terms "column" and "row" may refer to segments that are arranged in a pattern that is not a rectilinear pattern.

A segment may support an LED. A segment may support a group of LEDs. A segment may support an integrated circuit.

The integrated circuit may be in electrical communication with LEDs on one or more segments via conductors. A conductor may cross a separation line. A user may separate segments along a separation line.

Lamina 1700 may have a two-dimensional (sheet, extending in x-y space) layout of segments.

LED elements may include LEDs of different colors. The elements may include LEDs of different CCTs.

The elements may be controlled by a controller. The controller may be external to the lamina.

The controller may be adjustable by a user. The controller may be mechanically adjustable by a user.

The elements may include one or more integrated circuits.

The lamina may be a lamina that includes only one integrated circuit.

The integrated circuits may be those identified as a SM17511PS IC or DMX512AWIC.

The integrated circuits for the tape may be those identified as a SM17511PS IC.

The integrated circuits for the sheet may be those identified as a DMX512AWIC.

The integrated circuits may be those available from Shenzhen Sunmoon Mircroelectronics Co., Ltd (www.chinaasic.com).

The controller may include three output channels. Each channel may have three terminals: a high voltage terminal, a data terminal, and a ground or reference voltage terminal. One terminal may be a ground.

One terminal may be a high (24, 48 or the like) DC voltage ($VDD_i$, which can be stepped down for i= 1, 2, 3, 4, . . . input voltages on the integrated circuits).

One terminal may be a data conductor for transmitting control data.

The controller may be a DMX LED controller A2C10-3.

An IC may have a terminal corresponding to each of the three controller terminals of a channel. The IC may have terminals that connect to other ICs on the lamina. The IC may have terminals that connect to other ICs on other lamina. An IC that is connected to the controller may be configured to have, among other terminals, only three terminals that correspond to the three controller terminals of the channel of which the IC is a part.

In the tape, control data may be transmitted to a first IC, and then transferred to other ICs in cascading format. Thus, the data would pass first to IC1. IC1 would then process the data, and pass information to IC2, and so on to IC3, IC4, or one or more further ICs. The ICs may be arranged on one or more tapes.

In the sheet, each segment may include 2 ICs. Control data may be transmitted to a first IC on the segment, and then transferred to a second IC on the segment. Thus, the data would pass first to IC1. IC1 would then process the data and pass information to IC2. The circuit may be arranged such that IC2 does not transfer data to another IC in the segment or in a different segment. ICs in other segments may receive control data directly from the controller.

Figure 18:
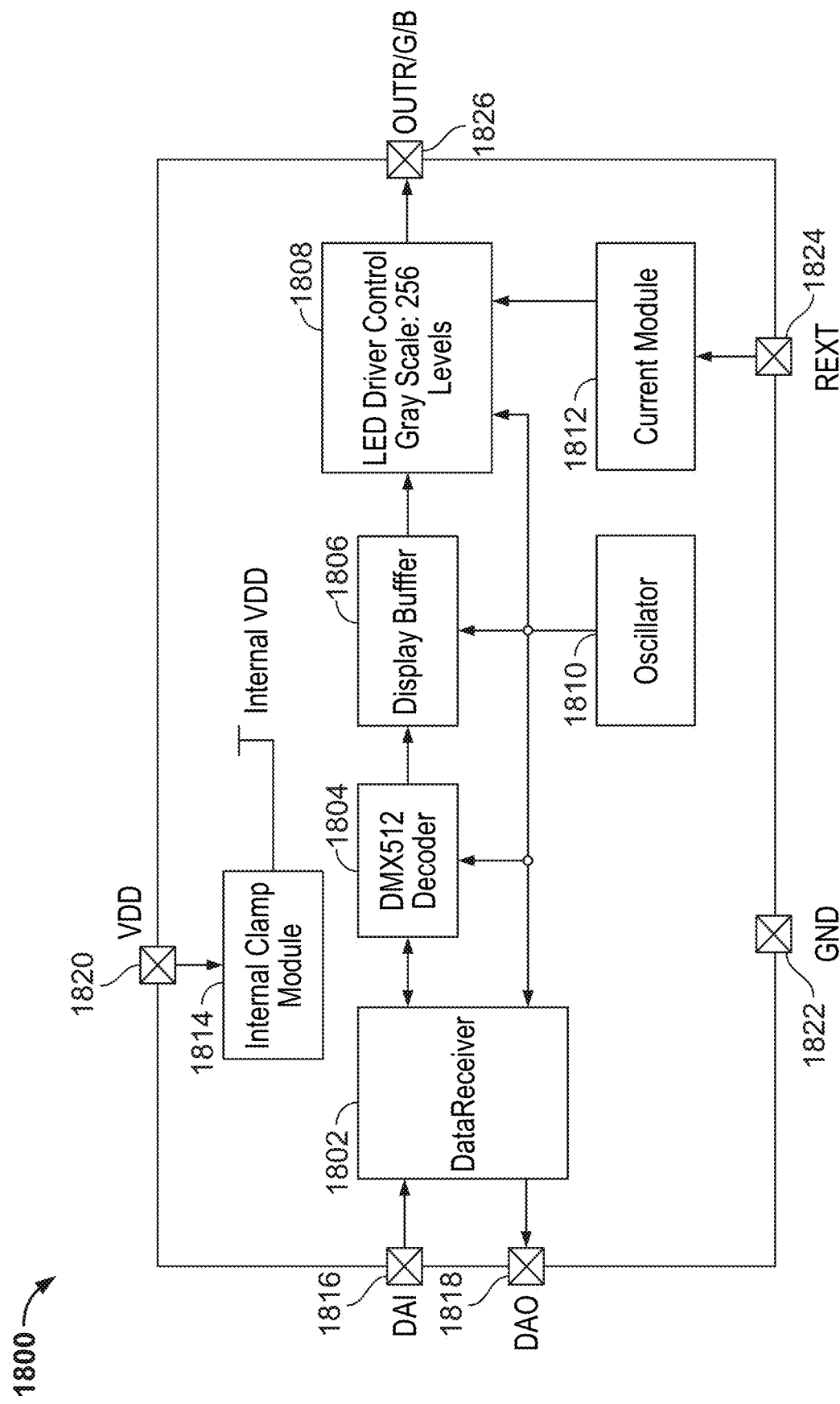
FIG. 18 shows schematically illustrative apparatus that may be used in accordance with the principles of the invention.

FIG. 18 shows schematically illustrative IC 1800. IC 1800 may include an IC such as SM17511PS IC. IC 1800 may include data receiver 1802. IC 1800 may include DMX512 decoder 1804. IC 1800 may include display buffer 1806. IC 1800 may include LED driver control 1808.

IC 1800 may include oscillator 1810. IC 1800 may include current module 1812. IC 1800 may include internal claim module 1814.

IC 1800 may include DAI terminal 1816. IC 1800 may include DAO terminal 1818. IC 1800 may include VDD terminal 1820. IC 1800 may include GND terminal 1822. IC 1800 may include REXT terminal 1824. IC 1800 may include OUTR/G/B terminal 1826.

IC 1800 may receive incoming control data from a controller at DAI terminal 1816. Data receiver 1802 may pre-process the control data. Data receiver may remove noise or distortion from a signal received at DAI terminal 1816. Data receiver 1802 may provide pre-processed control data to DMX512 decoder 1804. DMX512 decoder 1804 may interpret the pre-processed control data based on a lighting format. DMX512 decoder 1804 may determine a value for a field in a data packet that conforms to a lighting control data format. DMX512 decoder 1804 may transmit light setting instructions to display buffer 1806. A light setting instruction may set a current in a current regulator. Display buffer 1806 may feed the instructions to LED driver control 1808. LED driver control 1808 may be in electrical communication with OUTR/G/B terminal 1826. OUTR/G/B terminal 1826 may provide to LED driver control 1808 a lighting current from a lighting circuit branch. The lighting current may be driven by an external voltage. The external voltage may be supplied by a controller such as controller 1504. The external voltage may be at a higher potential than OUTR/G/B terminal 1826. The external voltage may be 5, 10, 12, 24, 48 VDC or any other suitable voltage.

LED driver control 1808 may limit the current in conformance with a light setting instruction. LED driver control 1808 may include one or more current regulators. LED driver control 1808 may include a current regulator for each lighting branch that is coupled to OUTR/G/B terminal 1826. Current flowing through an LED in line with the external voltage and REXT terminal 1824 may thus be limited to achieve a light output at the LED that corresponds to the light setting instruction.

LED driver control 1808 may pass the current through current module 1812 to REXT terminal 1824.

A maximum output current through REXT terminal 1824 may be set using a 4 bit register in REXT terminal 1824. A maximum output current through REXT terminal 1824 may be obtained by providing a resistance in line with REXT terminal 1824. OUTR/G/B terminal 1826 may include multiple terminals. Each of the terminals may be coupled to a lighting branch. Each branch may include one or more LEDs. The LEDs of a branch may be of a single output color. The LEDs of a branch may be of different output colors. The multiple terminals may include a terminal for a red LED branch. The multiple terminals may include a terminal for a green LED branch. The multiple terminals may include a terminal for a blue LED branch. Current module 1812 may include a current regulator for each of the terminals. LED driver control 1808 may separate control the current level for each of the terminals.

Oscillator 1810 may be in communication with data receiver 1802. Oscillator 1810 may be in communication with DMX512 decoder 1804. Oscillator 1810 may be in communication with display buffer 1806. Oscillator 1810 may be in communication with LED driver control 1808. Oscillator 1810 may provide a timing signal to those components or other components of IC 1800.

Internal clamp module 1814 may be coupled to VDD terminal 1820. Internal clamp module 1814 may provide an onboard power source for the components of IC 1800.

DAO terminal 1818 may provide outgoing control data. The outgoing control data may be derived from the incoming control data. The outgoing control data may include the same information as is included in the incoming control data. The outgoing control data may be derived from DMX512 decoder 1804. The outgoing control data may be derived from display buffer 1806. The outgoing control data may be derived from LED driver control 1808.

IC 1800 may attach an address to a sample of lighting control data. The address may include a pointer to a field in the sample. IC 1800 may output the pointer along with the sample via DAO terminal 1818 to another IC (not shown). The other IC may have one or more features in common with IC 1800. The other IC may be mounted on the same segment on which IC 1800 is mounted. The other IC may be mounted on a segment that is different from the segment on which IC 1800 is mounted. The other IC may receive via a DAI terminal the sample and the pointer. The other IC may implement a lighting control instruction at a current regulator that corresponds to the pointer.

GND terminal 1822 may be tied to a ground (not shown) of the controller (not shown).

IC 1800 may be coupled to the controller via only DAI terminal 1816, VDD terminal 1820 and GND terminal 1822.

Figure 19:
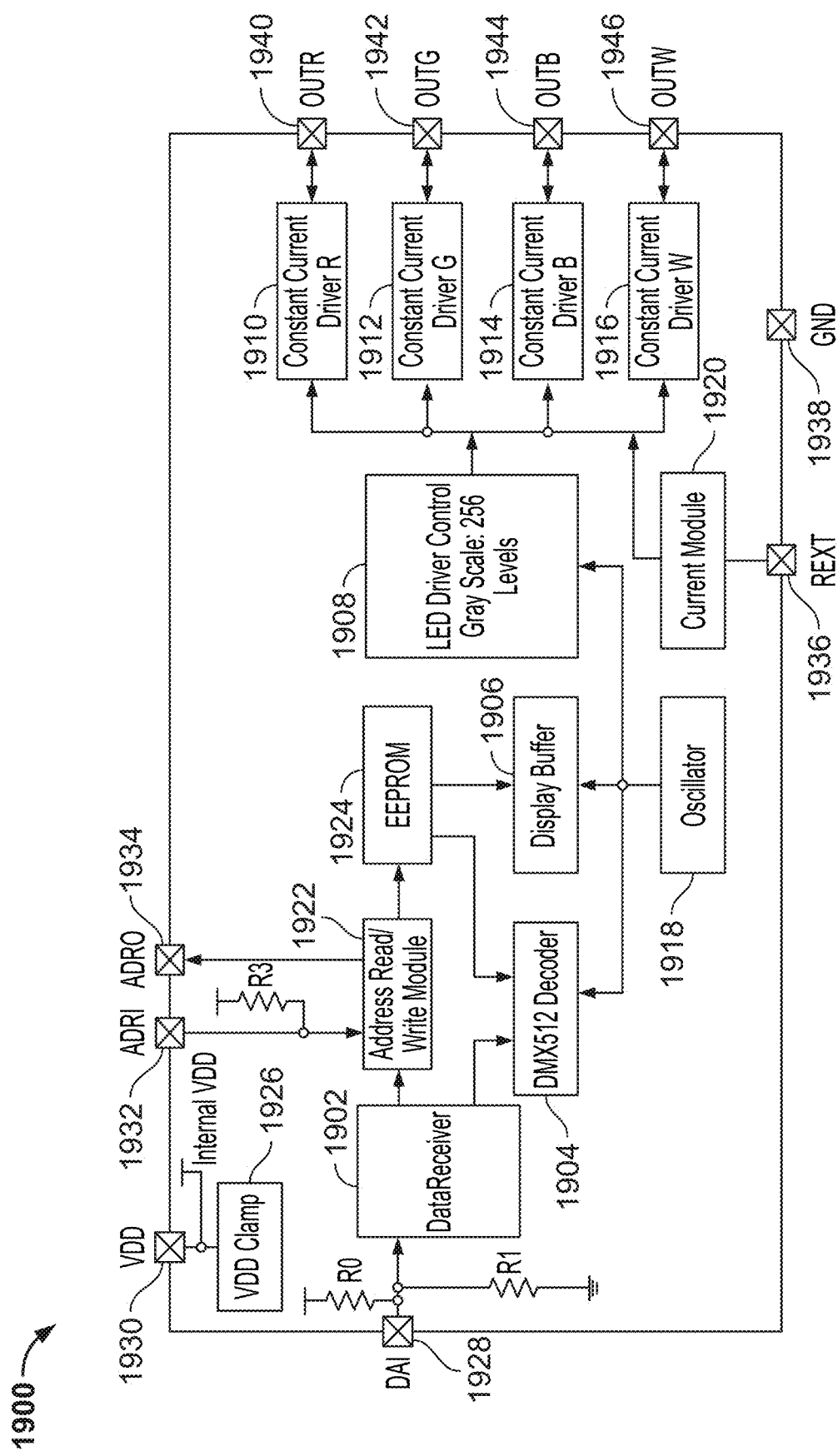
FIG. 19 shows schematically illustrative apparatus that may be used in accordance with the principles of the invention.

FIG. 19 shows schematically illustrative IC 1900. IC 1900 may include an IC such as DMX512AWIC. IC 1900 may include data receiver 1902. IC 1900 may include DMX512 decoder 1904. IC 1900 may include display buffer 1906. IC 1900 may include LED driver control 1908. IC 1900 may include constant current driver R 1910. IC 1900 may include constant current driver G 1912. IC 1900 may include constant current driver B 1914. IC 1900 may include constant current driver W 1916. IC 1900 may include oscillator 1918. IC 1900 may include current module 1920. IC 1900 may include address read/write module 1922. IC 1900 may include EEPROM 1924. IC 1900 may include VDD clamp 1926.

IC 1900 may include DAI terminal 1928. IC 1900 may include VDD terminal 1930. IC 1900 may include ADRI terminal 1932. IC 1900 may include ADRO terminal 1934. IC 1900 may include REXT terminal 1936. IC 1900 may include GND terminal 1938. IC 1900 may include OUTR terminal 1940. IC 1900 may include OUTG terminal 1942. IC 1900 may include OUTB terminal 1944. IC 1900 may include OUTW terminal 1946.

IC 1900 may receive incoming control data from a controller at DAI terminal 1928. Data receiver 1902 may receive the control data. Data receiver 1902 may provide pre-processed control data to DMX512 decoder 1904. Data receiver 1902 may have one or more features in common with data receiver 1802. DMX512 decoder 1804 may interpret the pre-processed control data based on a lighting format. DMX512 decoder 1904 may have one or more features in common with DMX512 decoder 1804. DMX512 decoder 1904 may transmit the light setting instructions to display buffer 1906. Display buffer 1906 may feed the instructions to LED driver control 1908. LED driver control 1908 may be coupled to one or more of OUTR terminal 1940, OUTG terminal 1942, OUTB terminal 1944 and OUTW terminal 1946.

One or more of OUTR terminal 1940, OUTG terminal 1942, OUTB terminal 1944 and OUTW terminal 1946 may receive a lighting current from a lighting circuit branch. The lighting current may be driven by an external voltage. The external voltage may be supplied by a controller such as controller 1504. The external voltage may be at a higher potential than that of OUTR terminal 1940, OUTG terminal 1942, OUTB terminal 1944 and OUTW terminal 1946. The external voltage may be 5, 10, 12, 24, 48 VDC or any other suitable voltage. LED driver control 1908 may set maximum current levels for one or more of constant current driver R 1910, constant current driver G 1912, constant current driver B 1914 and constant current driver W 1916.

Current module 1920 may receive current from one or more of constant current driver R 1910, constant current driver G 1912, constant current driver B 1914 and constant current driver W 1916. Current module 1920 may discharge the current through REXT terminal 1936. REXT terminal 1936 may be in electrical communication with resistance external to IC 1900. The resistance may discharge the current away from IC 1900.

Oscillator 1918 may be in communication with DMX512 decoder 1904. Oscillator 1918 may be in communication with display buffer 1906. Oscillator 1918 may be in communication with LED driver control 1908. Oscillator 1918 may provide a timing signal to those components or other components of IC 1900.

VDD clamp 1926 may be coupled to VDD terminal 1930. VDD clamp 1926 may provide an onboard power source for the components of IC 1900.

GND terminal 1938 may be tied to a ground (not shown) of the controller (not shown).

EEPROM 1924 may provide an address to address read/write module 1922. The address may correspond to another IC (not shown). The address may include a pointer to a field in a lighting control data sample. The other IC may have one or more features in common with IC 1900. The other IC may be mounted on segment 1702. The other IC may be mounted on a segment that is different from segment 1702.

Address read/write module 1922 may receive a sample of lighting control data from data receiver 1902. Address read/write module 1922 may associate the pointer with the sample. Address read/write module 1922 may output the sample and the pointer via ADRO terminal 1934. An IC receiving the sample and the pointer data via an ADRI terminal may implement a lighting control instruction at a current regulator that corresponds to the pointer.

IC 1900 may formulate light setting instructions, as discussed above, based on the pre-processed control data.

IC 1900 may be coupled to the controller via only DAI terminal 1928, VDD terminal 1930 and GND terminal 1938.

Figure 20:
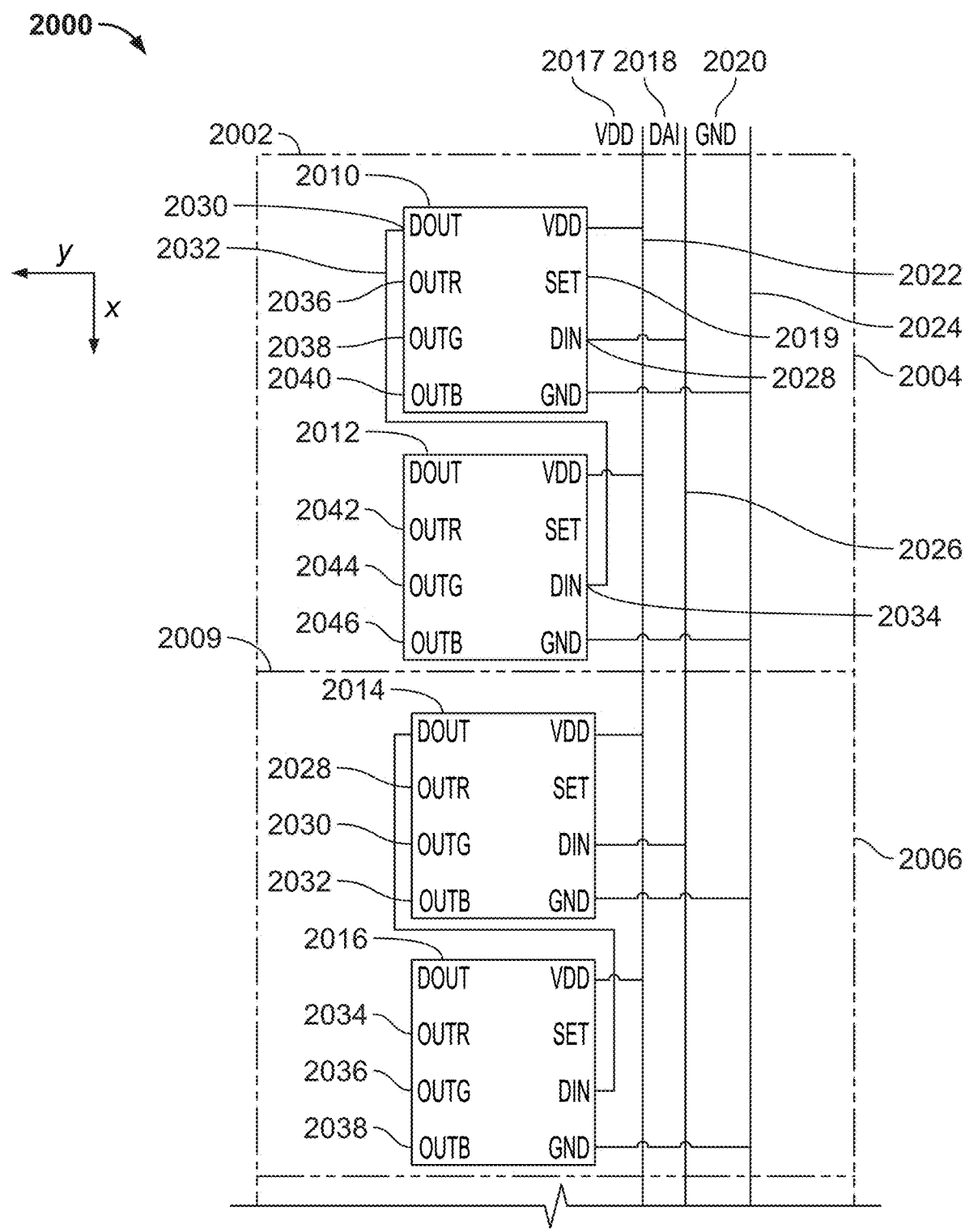
FIG. 20 shows schematically illustrative apparatus in accordance with the principles of the invention.

FIG. 20 shows illustrative light tape 2000. Light tape 2000 may include lamina 2002. Lamina 2002 may have one or more features in common with lamina 1600. Light tape 2000 may include segment 2004. Light tape 2000 may include segment 2006. Light tape 2000 may include other segments (not shown). Segment 2006 and other segments may extend away from segment 2004 in direction x. The segments may be joined at separation line 2009. Separation line 2009 may have one or more features in common with separation line 1604.

Light tape 2000 may include IC 2010. Light tape 2000 may include IC 2012. Light tape 2000 may include IC 2014. Light tape 2000 may include IC 2016. One or more of ICs 2010, 2012, 2014 and 2016, and any other ICS in light tape 2000, may have one or more features in common with IC 1800. A segment of light tape 2000 may include 2, 3, 4 or more such ICs.

Light tape 2000 may include VDD terminal 2017. Light tape 2000 may include DAI terminal 2018. Light tape 2000 may include GND terminal 2020. Light tape may include an electrical connector (not shown). The connector may include terminals 2017, 2018 and 2020. The connector may be compatible with a DMX style connector. Terminal 2017 may receive a voltage for powering the ICs on light tape 2000. Terminal 2018 may receive a control data signal for controlling LEDs on light tape 2000. Terminal 2020 may receive a common reference voltage or a ground from the controller. Light tape 2000 may be a tape that does not receive such inputs from a second controller.

Conductor 2022 may provide IC power to VDD terminals of one or more of ICs 2010, 2012, 2014 and 2016, and any other ICs on tape 2000. Conductor 2024 may provide a controller ground-voltage level to GND terminals of one or more of ICs 2010, 2012, 2014 and 2016, and any other ICs on tape 2000.

Conductor 2026 may provide control data to the ICs in each segment of tape 2000. For example, conductor 2026 may be coupled directly to DIN terminal 2028 of IC 2014. IC 2010 may output the control data via DOUT terminal 2030. Jumper 2032 may transmit the control data from DOUT terminal 2030 to DIN terminal 2034 of IC 2012. The control data may include encoded light setting instructions for one or more of OUTR terminal 2036, OUTG terminal 2038, OUTB terminal 2040, OUTR terminal 2042, OUTG terminal 2044, and OUTB terminal 2046.

Jumper 2032 may transmit a control data address such as pointer 1550 from DOUT terminal 2030 to DIN terminal 2034 of IC 2012. Control data transmitted from terminal 2030 may thus trigger encoded light setting instructions for one or more of OUTR terminal 2042, OUTG terminal 2044, and OUTB terminal 2046.

Thus, a three-conductor connector, from a controller, connected to VDD terminal 2017, DAI terminal 2018 and GND terminal 2020 may control 1, 2, 3, 4, 5, 6 . . . . LED lighting circuit branches on segment 2004.

ICs 2014 and 2016 on segment 2006 may be connected to each other in a manner similar to that in which ICs 2010 and 2012 on segment 2004 are connected. SET terminals such as 2019 may provide current discharge to ground.

Figure 21:
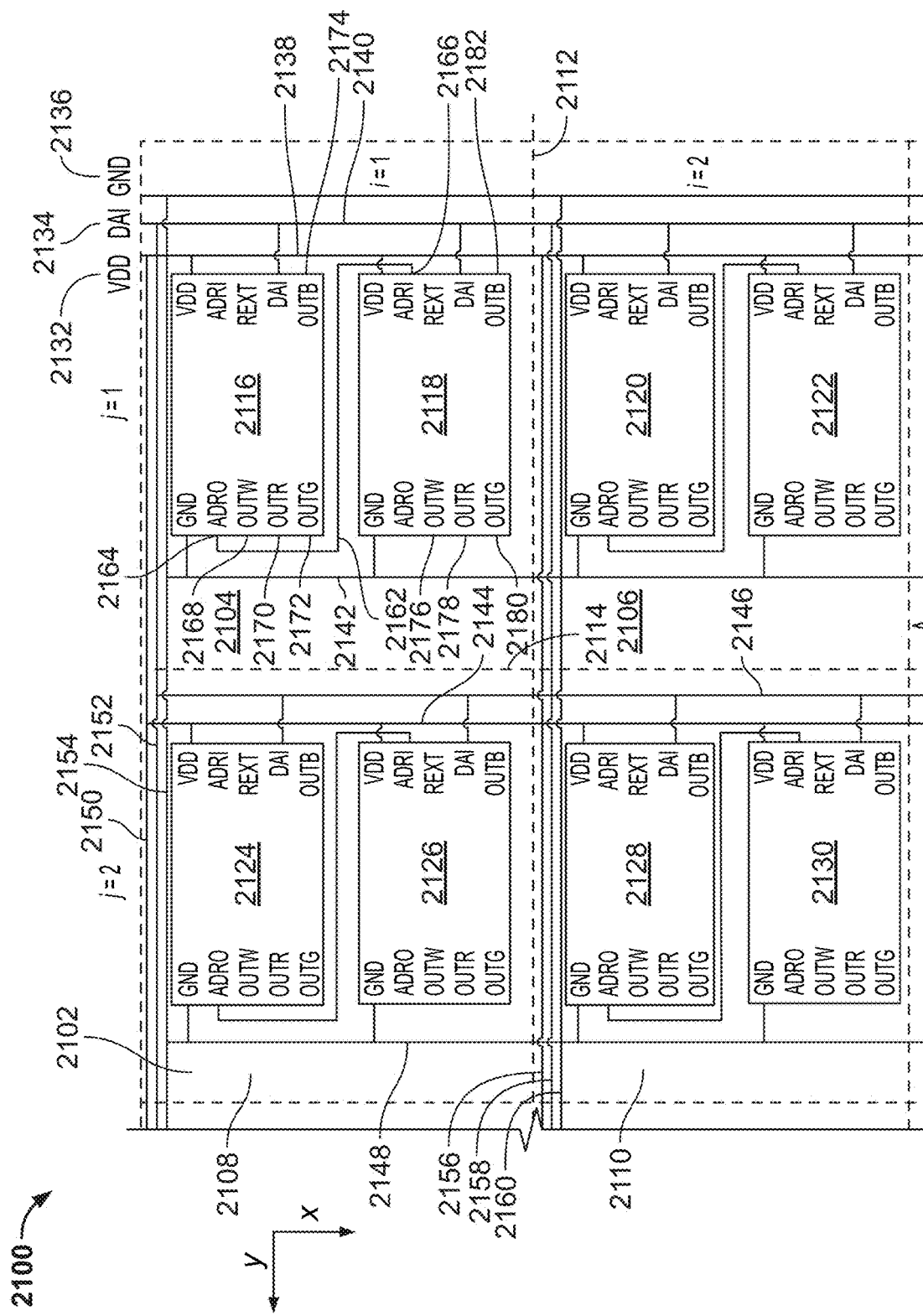
FIG. 21 shows schematically illustrative apparatus in accordance with the principles of the invention.

FIG. 21 shows illustrative light sheet 2100. Light sheet 2100 may include lamina 2102. Lamina 2102 may have one or more features in common with lamina 1700. Light sheet 2100 may include segment 2104. Light sheet 2100 may include segment 2106. Light sheet 2100 may include segment 2108. Light sheet 2100 may include segment 2110. Light sheet 2100 may include other segments (not shown).

Segments 2106 and 2110, and other segments, may be disposed, relative to segment 2104 and 2108, in direction x. The segments may be joined at separation lines such as 2112. Separation line 2112 may have one or more features in common with separation line 1704.

Segments 2108 and 2110, and other segments, may be disposed, relative to segments 2104 and 2106, in direction y. The segments may be joined at a separation line such as 2114. Separation line 2114 may have one or more features in common with separation line 1706.

Light sheet 2100 may include IC 2116. Light sheet 2100 may include IC 2118. Light sheet 2100 may include IC 2120. Light sheet 2100 may include IC 2122. Light sheet 2100 may include IC 2124. Light sheet 2100 may include IC 2126. Light sheet 2100 may include IC 2128. Light sheet 2100 may include IC 2130.

One or more of ICs 2116, 2118, 2120, 2122, 2124, 2126, 2128 and 2130 and any other ICs of light sheet 2100, may have one or more features in common with IC 1900. A segment of light sheet 2100 may include 2, 3, 4 or more such ICs.

Light sheet 2100 may include VDD terminal 2132. Light sheet 2100 may include DAI terminal 2134. Light sheet 2100 may include GND terminal 2136. Light sheet 2100 may include an electrical connector (not shown). The connector may include terminals 2132, 2134 and 2136. Any one or more of the segments of light sheet 2100 may include such a connector. The connector may be compatible with a DMX style connector. VDD terminal 2132 may receive a voltage for powering the ICs on light sheet 2100. DAI terminal 2134 may receive a control data signal for controlling LEDs on light sheet 2100. GND terminal 2136 may receive a common reference voltage or a ground from the controller. Light sheet 2100 may be a sheet that does not receive such inputs from a second controller.

Conductor 2138 may provide IC power to VDD terminals of IC 2116 and ICs in segments disposed along direction x in column 1 of sheet 2100. Conductor 2140 may provide control data to DAI terminals of IC 2116 and ICs in segments disposed along direction x in column 1 of sheet 2100. Conductor 2142 may provide a controller ground-voltage level to GND terminals of IC 2116 and ICs in segments disposed along direction x in column 1 of sheet 2100.

Conductor 2144 may provide IC power to VDD terminals of IC 2116 and ICs in segments disposed along direction x in column 2 of sheet 2100. Conductor 2146 may provide control data to DAI terminals of IC 2116 and ICs in segments disposed along direction x in column 2 of sheet 2100. Conductor 2148 may provide a controller ground-voltage level to GND terminals of IC 2116 and ICs in segments disposed along direction x in column 2 of sheet 2100.

Conductor 2150 may provide IC power to VDD terminals of ICs in columns j=2 . . . . J that are disposed in direction y relative to column 1. Conductor 2152 may provide control data to DAI terminals of ICs in columns j=2 . . . . J that are disposed in direction y relative to column 1. Conductor 2154 may provide a controller ground-voltage level to ICs in columns j=2 . . . . J that are disposed in direction y relative to column 1.

Conductor 2156 may provide IC power to VDD terminals of ICs in rows i=2 . . . . I that are disposed in direction x relative to row 1. Conductor 2158 may provide control data to DAI terminals of ICs in rows i=i . . . I that are disposed in direction x relative to row 1. Conductor 2160 may provide a controller ground-voltage level to ICs in rows i=2 . . . . I that are disposed in x relative to row 1.

In segment $S_{1,1}$, jumper 2162 may transmit a control data address such as pointer 1550 from ADRO terminal 2164 of IC 2116 to ADRI terminal 2166 of IC 2118. Control data transmitted from terminal 2134 may thus trigger encoded light setting instructions for one or more of OUTW terminal 2168, OUTR terminal 2170, OUTG terminal 2172, and OUTB terminal 2174 of IC 2116, and one or more of OUTW terminal 2176, OUTR terminal 2178, OUTG terminal 2180, and OUTB terminal 2182, of IC 2118. One or more other $S_{i,j}$ segments in sheet 2100 may include the same or a similar arrangement.

One or more segments other than segment 2104 may include one or more terminals such as terminal 2132, terminal 2134 and terminal 2136. Such terminals may be included in a connector.

Other segments in sheet $S_{i,j}$ may include conductor layouts analogous to those of one or more of segments 2104, 2106, 2108 and 2110. Other segments in sheet $S_{i,j}$ may include IC layouts analogous to those of one or more of segments 2104, 2106, 2108 and 2110. Thus, a user may separate segments along separation lines in directions x, y, or x and y, and retain functionality of the ICs and LEDs on separated segment or segments.

Thus, a three-conductor connector, from a controller, connected to VDD terminal 2132, DAI terminal 2134 and GND terminal 2136 may control 1, 2, 3, 4, 5, 6 . . . . LED lighting circuit branches on a segment such as $S_{i,j}$.

Figure 22:
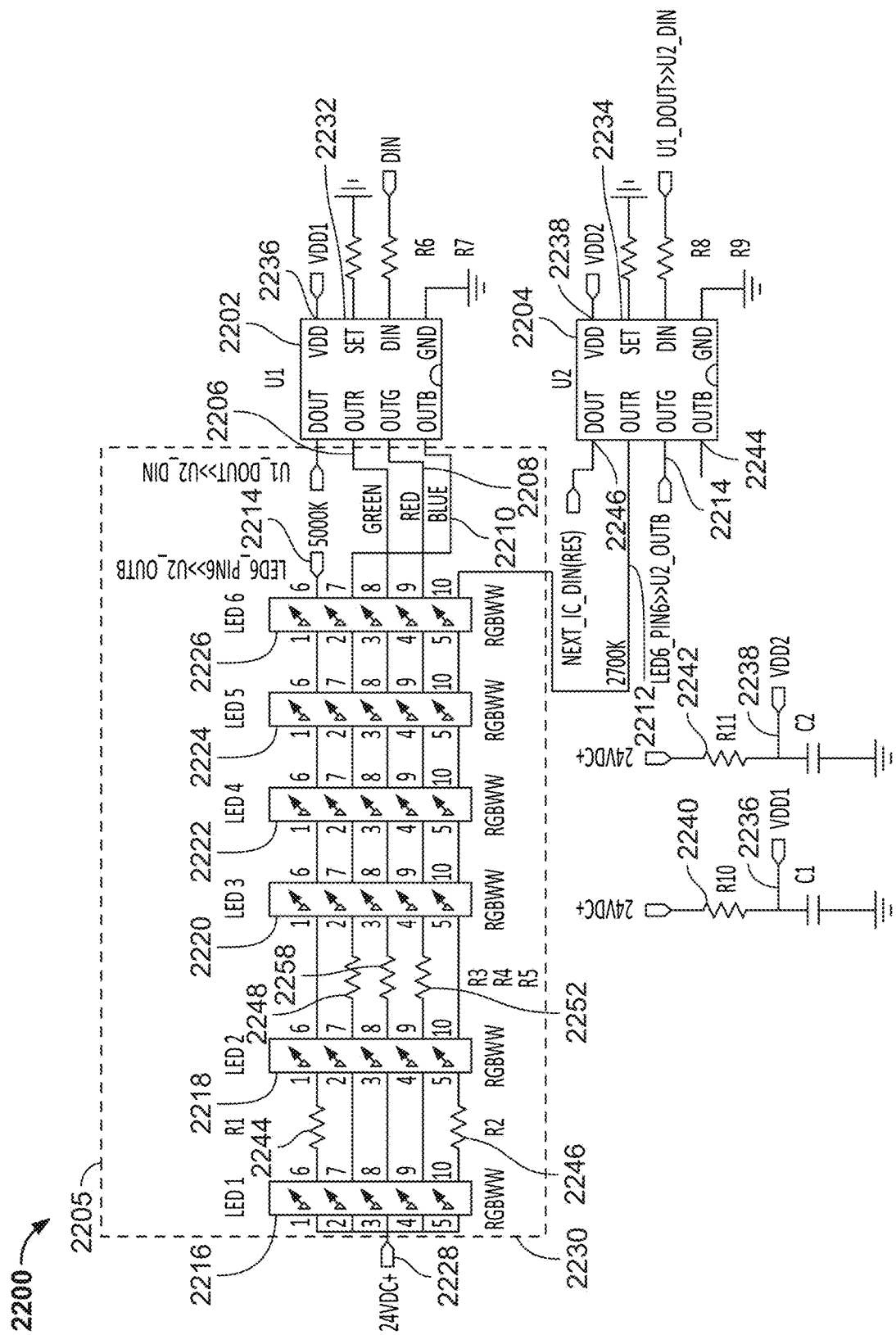
FIG. 22 shows schematically illustrative apparatus in accordance with the principles of the invention.

FIG. 22 shows schematically illustrative circuit 2200. Circuit 2200 may be arranged on a lamina such as lamina 1600. Circuit 2200 may include IC 2202. Circuit 2200 may include IC 2204. Circuit 2200 may include array 2205 of lighting branches.

IC 2202, IC 2204 and array 2205 may be mounted on a single segment $T_i$. Array 2205 may be disposed on the lamina over one or more than one segment $T_i$.

Array 2205 may include lighting branch 2206. Array 2205 may include lighting branch 2208. Array 2205 may include lighting branch 2210. Array 2205 may include lighting branch 2212. Array 2205 may include lighting branch 2214.

One or both of ICs 2202 and 2204 may have one or more features in common with IC 1800. ICs 2202 and 2204 may be configured to be in electrical communication with a lighting controller in a manner that is the same or similar to that shown in connection with tape 2000. ICs 2202 and 2204 may be configured to be in electrical communication with each other in a manner that is the same or similar to that shown in connection with tape 2000. ICs 2202 and 2204 may be configured to be in electrical communication with ICs on different segments of the same tape in a manner that is the same or similar to that shown in connection with tape 2000.

One or more of lighting branches 2206, 2208, 2210, 2212 and 2214 may include one or more LEDs. The LEDs of a lighting branch may emit light of a color that is different from the colors of the LEDs on other branches. The LEDs of a lighting branch may emit light of the same or similar color.

The LED's of a branch may belong to one or more groups. Circuit 2200 may include group 2216. Circuit 2200 may include group 2218. Circuit 2200 may include group 2220. Circuit 2200 may include group 2222. Circuit 2200 may include group 2224. Circuit 2200 may include group 2226. One or more of the groups may include one or more of a red-emitting LED, a green-emitting LED, a blue-emitting LED, a first white-emitting LED, a second white-emitting LED, and any other suitable LED. LEDs of the same color in the different groups may be arranged on a lighting branch designated for that color.

A first white-emitting LED may emit white light with a first CCT. A second white-emitting LED may emit white light with a second CCT. The second CCT may be different from the first CCT. One or more of the CCTs may be 1800° K or any other suitable CCT. One or more of the CCTs may be 2700° K or any other suitable CCT. One or more of the CCTs may be 5000° K or any other suitable CCT.

Circuit 2200 may include lighting voltage terminal 2228. Lighting voltage terminal 2228 may be used to supply current at end 2230 of array 2205. The current may cause the LEDs in the lighting branches to emit. ICs 2202 and 2204 may regulate the current in a branch in accordance with a light setting instruction corresponding to the branch. The current may be discharged through SET terminals 2232 and 2234.

Voltage terminal 2228 may be part of a connector (not shown) that is configured to couple voltage 2228 to a lighting voltage. The voltage may be 5 VDC, 12 VDC, 24 VDC, 48 VDC, or any other suitable voltage.

Branches in array 2205 may include one or more in-line resistances such as 2244 and 2246 (R1 and R2, respectively) in branches 2214 and 2212, respectively. Branches in array 2205 may include one or more in-line resistances such as 2248, 2250 and 2252 (R3, R4 and R5, respectively) in branches 2210, 2206 and 2208, respectively. An in-line resistance may provide a voltage drop in the branches to make the branch voltages at the IC terminals suitable for regulation by the corresponding current regulator in an IC.

A resistance may include one or more resistors or other resistance elements.

IC operational voltages 2236 and 2238 (VDD1 and VDD2) may be fixed with respect to the lighting voltage by resistances 2240 and 2242 (R10 and R11, respectively). One or more of the terminals, such as OUTB terminal 2244, may be unused. DOUT terminal 2246 may provide control data to an IC on a different segment (not shown).

A lighting branch may be coupled to an IC current regulation terminal based on matching of a predetermined order of the colors of the branches in an array with a sequence of light level values $L_n$ for a sample. (For example, the green and blue branches are reversed with respect to labeling of terminals of IC. 2202, and a 2700° K CCT white branch is coupled to a terminal labeled "OUTR".)

Figure 23:
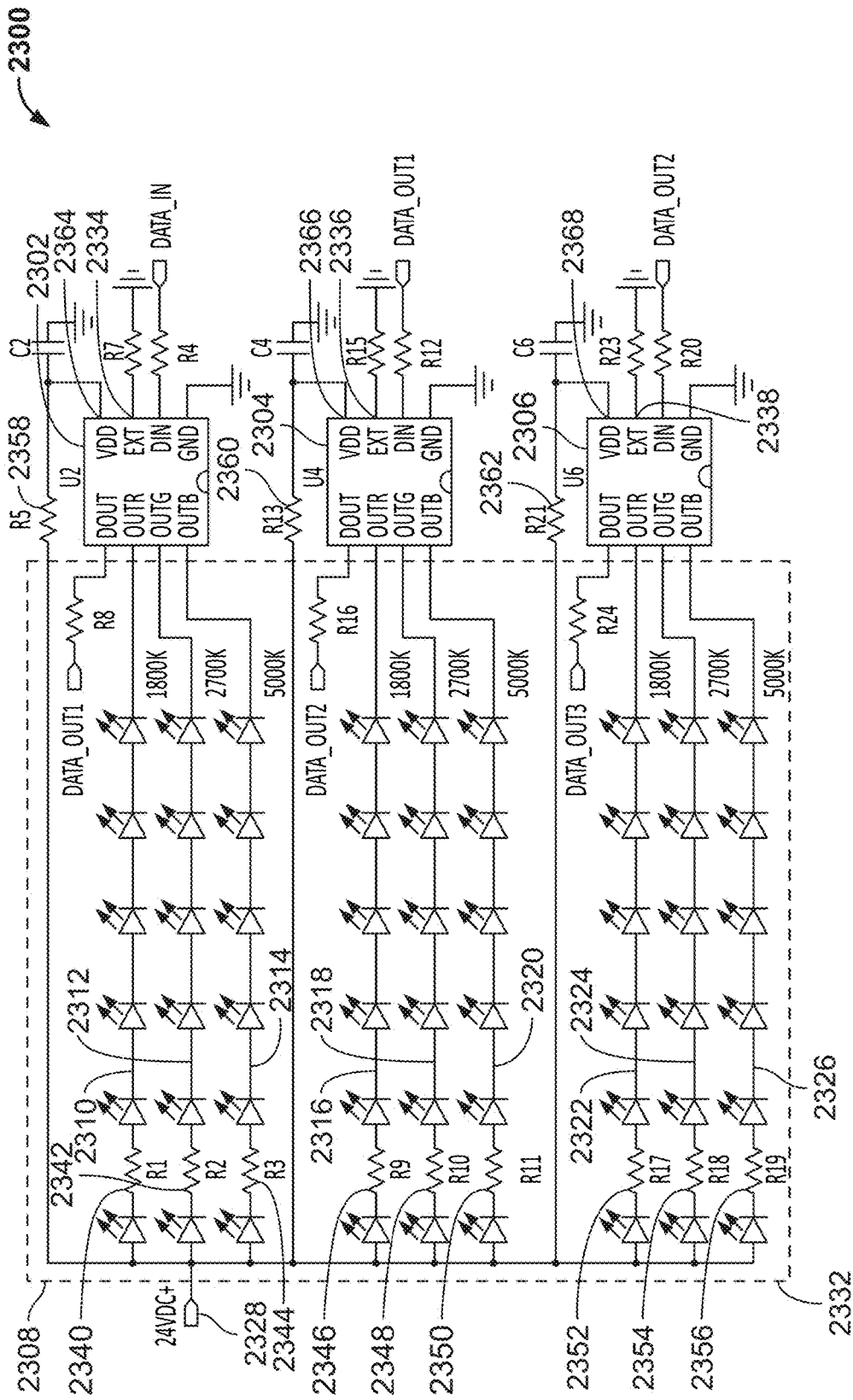
FIG. 23 shows schematically illustrative apparatus in accordance with the principles of the invention.

FIG. 23 shows schematically illustrative circuit 2300. Circuit 2300 may be arranged on a lamina such as lamina 1600. Circuit 2300 may include IC 2302. Circuit 2300 may include IC 2304. Circuit 2300 may include IC 2306. Circuit 2300 may include array 2308 of lighting branches.

IC 2302, IC 2304, IC 2306 and array 2308 may be mounted on a single segment $T_i$. Array 2308 may be disposed on the lamina over more than one segment $T_i$.

Array 2308 may include one or more lighting branches such as 2310, 2312, 2314, 2316, 2318, 2320, 2322, 2324, and 2326.

One or more of ICs 2302, 2304 and 2306 may have one or more features in common with IC 1800. ICs 2302, 2304 and 2306 may be configured to be in electrical communication with a lighting controller in a manner that is the same or similar to that shown in connection with tape 2000. ICs 2302, 2304 and 2306 may be configured to be in electrical communication with each other in a manner that is the same or similar to that shown in connection with tape 2000. ICs 2302, 2304 and 2306 may be configured to be in electrical communication with ICs on different segments of the same tape in a manner that is the same or similar to that shown in connection with tape 2000.

One or more of lighting branches 2310, 2312, 2314, 2316, 2318, 2320, 2322, 2324, and 2326 may include one or more LEDs. The LEDs of a lighting branch may emit light of a color that is different from the colors of the LEDs on other branches. The LEDs of a lighting branch may emit light of the same or similar color.

One or more of branches 2310, 2312, 2314, 2316, 2318, 2320, 2322, 2324, and 2326 may include a first white-emitting LED. One or more of branches 2310, 2312, 2314, 2316, 2318, 2320, 2322, 2324, and 2326 may include a first white-emitting LED. One or more of branches 2310, 2312, 2314, 2316, 2318, 2320, 2322, 2324, and 2326 may include a second white-emitting LED. One or more of branches 2310, 2312, 2314, 2316, 2318, 2320, 2322, 2324, and 2326 may include a third white-emitting LED.

LEDs of the same color temperature may be arranged on a lighting branch designated for that color temperature.

A first white-emitting LED may emit white light with a first CCT. A second white-emitting LED may emit white light with a second CCT. A third white-emitting LED may emit white light with a second CCT. The first, second and third CCTs may be different from one or both of the others. One or more of the CCTs may be 1800° K or any other suitable CCT. One or more of the CCTs may be 2700° K or any other suitable CCT. One or more of the CCTs may be 5000° K or any other suitable CCT.

An 1800° K branch may be coupled to an OUTR terminal. A 2700° K branch may be coupled to an OUTG terminal. A 5000° K branch may be coupled to an OUTB terminal.

Circuit 2300 may include lighting voltage terminal 2328. Lighting voltage terminal 2328 may be used to supply current at end 2332 of array 2308. The current may cause the LEDs in the lighting branches to emit. ICs 2302, 2304 and 2306 may regulate the current in a branch in accordance with a light setting instruction corresponding to the branch. The current may be discharged through EXT terminals 2334, 2336 and 2338.

Lighting voltage terminal 2328 may be part of a connector (not shown) that is configured to couple lighting voltage terminal 2328 to a lighting voltage. The lighting voltage may be 5 VDC, 12 VDC, 24 VDC, 48 VDC, or any other suitable voltage.

Branches in array 2308 may include one or more in-line resistances such as resistances 2340, 2342, 2344, 2346, 2348, 2350, 2352, 2354, and 2356 (R1, R2, R3, R9, R10, R11, R17, R18 and R19, respectively) in branches 2310, 2312, 2314, 2316, 2318, 2320, 2322, 2324, and 2326, respectively.

Resistances 2358 (R5), 2360 (R13) and 2362 (R21) may fix IC operational voltages 2362, 2364 and 2368 (VDDs for each of ICs 2302, 2304 and 2306), respectively, relative to the lighting voltage. One or more of the terminals may be unused. DOUT terminal 2246 may provide control data to an IC on a different segment (not shown).

Figure 24:
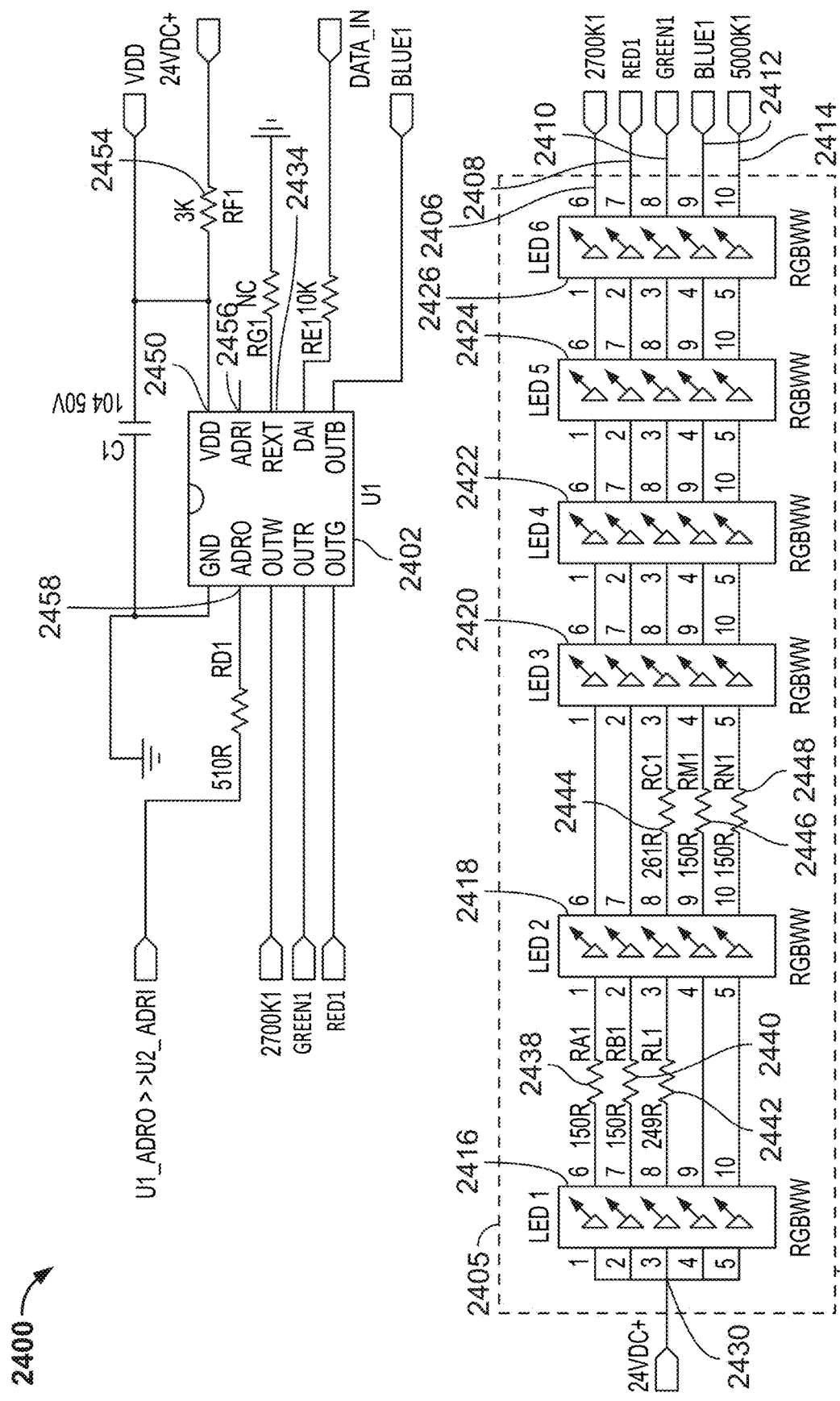
FIG. 24 shows schematically illustrative apparatus in accordance with the principles of the invention.
Figure 24:
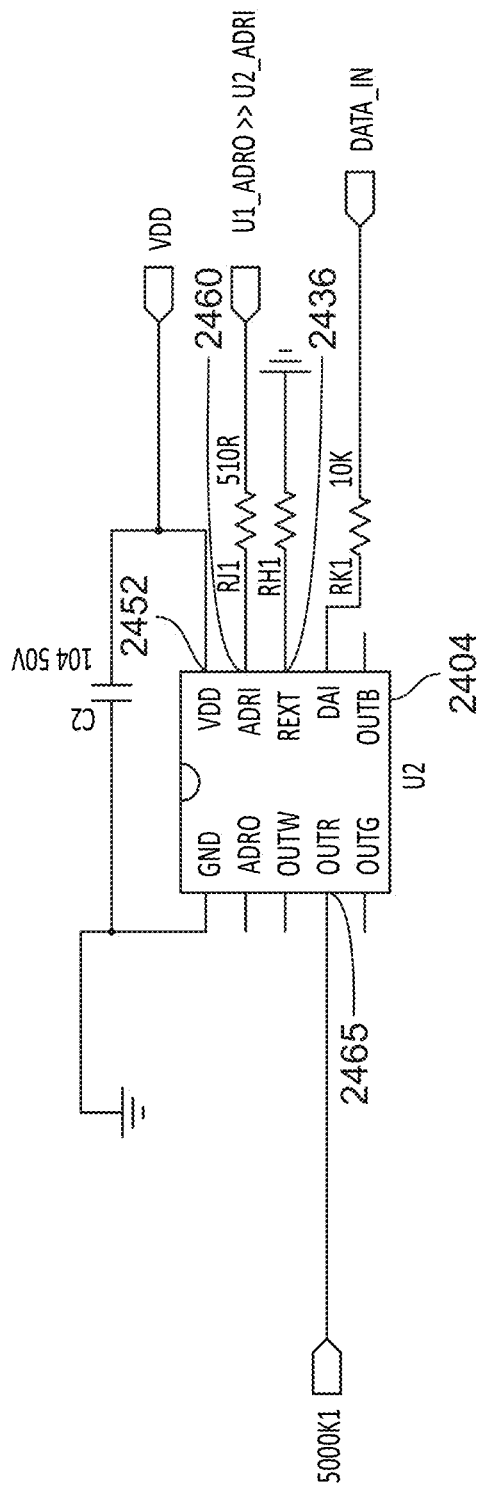

FIG. 24 shows schematically illustrative circuit 2400. Circuit 2400 may be arranged on a lamina such as lamina 1700. Circuit 2400 may include IC 2402. Circuit 2400 may include IC 2404. Circuit 2400 may include array 2405 of lighting branches.

IC 2402, IC 2404 and array 2405 may be mounted on a single segment $S_{i,j}$. Array 2405 may be disposed on the lamina over more than one segment $S_{i,j}$.

Array 2405 may include lighting branch 2406. Array 2405 may include lighting branch 2408. Array 2405 may include lighting branch 2410. Array 2405 may include lighting branch 2412. Array 2405 may include lighting branch 2414.

One or both of ICs 2402 and 2404 may have one or more features in common with IC 1900. ICs 2402 and 2404 may be configured to be in electrical communication with a lighting controller in a manner that is the same or similar to that shown in connection with light sheet 2100. ICs 2402 and 2404 may be configured to be in electrical communication with each other in a manner that is the same or similar to that shown in connection with light sheet 2100. ICs 2402 and 2404 may be configured to be in electrical communication with ICs on different segments of the same tape in a manner that is the same or similar to that shown in connection with sheet 2100.

One or more of lighting branches 2406, 2408, 2410, 2412 and 2414 may include one or more LEDs. The LEDs of a lighting branch may emit light of a color that is different from the colors of the LEDs on other branches. The LEDs of a lighting branch may emit light of the same or similar color.

The LEDs of a branch may belong to one or more groups. Circuit 2400 may include group 2416. Circuit 2400 may include group 2418. Circuit 2400 may include group 2420. Circuit 2400 may include group 2422. Circuit 2400 may include group 2424. Circuit 2400 may include group 2426. One or more of the groups may include one or more of a red-emitting LED, a green-emitting LED, a blue-emitting LED, a first white-emitting LED, a second white-emitting LED, and any other suitable LED. LEDs of the same color in the different groups may be arranged on a lighting branch designated for that color.

A first white-emitting LED may emit white light with a first CCT. A second white-emitting LED may emit white light with a second CCT. The second CCT may be different from the first CCT. One or more of the CCTs may be 1800° K or any other suitable CCT. One or more of the CCTs may be 2700° K or any other suitable CCT. One or more of the CCTs may be 5000° K or any other suitable CCT.

Circuit 2400 may include lighting voltage terminal 2430. Lighting voltage terminal 2430 may be used to supply current at end 2432 of array 2405. The current may cause the LEDs in the lighting branches to emit. ICs 2402 and 2404 may regulate the current in a branch in accordance with a light setting instruction corresponding to the branch. The current may be discharged through REXT terminals 2434 and 2436.

Voltage terminal 2430 may be part of a connector (not show) that is configured to couple voltage 2430 to a lighting voltage. The voltage may be 5 VDC, 12 VDC, 24 VDC, 48 VDC, or any other suitable voltage.

Branches in array 2405 may include one or more in-line resistances such as 2438, 2440 and 2442 (RA1, RB1 and RL1, respectively) in branches 2406, 2408 and 2410, respectively. Branches in array 2405 may include one or more in-line resistances such as 2444, 2446 and 2448 (RC1, RM1 and RN1, respectively) in branches 2410, 2412 and 2414, respectively.

IC operational voltages 2450 and 2452 (of ICs 2402 and 2404, respectively) may be fixed with respect to the lighting voltage by resistance 2454 (RF1). ADRI terminal 2456 (of IC 2402) may be unused. ADRO terminal 2458 of IC 2402 may provide control data to ADRI terminal 2460 of IC 2404. One or more of the terminals of IC 2402 or 2404 may be unused.

Figure 25:
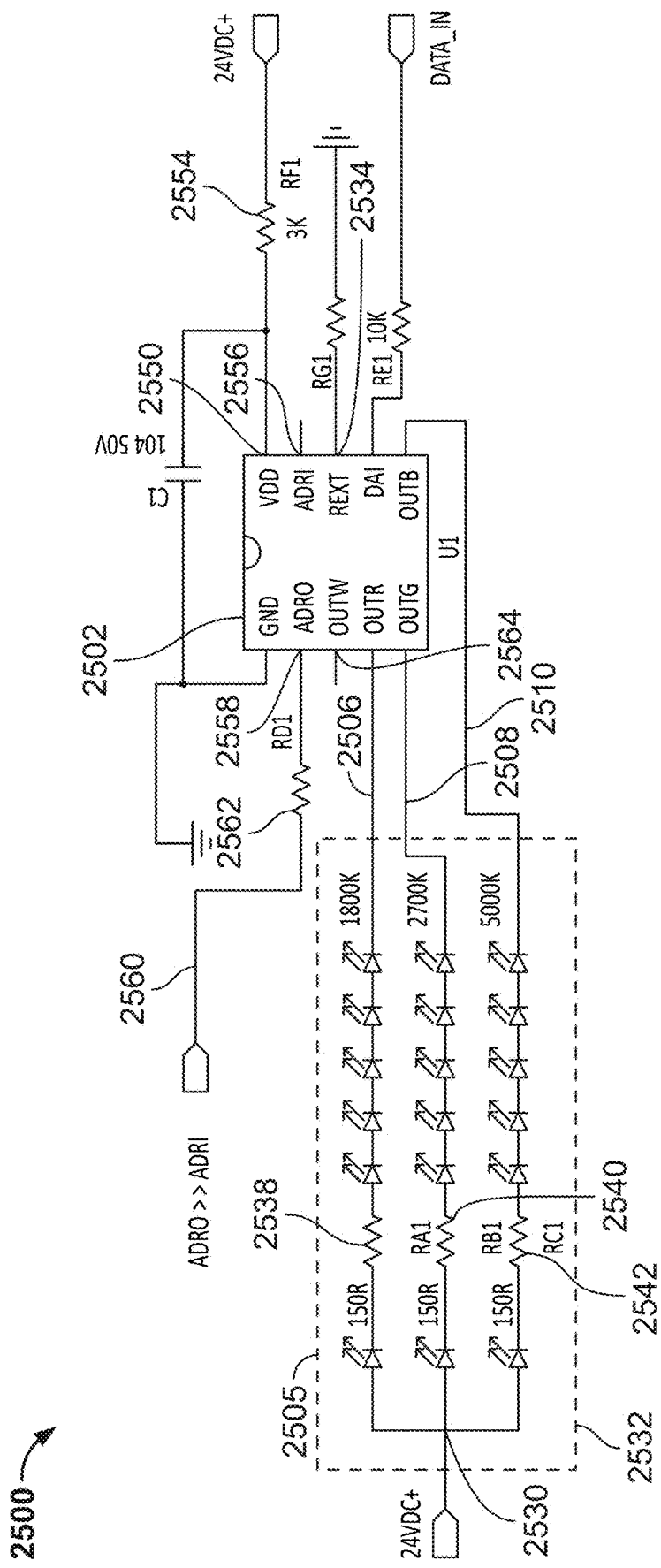
FIG. 25 shows schematically illustrative apparatus in accordance with the principles of the invention.

FIG. 25 shows schematically illustrative circuit 2500. Circuit 2500 may be arranged on a lamina such as lamina 1700. Circuit 2500 may include IC 2502. Circuit 2500 may include array 2505 of lighting branches.

IC 2502 and array 2505 may be mounted on a single segment $S_{i,j}$. Array 2505 may be disposed on the lamina over more than one segment $S_{i,j}$.

Array 2505 may include lighting branch 2506. Array 2505 may include lighting branch 2508. Array 2505 may include lighting branch 2510.

IC 2502 may have one or more features in common with IC 1900. IC 2502 may be configured to be in electrical communication with a lighting controller in a manner that is the same or similar to that shown in connection with sheet 2100. IC 2502 may be configured to be in electrical communication with ICs on different segments of the same tape in a manner that is the same or similar to that shown in connection with sheet 2100.

One or more of lighting branches 2506, 2508 and 2510 may include one or more LEDs. The LEDs of a lighting branch may emit light of a color that is different from the colors of the LEDs on other branches. The LEDs of a lighting branch may emit light of the same or similar color.

One or more of branches 2506, 2508 and 2510 may include a first white-emitting LED. One or more of branches 2506, 2508 and 2510 may include a second white-emitting LED. One or more of branches 2506, 2508 and 2510 may include a third white-emitting LED.

LEDs of the same color temperature may be arranged on a lighting branch designated for that color temperature.

A first white-emitting LED may emit white light with a first CCT. A second white-emitting LED may emit white light with a second CCT. A third white-emitting LED may emit white light with a second CCT. The first, second and third CCTs may be different from one or both of the others. One or more of the CCTs may be 1800° K or any other suitable CCT. One or more of the CCTs may be 2700° K or any other suitable CCT. One or more of the CCTs may be 5000° K or any other suitable CCT.

Circuit 2500 may include lighting voltage terminal 2530. Lighting voltage terminal 2530 may be used to supply current at end 2532 of array 2505. The current may cause the LEDs in the lighting branches to emit. IC 2502 may regulate the current in a branch in accordance with a light setting instruction corresponding to the branch. The current may be discharged through REXT terminal 2534.

Voltage terminal 2530 may be part of a connector (not show) that is configured to couple voltage 2530 to a lighting voltage. The voltage may be 5 VDC, 12 VDC, 24 VDC, 48 VDC, or any other suitable voltage.

Branches in array 2505 may include one or more in-line resistances such as 2538, 2540 and 2542 (RA1, RB1 and RC1, respectively) in branches 2506, 2508 and 2510, respectively.

IC operational voltage 2550 of IC 2502 may be fixed with respect to the lighting voltage by resistance 2554 (RF1). Jumper 2560 may run from ADRI terminal 2556 to ADRO terminal 2558. Jumper 2560 may include resistance 2562 (RD10). Jumper 2560 may ensure that a sample pointer is reset after lighting values are provided to lighting branches 2506, 2508 and 2510 in view of the non-use of OUTW terminal 2564.

One or more of the terminals of IC 2502 may be unused.

Figure 26:
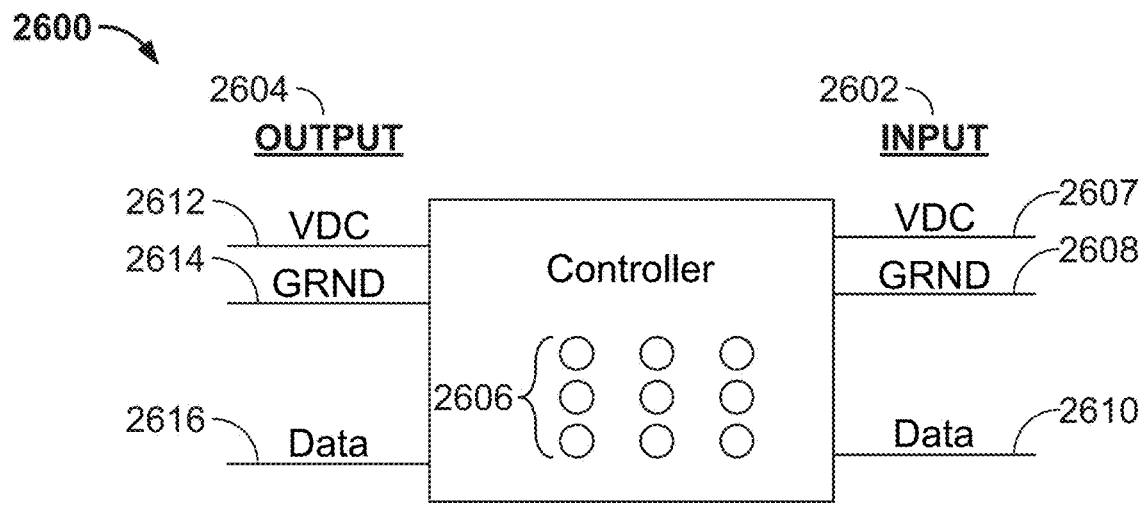
FIG. 26 shows schematically illustrative apparatus that may be used in accordance with the principles of the invention.

FIG. 26 shows schematically illustrative controller 2600. Controller 2600 may have one or more features in common with controller 1504. Controller 2600 may be configured to receive inputs 2602. Controller 2600 may be configured to provide outputs 2604. Controller 2600 may include user-adjustable controls 2606. User-adjustable controls 2606 may have one or more features in common with selector 1514.

Inputs 2602 may be compatible with a lighting format. Input VDC 2607 may provide operational voltage to controller 2600. Input VDC 2607 may provide lighting voltage to one or more lighting branches. Input GRND 2608 may provide a reference voltage or ground voltage. Input data 2610 may be generated by lighting control data generator such as 1512.

Output VDC 2612 may provide operational voltage to an IC such as 1800 or 1900. Output VDC 2612 may provide operational voltage to one or more lighting branches. Output GRND 2614 may provide a reference voltage or ground voltage to an IC such as 1800 or 1900. Output Data 2616 may provide lighting control data to an IC such as 1800 or 1900.

Figure 27:
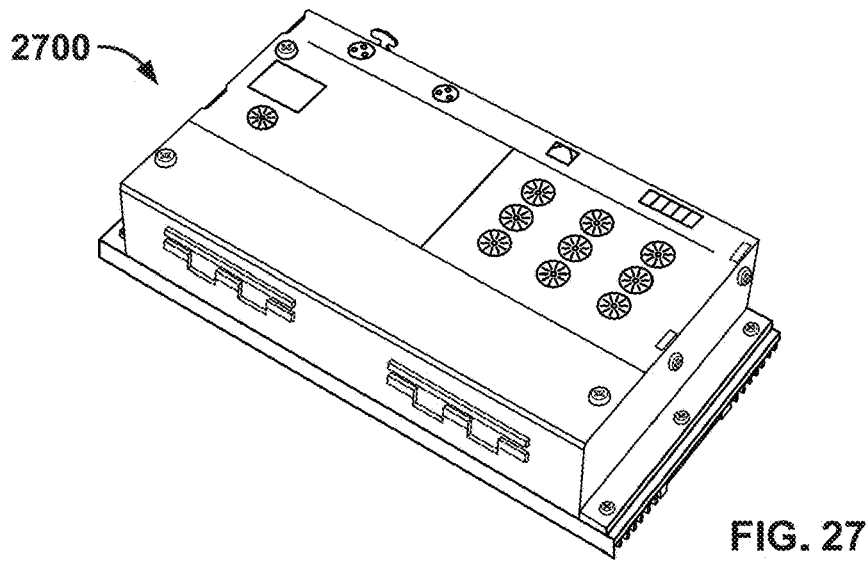
FIG. 27 shows apparatus that may be used in accordance with the principles of the invention.

FIG. 27 shows illustrative controller 2700. Controller 2700 may have one or more features in common with controller 1504. Controller 2700 may have one or more features in common with controller 2600.

Figure 28:
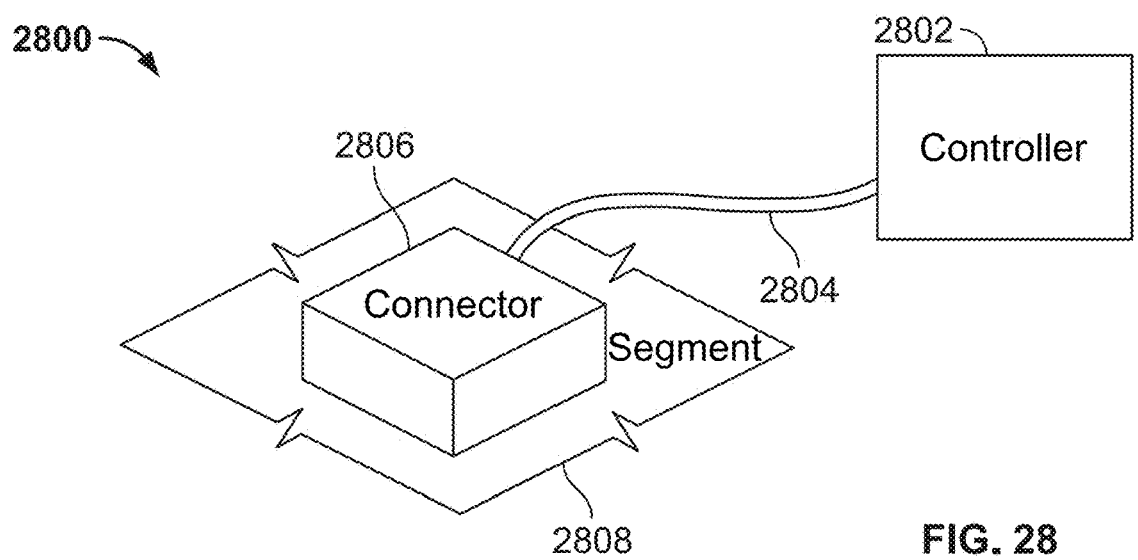
FIG. 28 shows schematically illustrative apparatus in accordance with the principles of the invention.

FIG. 28 shows schematically arrangement 2800. Arrangement 2800 may include controller 2802. Arrangement 2800 may include channel 2804. Arrangement 2800 may include connector 2806. Arrangement 2800 may include segment 2808.

Controller 2802 may have one or more features in common with one or more of controllers 1504, 2600 and 2700. Channel 2804 may include a cable. Channel 2804 may include a wireless communication channel. Connector 2806 may have one or more features in common with a connector described in connection with light tape 2000. Connector 2806 may have one or more features in common with a connector described in connection with light sheet 2100.

Segment 2808 may have one or more features in common with segment $T_i$. Segment 2808 may have one or more features in common with segment $S_{i,j}$.

Controller 2802 may provide lighting control data to one or more ICs on segment 2808. The lighting control data may include a data packet. The data packet may include an address. The address may correspond to one or more of the ICs. The address may correspond to one or more LEDs on segment 2808. The address may correspond to one or more LEDs on a light tape. The address may correspond to one or more LEDs on a light sheet. The LEDs corresponding to the address may be controlled by a current regulator or regulators on a single IC. The LEDs corresponding to the address may be controlled by current regulators on different ICs.

Figure 29:
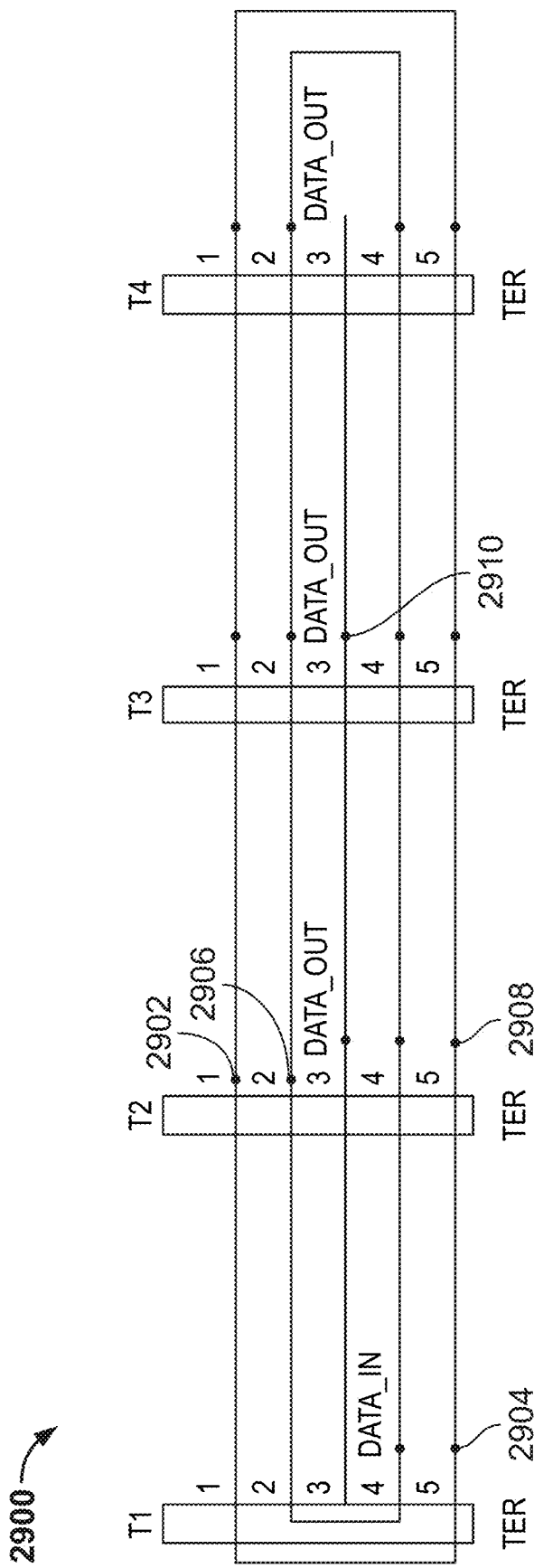
FIG. 29 shows schematically illustrative apparatus in accordance with the principles of the invention.

FIG. 29 shows schematically terminal layout 2900 for a connector such as 2806. Connector 2806 may connect with a circuit such as that shown in connection with light tape 2000. Connector 2806 may connect with a circuit such as that shown in connection light sheet 2100.

Connector 2806 may include a mounted component. The mounted component may be mounted on segment 2808. Connector 2806 may include a channel component. The channel component may be coupled to channel 2804. Terminal layout 2900 may be the layout for the mounted component. The channel component may have a terminal layout that is a mirror image of layout 2900.

Layout 2900 may be based on a connector body matrix of four columns (T1 . . . . T4) and five rows. In each column, terminals 1 (e.g., terminal 2902) and 5 (e.g., terminal 2904) may provide VDD, terminals 2 (e.g., terminal 2906) and 4 (e.g., terminal 2908) may provide GND, and Terminal 3 (e.g., terminal 2910) may provide lighting control data. Because of the mirror symmetry, and the layout of VDD, GND and data terminals, the channel component can be operationally connected to the mounted component in a first orientation and in a second orientation that is rotated 180° about an axis normal to the page.

Functions of electrical circuits, or parts thereof, disclosed herein may be incorporated into or combined with other electrical circuits, or parts thereof, disclosed herein, or with other suitable electrical circuits.

All ranges and parameters disclosed herein shall be understood to encompass any and all subranges subsumed therein, every number between the endpoints, and the endpoints. For example, a stated range of "1 to 10" should be considered to include any and all subranges between (and inclusive of) the minimum value of 1 and the maximum value of 10; that is, all subranges beginning with a minimum value of 1 or more (e.g. 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

Thus, apparatus, methods and algorithms for lighting control have been provided. Persons skilled in the art will appreciate that the present invention may be practiced by other than the described embodiments, which are presented for purposes of illustration rather than of limitation.

What is claimed is:

1. Apparatus for lighting control comprising:
 a transceiver configured to receive lighting control information from a power source, the lighting control information encoded on an AC voltage;
 lighting control circuitry configured to:
  receive the AC voltage from the power source;
  convert the AC voltage into a DC voltage that is greater than the AC voltage; and
  obtain a light level from the lighting control information; and
 a connector configured to transmit to a light emitting diode ("LED") light source:
  the DC voltage; and
  a current corresponding to the light level;
 wherein:
  the transceiver and the lighting control circuitry are disposed in a housing;
  the LED light source is disposed in a fixture;

the lighting control circuitry is structurally separate from and configured to be in electronic communication with the fixture; and the power source is structurally separate from the fixture.

2. The apparatus of claim 1 wherein the fixture is configured to be disposed in a fixture support that is not configured to receive the housing.

3. The apparatus of claim 1 wherein the lighting control information is transmitted from the power source via a power line communication ("PLC") signal.

4. The apparatus of claim 3 wherein the lighting control information is carried by alternating current having a nominal frequency in a range of 50-60 Hz.

5. The apparatus of claim 3 wherein the lighting control information is carried by a current having a nominal frequency that is not less than 1 MHz.

6. The apparatus of claim 3 wherein the lighting control information is carried by a current having a nominal frequency that is not less than 100 Hz.

7. The apparatus of claim 3 further including a PLC module configured to:
receive the lighting control information from the PLC signal;
decode the lighting control information; and
transmit the decoded lighting control information to the lighting control circuitry.

8. The apparatus of claim 1 wherein the lighting control circuitry further includes a microcontroller configured to:
receive the lighting control information from a first signal;
obtain the light level from the lighting control information; and
output the light level using a second signal.

9. The apparatus of claim 8 wherein the second signal is different from the first signal.

10. The apparatus of claim 8 wherein the first signal is a digital multiplex ("DMX") signal.

11. The apparatus of claim 8 wherein the first signal is an electronic low voltage ("ELV") signal.

12. The apparatus of claim 8 wherein the first signal is a triode for alternating current ("TRIAC") signal.

13. The apparatus of claim 8 wherein the second signal includes at least one pulse width modulated ("PWM") signal.

14. The apparatus of claim 1 wherein the AC voltage is 15 VAC.

15. The apparatus of claim 1 wherein the DC voltage is 24 VDC.

16. The apparatus of claim 1 wherein the lighting control information includes a color correlated temperature ("CCT").

17. The apparatus of claim 1 wherein the lighting control information includes a brightness.

18. The apparatus of claim 1 wherein the lighting control information includes a dim-to-warm correlation.

19. The apparatus of claim 1 wherein the fixture is a light tape.

20. The apparatus of claim 1 wherein the fixture is a modular fixture.

21. The apparatus of claim 1 wherein the fixture includes a plurality of fixtures.

22. The apparatus of claim 1 further comprising when the LED light source is a first LED light source;
a second LED light source;
wherein the first LED light source has a first color correlated temperature ("CCT") and the second LED light source has a second CCT that is different from the first CCT.

23. The apparatus of claim 1 further comprising, when the LED light source is a first LED light source having a first color correlated temperature ("CCT"):
a second LED light source having a second CCT;
a third LED light source having a third CCT;
a fourth LED light source having a fourth CCT; and
a fifth LED light source having a fifth CCT.

24. The apparatus of claim 1 wherein:
the lighting control circuitry and the transceiver are disposed on a printed circuit board ("PCB"); and
a width of the PCB is greater than a width of the fixture.

25. The apparatus of claim 1 wherein:
the lighting control circuitry and the transceiver are disposed on a first printed circuit board ("PCB");
the fixture includes a second PCB; and
the first PCB is in electronic communication with the second PCB via only the connector.

26. The apparatus of claim 25 wherein:
the LED is included in a linear array of LEDs;
and the linear array of LEDs is disposed on the second PCB.

27. The apparatus of claim 26 wherein a width of the first PCB is greater than a width of the second PCB.

28. The apparatus of claim 1 wherein the housing has a width that is greater than a width of the fixture.

* * * * *